US012508729B2

(12) United States Patent
Kielsmeier et al.

(10) Patent No.: US 12,508,729 B2
(45) Date of Patent: Dec. 30, 2025

(54) HUNTING KNIFE WITH SERRATED BLADE

(71) Applicant: Magpul Industries Corp., Austin, TX (US)

(72) Inventors: Nicholas Kielsmeier, Denver, CO (US); Clinton Wade Lynch, Erie, CO (US)

(73) Assignee: Magpul Industries Corp., Austin, TX (US)

( * ) Notice: Subject to any disclaimer, the term of this patent is extended or adjusted under 35 U.S.C. 154(b) by 451 days.

(21) Appl. No.: 17/974,418

(22) Filed: Oct. 26, 2022

(65) Prior Publication Data

US 2024/0139978 A1 May 2, 2024

(51) Int. Cl.
*B26B 9/02* (2006.01)

(52) U.S. Cl.
CPC .................................... *B26B 9/02* (2013.01)

(58) Field of Classification Search
CPC ........................................................ B26B 9/02
See application file for complete search history.

(56) References Cited

U.S. PATENT DOCUMENTS 3,524,570 A 8/1970 Seguine
5,092,046 A 3/1992 Collins
5,133,132 A * 7/1992 Yu ............................ B26B 9/02 30/286
5,379,520 A 1/1995 Collins
5,915,793 A 6/1999 Serpa
5,926,959 A 7/1999 Collins
6,138,363 A 10/2000 Kawashima
6,293,448 B1 9/2001 Pietrusynski
6,457,240 B1 10/2002 Liu
6,619,487 B2 9/2003 Stuchlik, III
7,434,316 B2 10/2008 Nenadic
D699,315 S 2/2014 Seeds et al.
9,033,148 B2 5/2015 Adams
9,254,577 B2 2/2016 Kommer
9,986,795 B2 6/2018 Bloch
9,999,279 B2 6/2018 Bloch
(Continued)

FOREIGN PATENT DOCUMENTS

CN 106003170 B 4/2018
WO 2010/047836 A1 4/2010

OTHER PUBLICATIONS

"Exo-Mod Drop Point—Orange", Gerber, available at <https://www.gerbergear.com/en-us/shop/knives/fixed/exo-mod-drop-point-orange-30-001796>, retrieved on Jan. 27, 2023, 3 pages.
(Continued)

*Primary Examiner* — Omar Flores Sanchez
(74) *Attorney, Agent, or Firm* — NOD Law PC

(57) ABSTRACT

This disclosure describes a knife, the knife including a blade having a cutting edge and a tang, wherein the cutting edge comprises a serrated portion having a plurality of serrations, the plurality of serrations positioned between a proximal end of the blade and a distal tip of the blade, wherein the serrated portion further comprises a plurality of recessed portions, and wherein each of the plurality of serrations is positioned adjacent at least one recessed portion; and wherein each recessed portion includes a top edge, a bottom edge, and at least one tapered portion, wherein one or more of the at least one tapered portion of each recessed portion is positioned adjacent at least one of the plurality of serrations.

16 Claims, 116 Drawing Sheets

(56) References Cited

U.S. PATENT DOCUMENTS

| | | | |
|---|---|---|---|
| 10,363,675 B2 | 7/2019 | Robinson et al. | |
| 10,377,031 B2 | 8/2019 | Wood | |
| 10,456,938 B2 | 10/2019 | Wu | |
| 10,512,315 B2 | 12/2019 | Bloch | |
| 10,631,599 B2 | 4/2020 | Bloch | |
| D891,216 S | 7/2020 | Bloch | |
| 11,771,256 B1 * | 10/2023 | Suteerawanit | B26B 9/02 30/113.1 |
| 2007/0039445 A1 * | 2/2007 | Nitsch | B26B 9/02 83/835 |
| 2008/0250652 A1 | 10/2008 | Fellhoelter | |
| 2010/0071216 A1 * | 3/2010 | Novak | B26B 5/002 30/162 |
| 2012/0102759 A1 | 5/2012 | Huang | |
| 2014/0157607 A1 * | 6/2014 | McFarland | B26B 9/02 30/355 |
| 2016/0262408 A1 * | 9/2016 | Kennedy | A22C 9/008 |
| 2016/0303747 A1 * | 10/2016 | Dovel | B24D 15/08 |
| 2017/0043493 A1 | 2/2017 | Seber et al. | |
| 2018/0207827 A1 | 7/2018 | Hsieh | |
| 2019/0009420 A1 | 1/2019 | Robinson et al. | |
| 2019/0255717 A1 * | 8/2019 | Pustilnik | B26B 9/02 |
| 2019/0315005 A1 * | 10/2019 | Jen | B26B 11/006 |
| 2020/0180180 A1 * | 6/2020 | Pesavento | A61B 17/06066 |
| 2020/0384662 A1 | 12/2020 | Hunt et al. | |
| 2021/0339408 A1 * | 11/2021 | Dickinson | B26B 7/00 |
| 2024/0164559 A1 * | 5/2024 | Mirza | A47G 21/02 |
| 2024/0316801 A1 * | 9/2024 | Berman | B26B 9/02 |

OTHER PUBLICATIONS

“Exo-Mod Caper”, Gerber, available at <https://www.gerbergear.com.au/exo-mod-caper.html>, retrieved on Jan. 27, 2023, 3 pages.

* cited by examiner

1900

1900

2600

3400

3600

3800

3800

3800

4500

4900

5600

5800

5800

6700

6700

6700

6700

7400

8100

HUNTING KNIFE WITH SERRATED BLADE

FIELD OF THE DISCLOSURE

The present disclosure relates generally to hunting knives. In particular, but not by way of limitation, the present disclosure relates to fixed blade hunting knives with serrated blades.

DESCRIPTION OF RELATED ART

Fixed blade knives are common in the hunting and industrial spaces and many feature a tang that forms the main handle with removable handle scales that are attached with pins, rivets or screws. Fixed blade knives also incorporate an elongated blade body extending from the tang, where the blade body includes a cutting edge. Knife blades may incorporate a straight cutting edge, or alternatively, a plurality of serrations along the cutting edge to enhance cutting performance by providing additional cutting points. In some aspects, the serrations improve cutting performance by effectively increasing the length of the cutting edge in comparison to straight edge blades.

The description provided in the description of related art section should not be assumed to be prior art merely because it is mentioned in or associated with this section. The description of related art section may include information that describes one or more aspects of the subject technology.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

For the purposes of this disclosure, and when referencing a direction of cutting or slicing, the terms "front" and "distal" shall refer to a side or direction associated with a direction of intended slicing (i.e., towards the tip of the knife blade), while the terms "back", "rear", or "proximal" shall be associated with the intended bracing of the knife handle (i.e., towards the user).

In some aspects, the techniques described herein relate to a knife, including: a blade having a cutting edge and a tang, wherein the cutting edge includes a serrated portion having a plurality of serrations, the plurality of serrations positioned between a proximal end of the blade and a distal tip of the blade; wherein the serrated portion further includes a plurality of recessed portions, and wherein each of the plurality of serrations is positioned adjacent at least one recessed portion; and wherein each recessed portion includes a top edge, a bottom edge, and at least one tapered portion, wherein one or more of the at least one tapered portion of each recessed portion is positioned adjacent at least one of the plurality of serrations.

In some aspects, the techniques described herein relate to a knife, wherein the cutting edge further includes a straight edge portion positioned between the serrated portion and the distal tip of the blade.

In some aspects, the techniques described herein relate to a knife, wherein one or more of the plurality of serrations include a beveled surface.

In some aspects, the techniques described herein relate to a knife, wherein one or more of the plurality of recessed portions includes a trapezoidal shape.

In some aspects, the techniques described herein relate to a knife, wherein each of the plurality of recessed portions includes one of a trapezoidal shape, a rectilinear shape, or a concave shape.

In some aspects, the techniques described herein relate to a knife, wherein the blade includes a first face and a second face, the second face opposing the first face, and wherein each of the plurality of recessed portions is formed on one of the first face or the second face.

In some aspects, the techniques described herein relate to a knife, wherein: the plurality of recessed portions include a first recessed portion formed on the first face, a second recessed portion formed on the second face, and a third recessed portion formed on the first face, wherein the second recessed portion is positioned between the first and the third recessed portion.

In some aspects, the techniques described herein relate to a method of manufacturing a knife, the method including: forming a blade having a cutting edge and a tang; and forming a serrated portion on the cutting edge, wherein the serrated portion includes a plurality of recessed portions and a plurality of serrations, the plurality of serrations positioned between a proximal end of the blade and a distal tip of the blade, and wherein each of the plurality of serrations is positioned adjacent at least one recessed portion, and wherein each recessed portion includes a top edge, a bottom edge, and at least one tapered portion, and wherein one or more of the at least one tapered portion of each recessed portion is positioned adjacent at least one of the plurality of serrations.

In some aspects, the techniques described herein relate to a method, further including forming a straight edge portion on the cutting edge, wherein the straight edge portion is positioned between the serrated portion and the distal tip of the blade.

In some aspects, the techniques described herein relate to a method, wherein one or more of the plurality of serrations include a beveled surface.

In some aspects, the techniques described herein relate to a method, wherein one or more of the plurality of recessed portions includes a trapezoidal shape.

In some aspects, the techniques described herein relate to a method, wherein each of the plurality of recessed portions includes one of a trapezoidal shape, a rectilinear shape, or a concave shape.

In some aspects, the techniques described herein relate to a method, wherein the blade includes a first face and a second face, the second face opposing the first face, and wherein each of the plurality of recessed portions is formed on one of the first face or the second face.

In some aspects, the techniques described herein relate to a method, wherein: the plurality of recessed portions include a first recessed portion formed on the first face, a second recessed portion formed on the second face, and a third recessed portion formed on the first face, wherein the second recessed portion is positioned between the first and the third recessed portion.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The present disclosure relates generally to a fixed blade knife. More specifically, but without limitation, the present disclosure relates to a fixed blade knife having a serrated blade that can enhance cutting performance, enable self-sharpening of the blade, or a combination thereof. As used herein, the terms "blade", "serrated blade", or "fixed blade" may be used interchangeably throughout the disclosure. Additionally, while the description below generally describes two serration patterns, it should be noted that this is not intended to be limiting. That is, other variations of serration patterns are contemplated in different embodiments.

Figure 1:
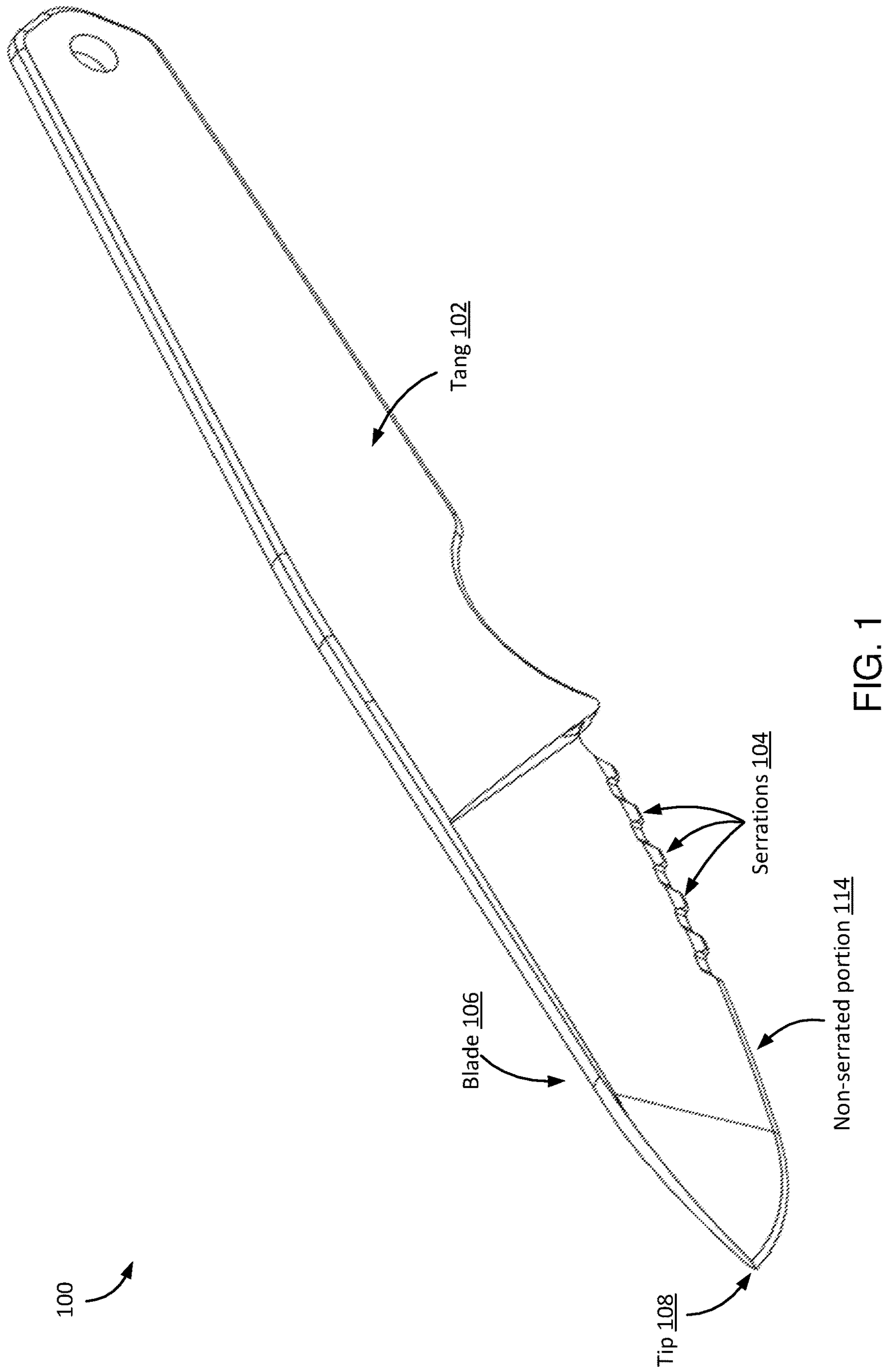
FIG. 1 is a perspective top view of a fixed blade knife having a tang and a serrated blade having a first pattern of serrations, according to various aspects of the present disclosure.

FIG. 1 is a perspective top view of a fixed blade knife 100 having a tang 102 and a blade 106 having a first pattern of serrations 104 (or serrated portion 104), according to various aspects of the present disclosure. In some cases, the tang 102 and the blade 106 may be formed as a unitary or monolithic piece. Alternatively, the tang 102 and the blade 106 may be formed as separate pieces and joined or coupled together (e.g., welded). While not shown, a handle comprising one or more scales may be formed around the tang 102, where the one or more scales are positioned around the tang 102.

In this example, the blade 106 comprises a first pattern of serrations 104 along a cutting edge (i.e., bottom edge) of the blade 106. Specifically, the serrations 104 are positioned between the tang 102 and a tip 108 of the blade 106, where the tip 108 is located at the distal end of the blade 106.

Figure 2:
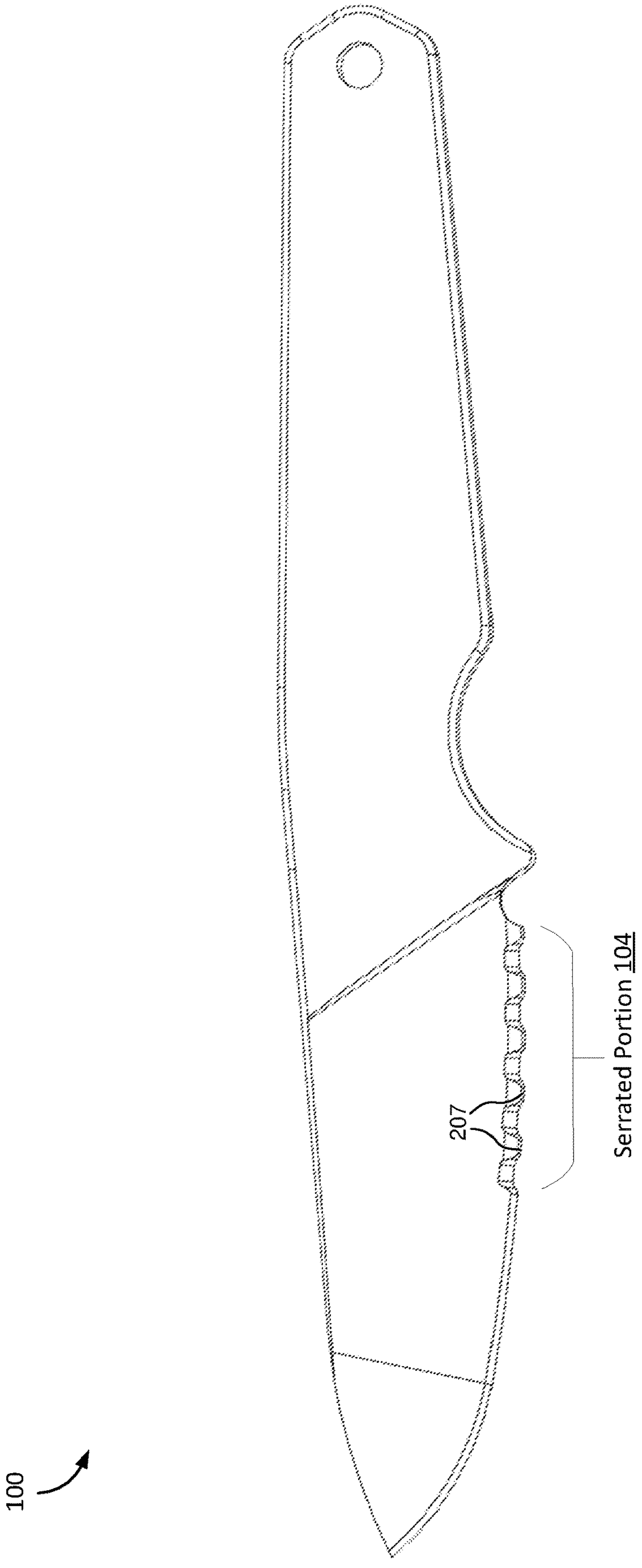
FIG. 2 is a right view of the fixed blade knife of FIG. 1, according to various aspects of the present disclosure.

FIG. 2 is a left view of the fixed blade knife 100 of FIG. 1, according to various aspects of the present disclosure. As seen, FIG. 2 shows the serrated portion 104 having a plurality of serrations 207 along the cutting edge of the blade. The serrated portion 104 comprises the plurality of serrations 207 and a plurality of recessed portions arranged in an alternating manner such that each serration is positioned adjacent at least one recessed portion.

Figure 3:
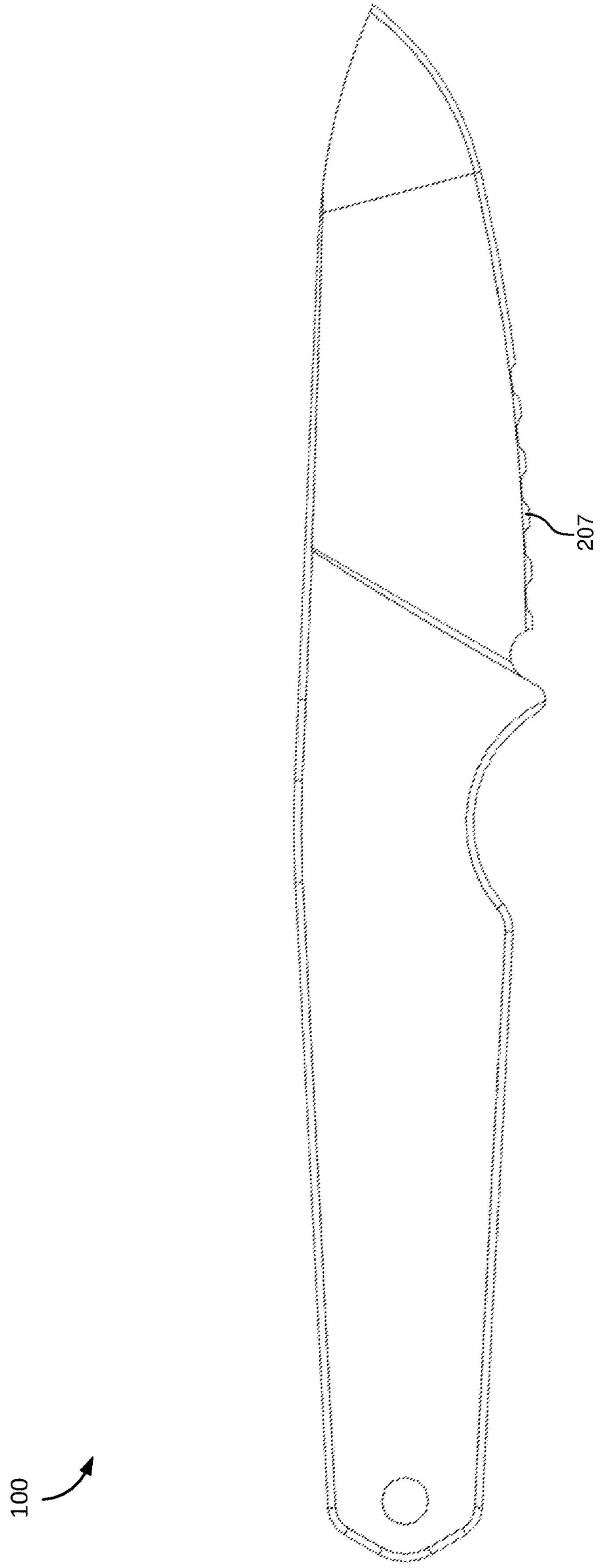
FIG. 3 is a left view of the fixed blade knife of FIG. 1, according to various aspects of the present disclosure.
Figure 4:
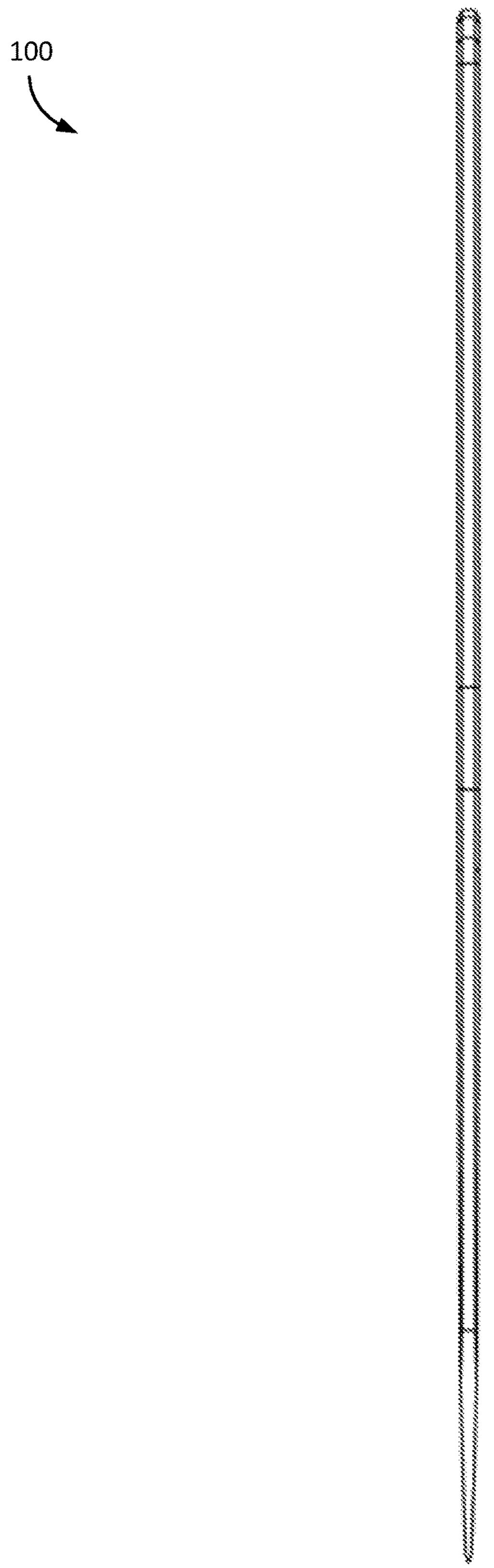
FIG. 4 is a top view of the fixed blade knife of FIG. 1, according to various aspects of the present disclosure.
Figure 5:
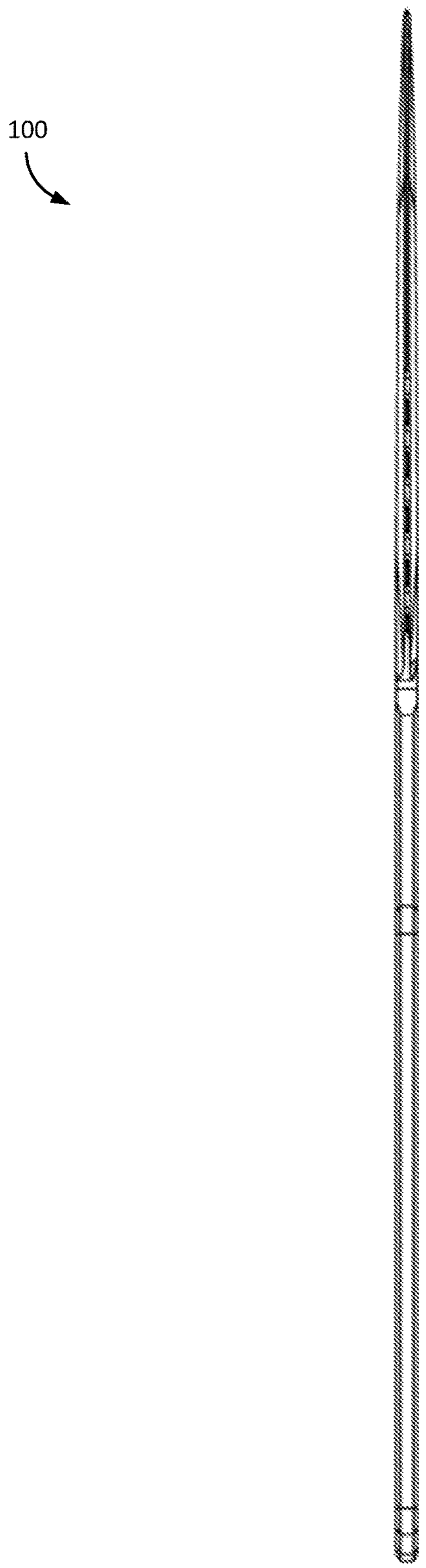
FIG. 5 is a bottom view of the fixed blade knife of FIG. 1, according to various aspects of the present disclosure.
Figure 6:
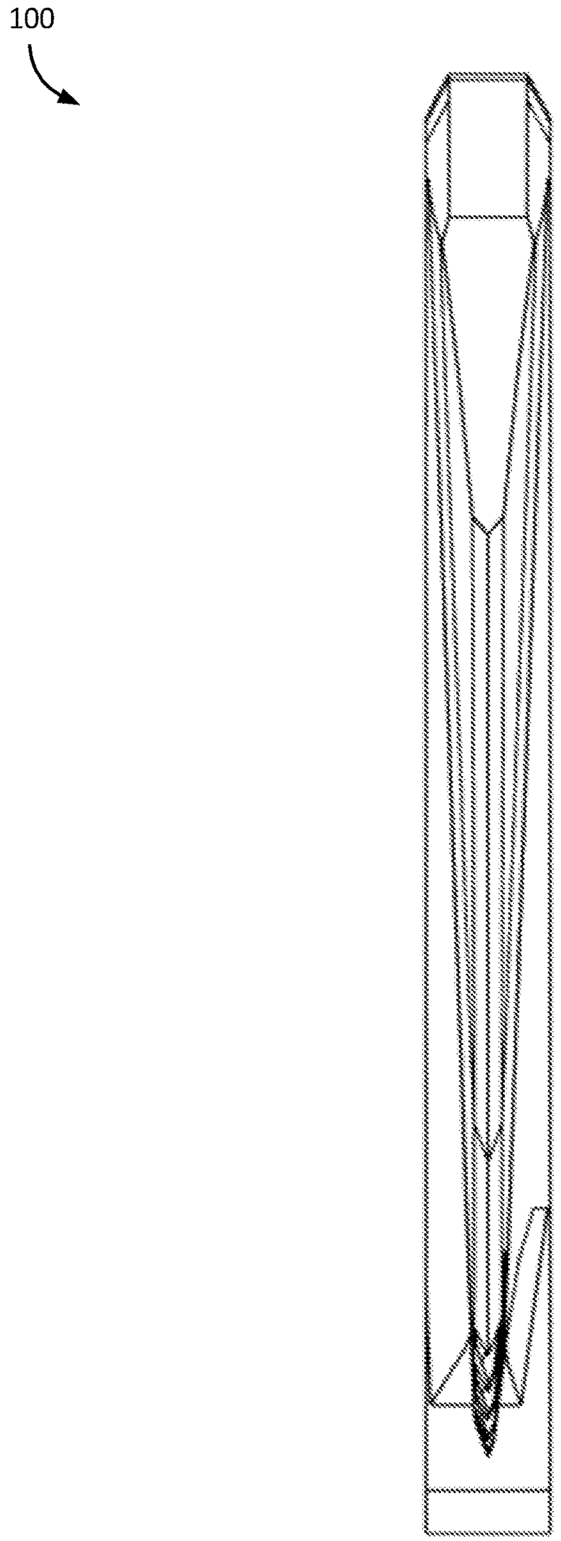
FIG. 6 is a front view of the fixed blade knife of FIG. 1, according to various aspects of the present disclosure.
Figure 7:
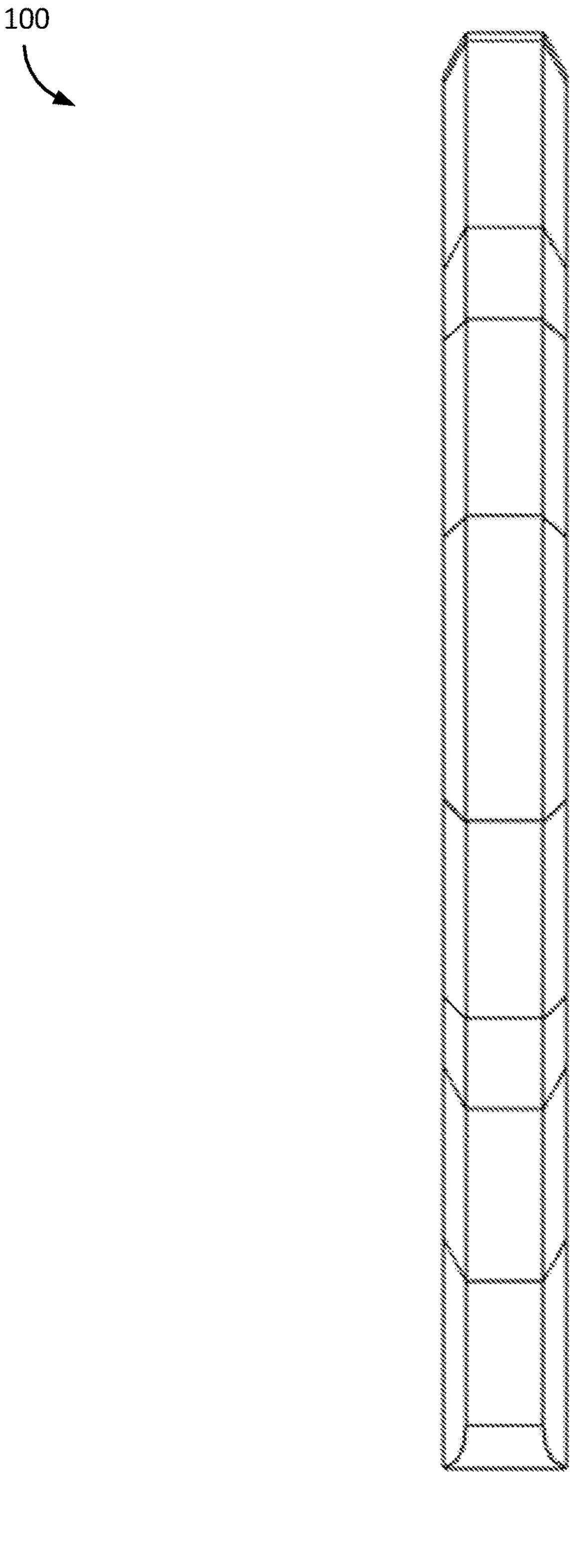
FIG. 7 is a rear view of the fixed blade knife of FIG. 1, according to various aspects of the present disclosure.

FIG. 3 is a right view of the fixed blade knife 100 of FIG. 1 showing the plurality of serrations 207, according to various aspects of the disclosure.

FIGS. 4-7 depict a top view, a bottom view, a front view, and a rear view, respectively, of the fixed blade knife 100 of FIG. 1, according to various aspects of the present disclosure.

Figure 8A:
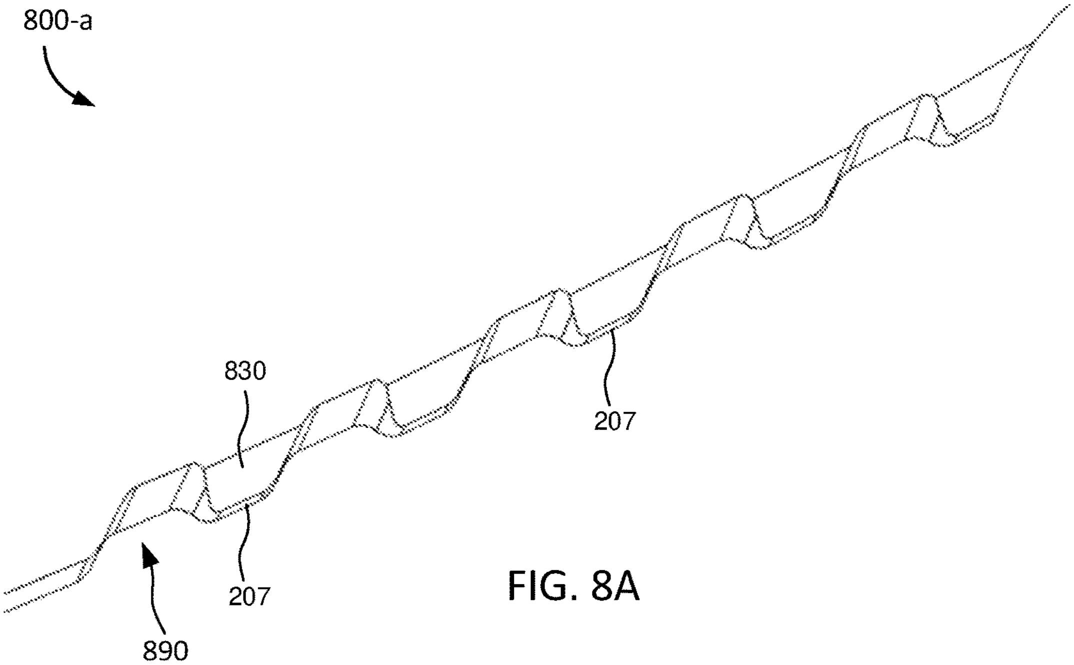
FIG. 8A shows a detailed right perspective view of the serrations of the fixed blade knife of FIG. 1, according to various aspects of the present disclosure.

FIG. 8A shows a detailed right perspective view 800-*a* of the serrations of the fixed blade knife of FIG. 1, according to various aspects of the present disclosure. As seen, FIG. 8A shows the serrated portion having a plurality of serrations 207 and a plurality of recessed portions 890 along the cutting edge of the blade. In this example, one or more of the plurality of serrations comprises a beveled surface 830 defined by at least one tapered portion of an adjacent recessed portion 890 of the blade.

Figure 8B:
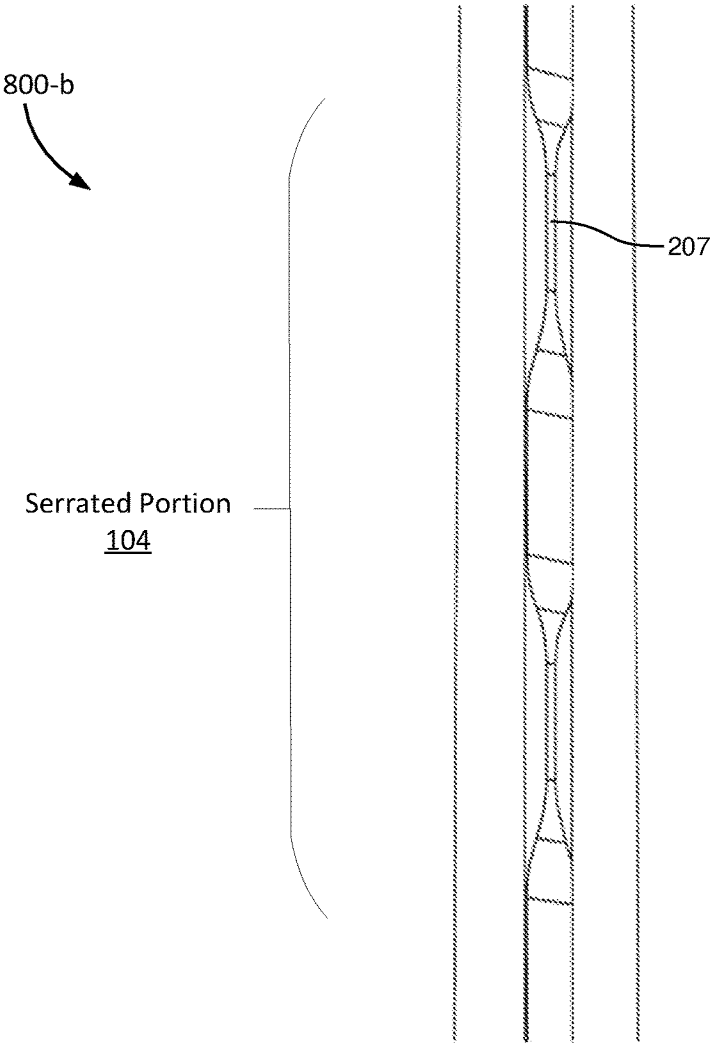
FIG. 8B shows a detailed bottom view of the serrations of the fixed blade knife of FIG. 1, according to various aspects of the present disclosure.

FIG. 8B shows a detailed bottom view 800-*b* of the serrations 207 of the fixed blade knife of FIG. 1, according to various aspects of the present disclosure.

Figure 9A:
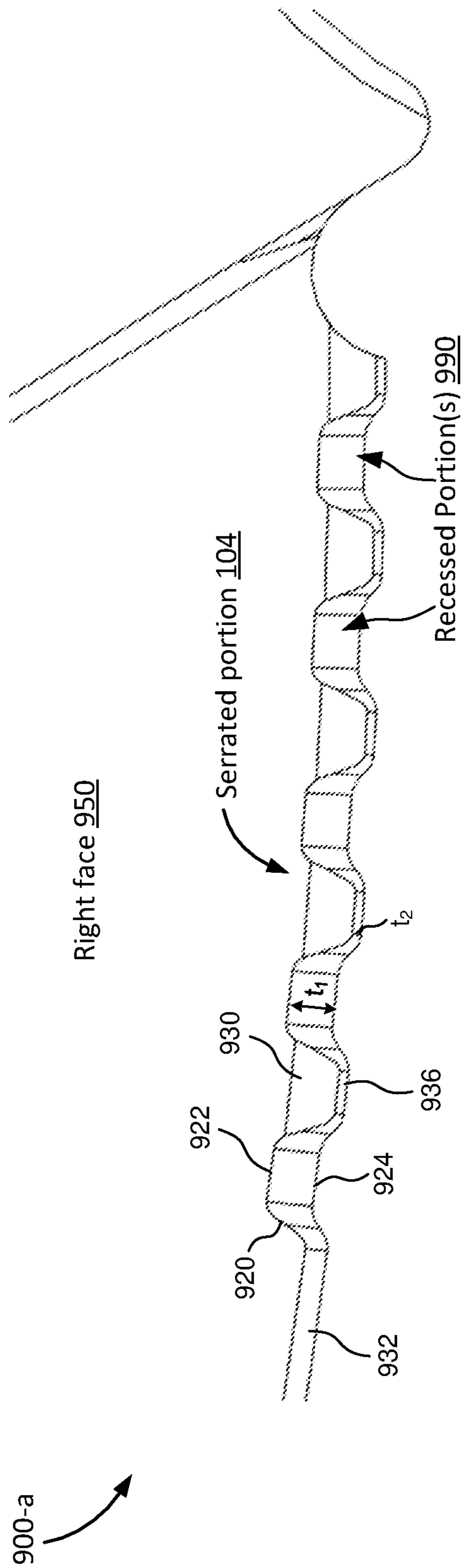
FIG. 9A shows a detailed right view of the serrations of the fixed blade knife of FIG. 1, according to various aspects of the present disclosure.

FIG. 9A illustrates a detailed right view 900-*a* of the serrated portion 104 of the fixed blade knife of FIG. 1, according to various aspects of the present disclosure. FIG. 9A depicts the right face 950 of the knife blade, where a plurality of serrations 936 extend (downward) from a lower edge of the right face 950. As seen in FIG. 9A, a plurality of recessed portions 990 are formed along the cutting edge of the blade, where the plurality of recessed portions 990 are positioned between the proximal end of the blade and a non-serrated portion 114 (or straight edge portion 114). In this example, the non-serrated portion (or straight edge portion) 114 is positioned between the serrated portion 104 and the distal tip (shown as tip 108 in FIG. 1) of the fixed blade knife 100. In this example, the non-serrated portion 114 is a substantially straight-edged cutting portion having a uniform or substantially uniform thickness.

As noted above, the serrated portion 104 comprises a plurality of recessed portions 990 and a plurality of serrations 936, where each of the plurality of serrations 936 comprises a beveled surface 930. The beveled surfaces 930 slope downward from the face (e.g., right face 950) such that the thickness of the serration 936 varies from a maximum thickness, $t_1$, to a minimum thickness, $t_2$. Here, each beveled surface 930 is defined by at least one tapered portion 920 of a recessed portion (or alternatively, a serration 936). For example, each recessed portion 990 comprises a first edge 922 positioned along one face (e.g., right face 950) of the blade, a second edge 924 positioned along an opposing face (e.g., left face 952 in FIG. 9B) of the blade, and a plurality of tapered portions 920. In some cases, the first edge 922 of each recessed portion is of a shorter length than the second edge 924 of the recessed portion, such that the recessed portion 990 has a slant or slope between the opposing faces of the blade. Furthermore, and as shown in FIG. 9A, the tapered portions 920 taper outward from a corresponding one of the first and second edges 922, 924.

In some examples, each recessed portion 990 is positioned adjacent at least one of the serrations 936. In this example, the beveled portion 930 (or beveled surface 930) of the serration 936 slopes downward (out of the page) and defines the cutting edge of the serration. As seen, the cutting edge of the serration 936 has a thickness, $t_2$. Additionally, the recessed portion and/or the serration 936 has a maximum thickness, $t_1$, where the thickness, $t_1$, is greater than the thickness, $t_2$. It should be noted that the maximum thickness, $t_1$, of the recessed portion corresponds to the separation between the first and second edges 922 and 924 of the recessed portion. In this example, the recessed portion has a trapezoidal shape or configuration, but other configurations are contemplated in different embodiments. For instance, the recessed portion may comprise a rectilinear shape, triangular shape, concave shape or an arc-like curved shape, to name a few non-limiting examples.

Figure 9B:
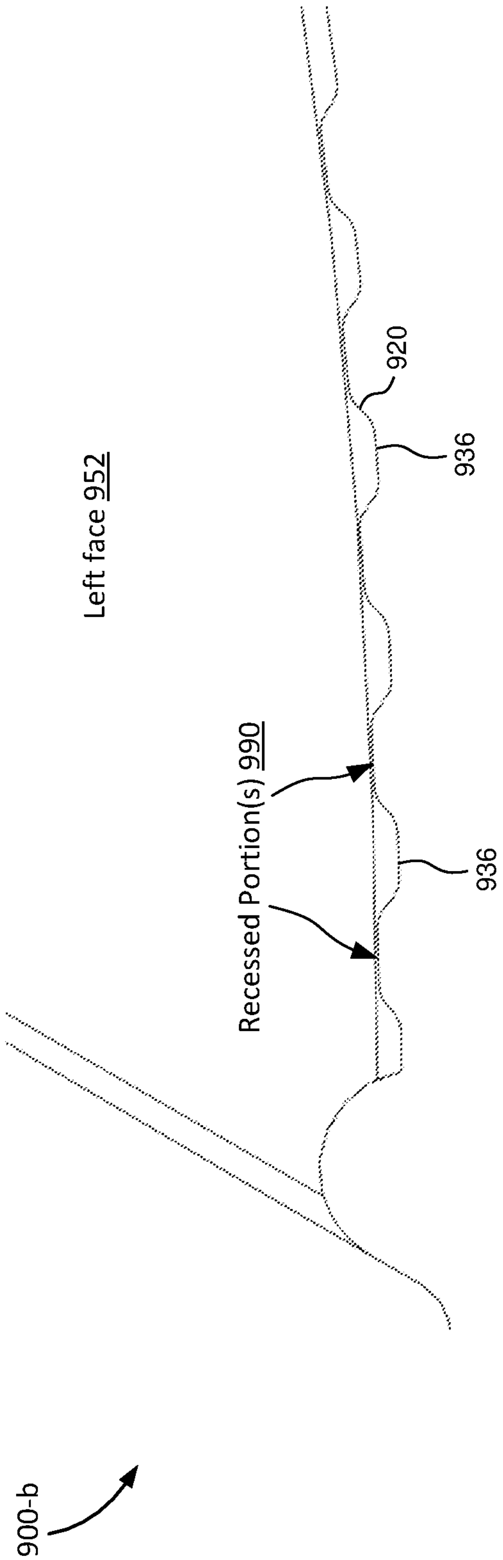
FIG. 9B shows a detailed left view of the serrations of the fixed blade knife of FIG. 1, according to various aspects of the present disclosure.

FIG. 9B depicts a detailed left view of the serrated portion 104 of the fixed blade knife of FIG. 1, according to various aspects of the present disclosure. FIG. 9B depicts a left face 952 of the knife blade, where the left face 952 is opposite the right face 950 of the knife blade. In some examples, only one of the faces (e.g., right face) defines a plurality of recessed portions 990 of the serrated portion 104 of the knife blade. In some aspects, FIG. 9B depicts a rear view of the serrated portion 104 previously described in relation to FIG. 9A.

Figure 10:
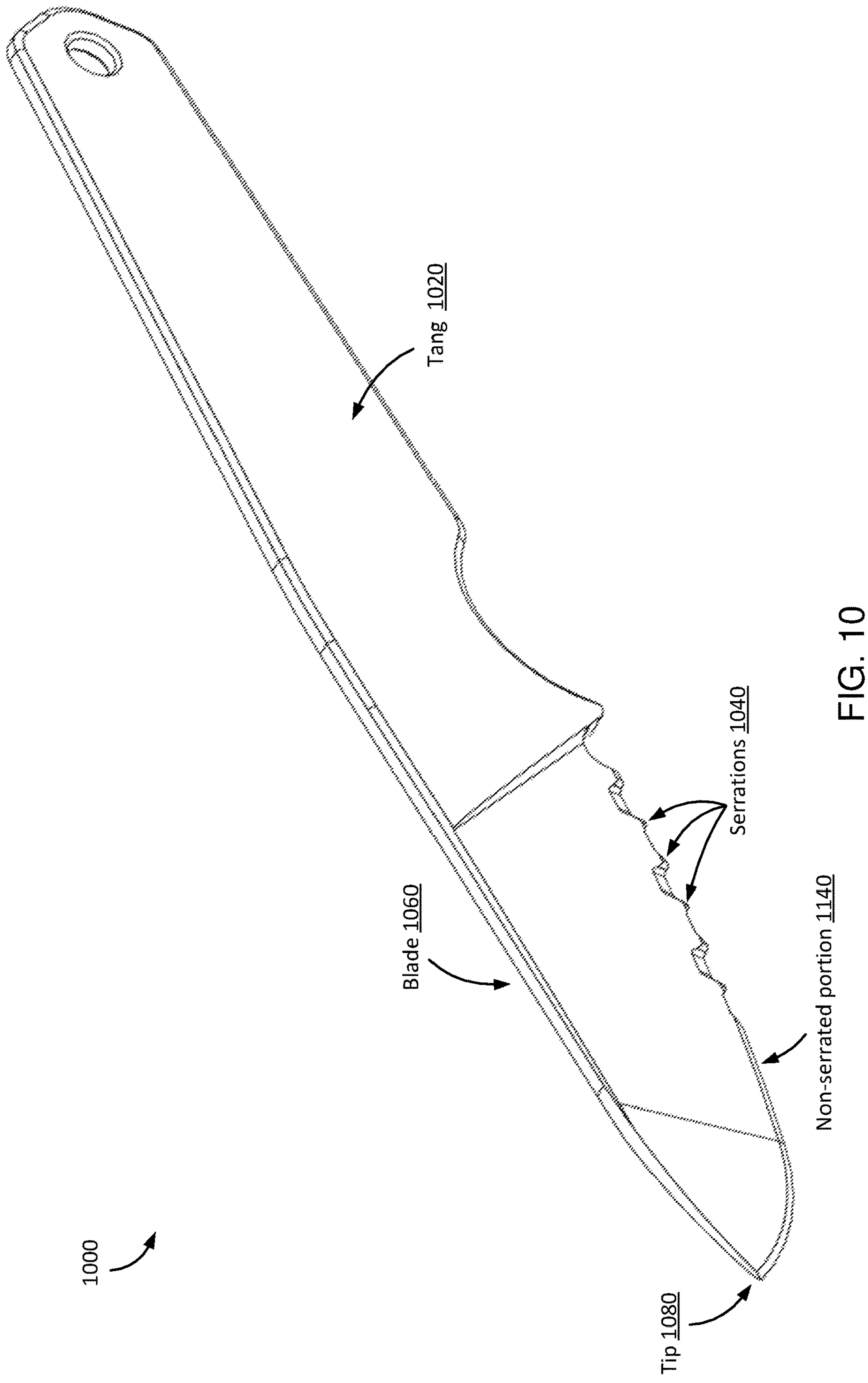
FIG. 10 is a perspective top view of a fixed blade knife having a tang and a serrated blade having a second pattern of serrations, according to various aspects of the present disclosure.
Figure 11:
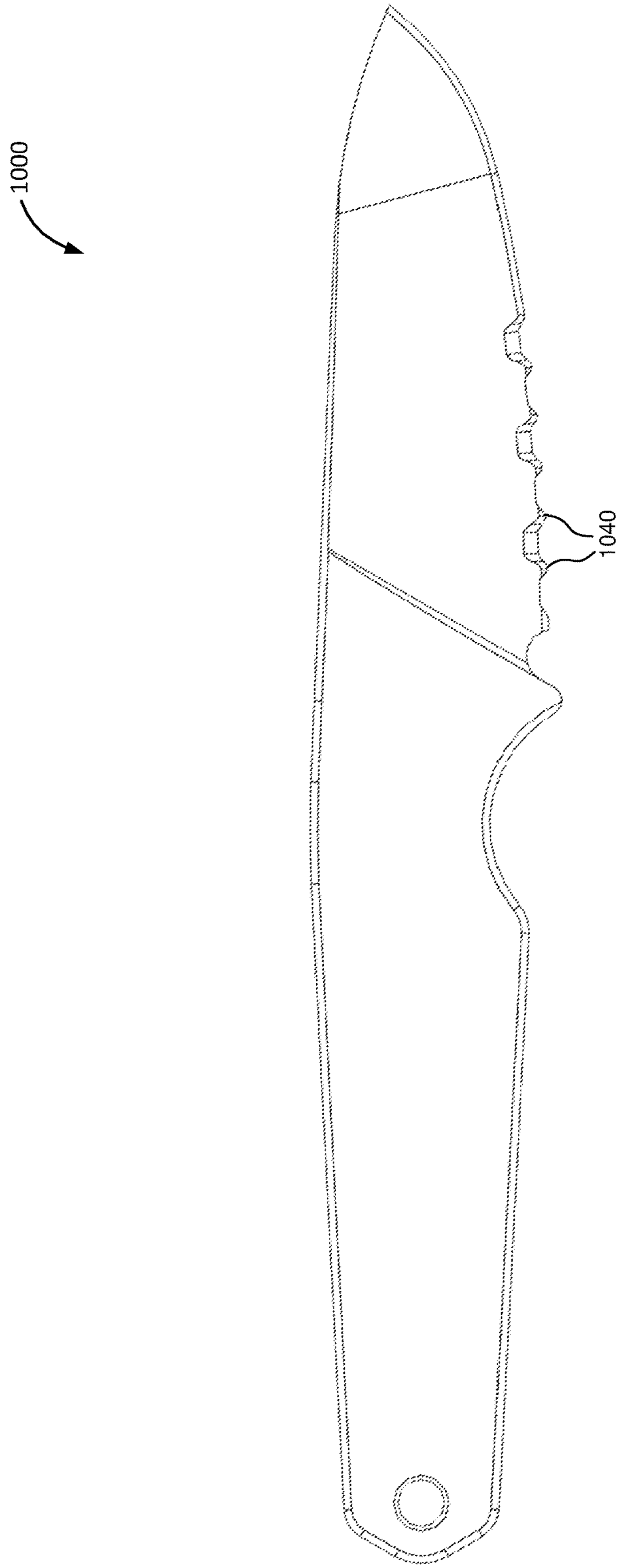
FIG. 11 is a left view of the fixed blade knife of FIG. 10, according to various aspects of the present disclosure.
Figure 12:
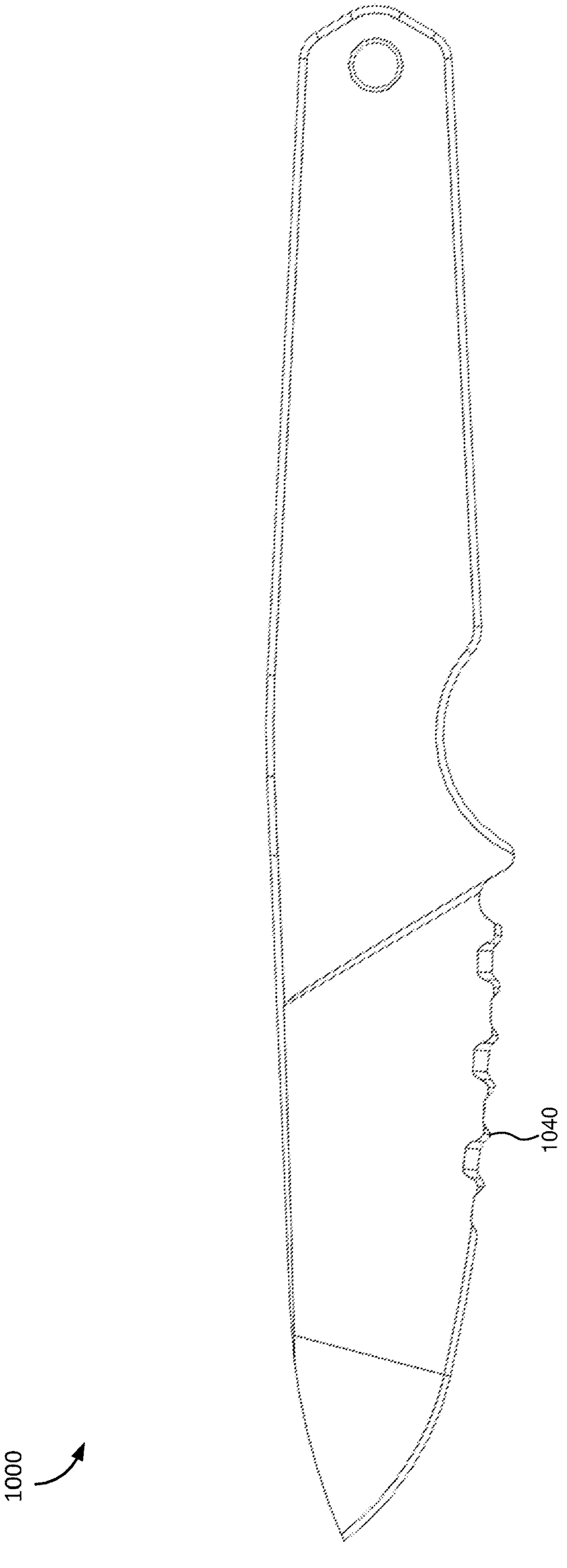
FIG. 12 is a right view of the fixed blade knife of FIG. 10, according to various aspects of the present disclosure.
Figure 13:
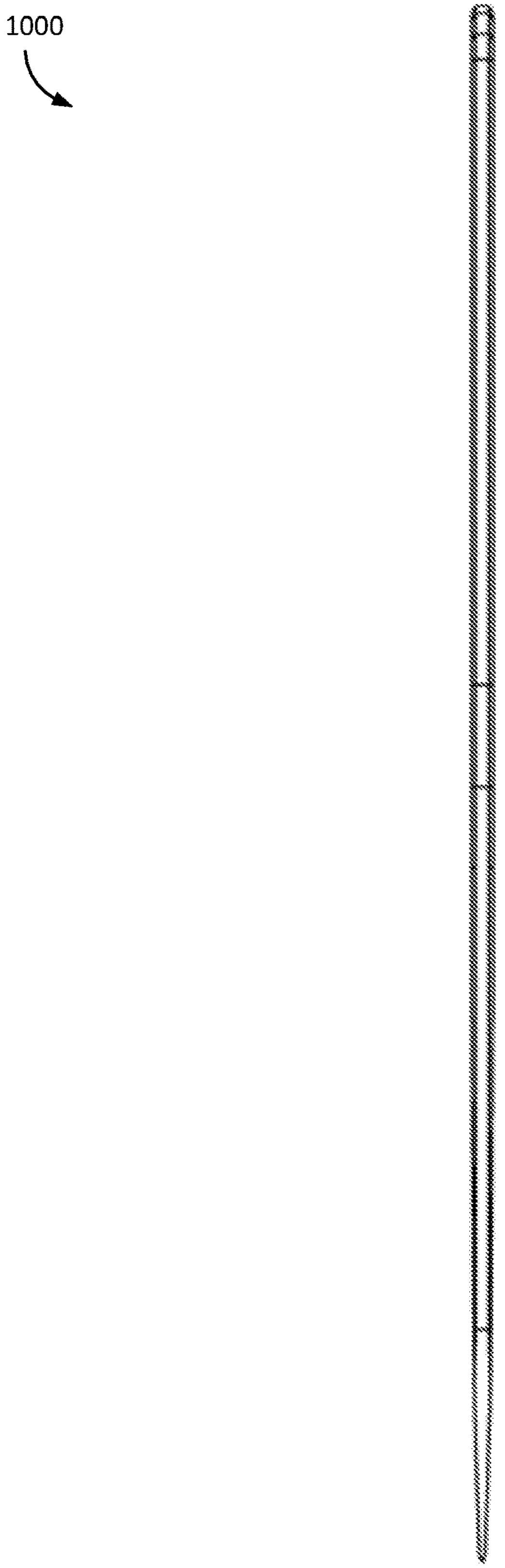
FIG. 13 is a top view of the fixed blade knife of FIG. 10, according to various aspects of the present disclosure.
Figure 14:
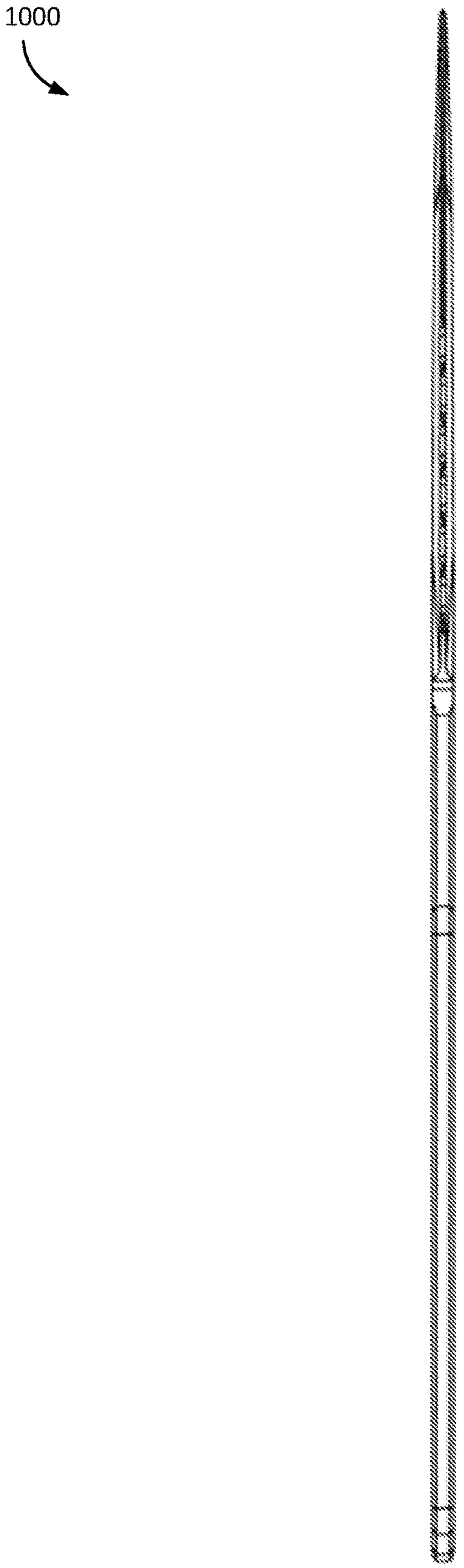
FIG. 14 is a bottom view of the fixed blade knife of FIG. 10, according to various aspects of the present disclosure.
Figure 15:
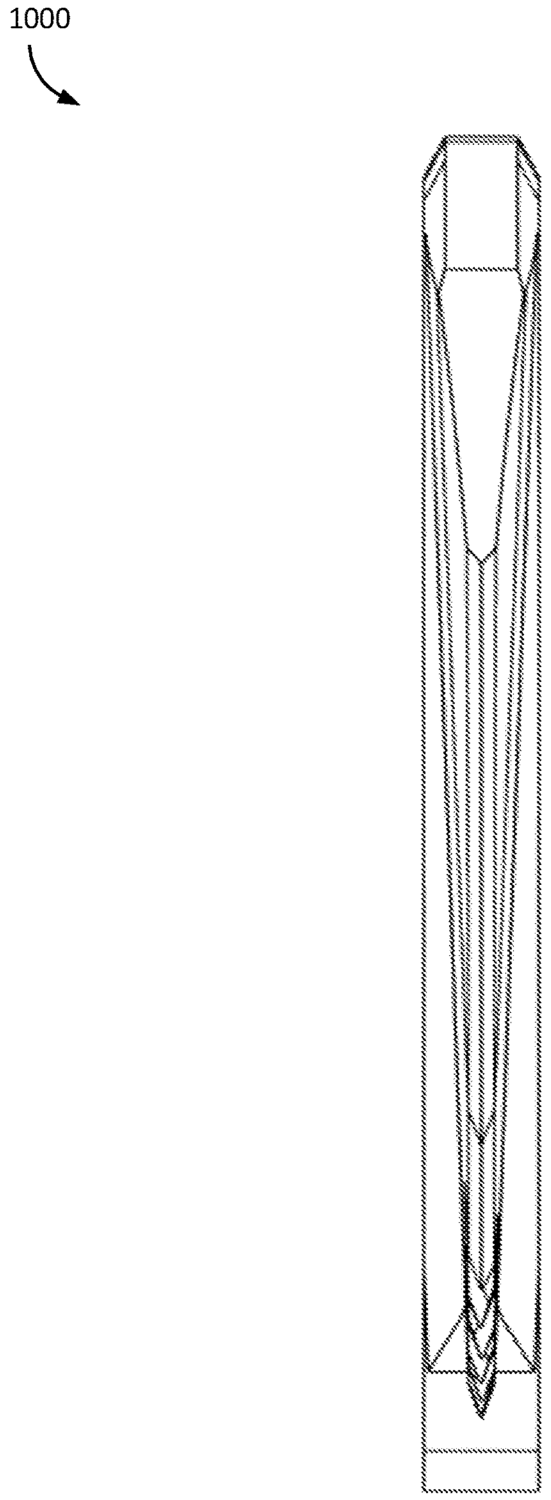
FIG. 15 is a front view of the fixed blade knife of FIG. 10, according to various aspects of the present disclosure.
Figure 16:
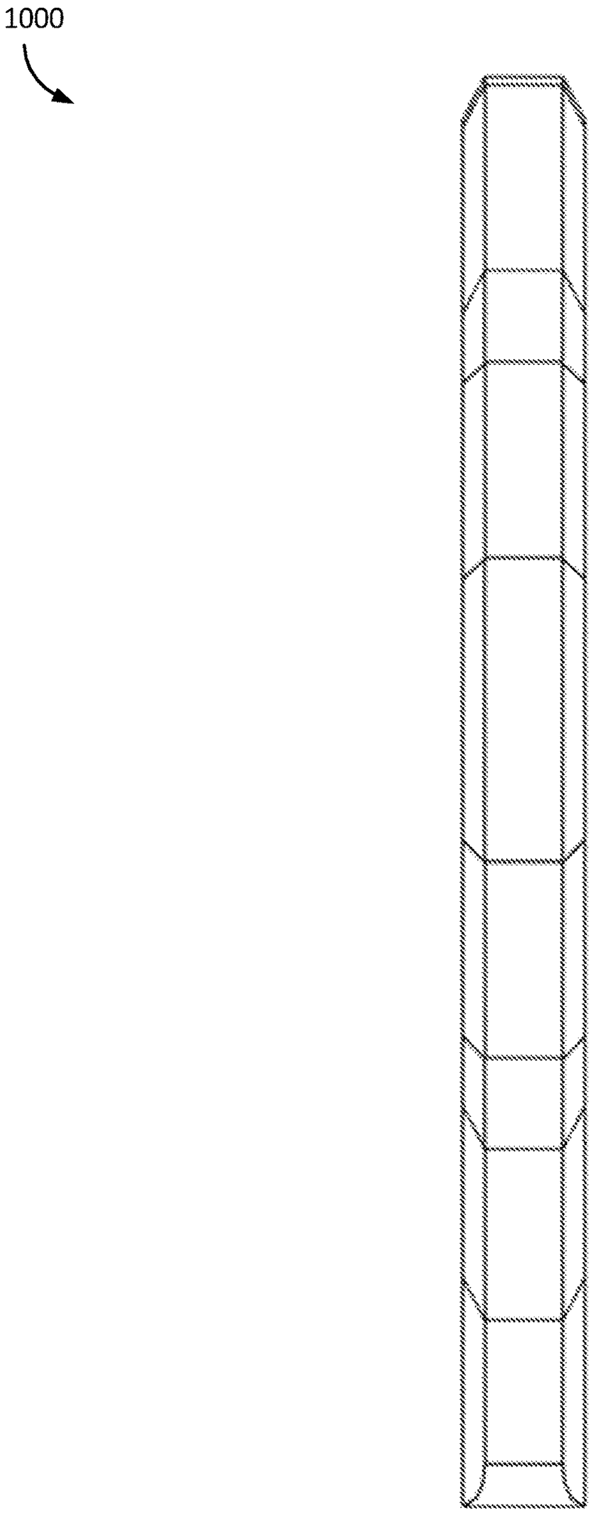
FIG. 16 is a rear view of the fixed blade knife of FIG. 10, according to various aspects of the present disclosure.

FIG. 10 is a perspective top view of a fixed blade knife 1000 having a tang 1020 and a serrated blade 1060 having a second pattern of serrations 1040, according to various aspects of the present disclosure. In some cases, the fixed blade knife 1000 implements one or more aspects of the fixed blade knife 100 previously described in relation to FIGS. 1-9B. In some cases, the tang 1020 and the blade 1060 may be formed as a unitary or monolithic piece. Alternatively, the tang 1020 and the blade 1060 may be formed as separate pieces and joined or coupled together (e.g., welded). While not shown, a handle comprising one or more scales may be formed around the tang 1020, where the one or more scales are positioned around the tang 1020. In this example, the blade 1060 comprises a first pattern of serrations 1040 positioned along a cutting edge of the blade 1060. Specifically, the serrations 1040 are positioned between the tang 1020 and a tip 1080 of the blade 1060, where the tip 1080 is located at the distal end of the blade 1060.

FIGS. 11-16 depict left, right, top, bottom, front, and rear views, respectively, of the fixed blade knife 100 of FIG. 10.

Figure 17A:
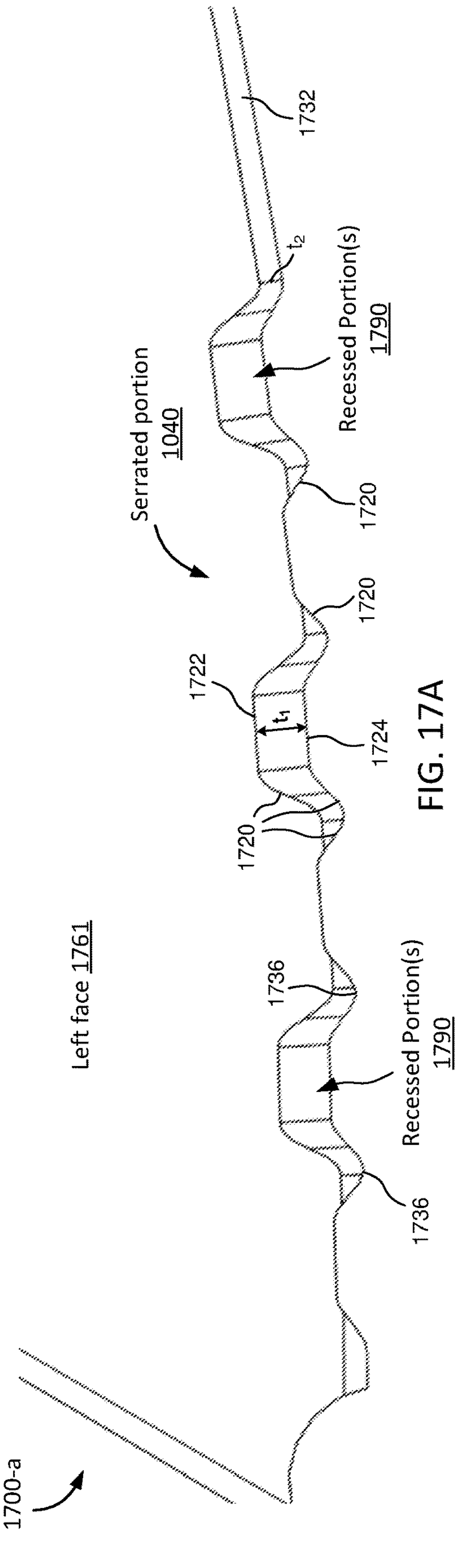
FIG. 17A shows a detailed left view of the serrations of the fixed blade knife of FIG. 10, according to various aspects of the present disclosure.
Figure 17B:
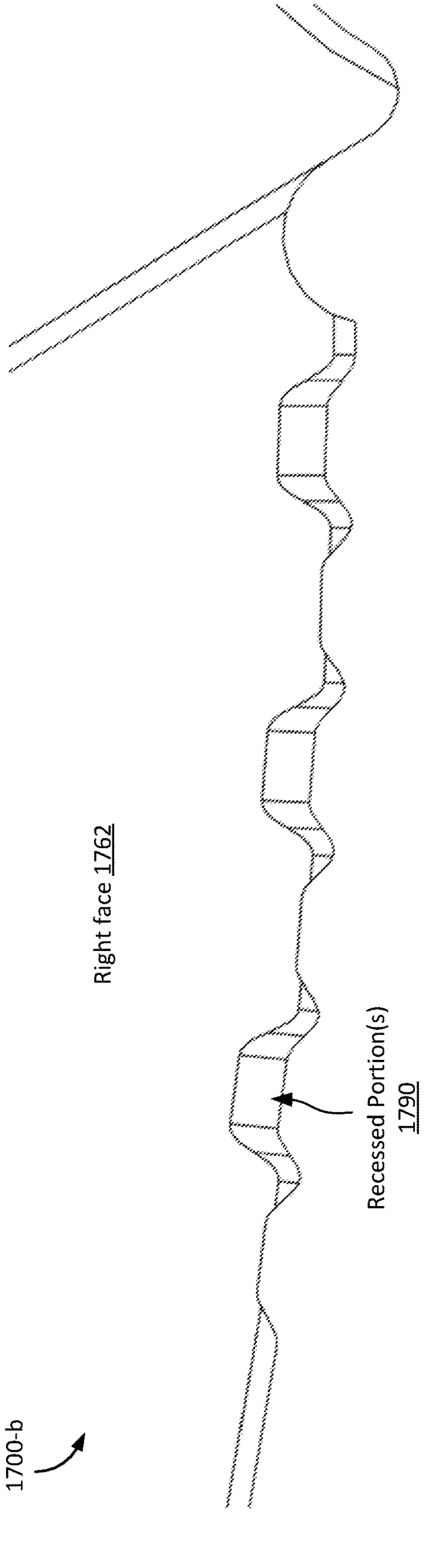
FIG. 17B shows a detailed right view of the serrations of the fixed blade knife of FIG. 10, according to various aspects of the present disclosure.

FIGS. 17A and 17B illustrate detailed left and right views 1700-*a* and 1700-*b*, respectively, of the serrated portion 1040, according to various aspects of the disclosure. FIG. 17A depicts left face 1761 of the knife blade showing a plurality of serrations 1736 positioned along the cutting edge of the blade. Here, the plurality of serrations 1736 are positioned near the proximal end of the blade. Specifically, the serrations 1736 are positioned between the proximal end of the blade and a non-serrated portion 1732 (or straight edge portion 1732), where the tip 1080 of the knife blade is positioned at the distal end of the non-serrated portion 1732. In this example, the non-serrated portion 1732 is a substantially straight-edged cutting portion having a uniform or substantially uniform thickness, $t_2$.

FIG. 17B depicts right face 1762 of the knife blade, where the right face 1762 also defines (or comprises) a plurality of recessed portions 1790. In some cases, the recessed portions 1790 of the left and right faces 1761 and 1762 of the knife blade are formed in an alternating manner. That is, the knife blade described in relation to FIGS. 10-18 comprises a serration pattern which includes recessed portions 1790 on both the left and right faces of the knife blade, unlike the serration pattern in FIGS. 1-9B, where the recessed portions are formed on a single face of the knife blade. As seen, the serration pattern (or serrated portion 1040) comprises a plurality of serrations 1736, each defined by one or more recessed portions 1790. In this example, each recessed portion 1790 on one face (e.g., left face) of the knife blade is positioned adjacent at least one recessed portion 1790 on an opposing face (e.g., right face) of the knife blade. Furthermore, each recessed portion 1790 comprises a first edge (e.g., first edge 1722) positioned along one face (e.g., left face 1761) of the blade and a second edge (e.g., second edge 1724) positioned along an opposing face (e.g., right face 1762) of the blade. In some cases, a tapered portion 1720 is positioned between the first edge 1722 on one of the faces of the knife blade and a second, adjacent edge 1724 on an opposing face of the knife blade. Additionally, another tapered portion 1720 extends between the second edge 1724 on one of the faces (e.g., left face) of the knife blade and a first, adjacent edge 1722 on an opposing face (e.g., right face) of the knife blade, for instance, if the recessed portion 1790 is not one of the recessed portions on the proximal or distal end of the serrated portion 1040. In some cases, if the recessed portion 1790 is one of the end recessed portions (i.e., on the proximal or distal end of the serrated portion 1040), at least one of the tapered portions 1720 is joined to the straight-edged cutting portion (or straight edge portion 1732) of the knife blade. In some cases, a recessed portion 1790 is defined by two edges on opposing faces of the knife blade and one or more tapered portions, where at least one of the one or more tapered portions is in common with an adjacent recessed portion. In this way, the tapered portions 1720 form the serrated cutting edge (or serrations 1736) of the knife blade.

In this example, the recessed portions 1790 have a generally trapezoidal shape or configuration, but other shapes/configurations are contemplated in different embodiments.

For instance, the recessed portions 1790 may comprise a rectilinear configuration, triangular configuration, a concave or an arc-like curved configuration, to name a few non-limiting examples. Additionally, or alternatively, the knife blade may comprise recessed portions 1790 of two or more shapes or configurations. For instance, the knife blade may include one or more recessed portions 1790 having a first shape (e.g., trapezoidal shape) and one or more recessed portions 1790 having a second, different shape (e.g., curved shape).

Figure 18:
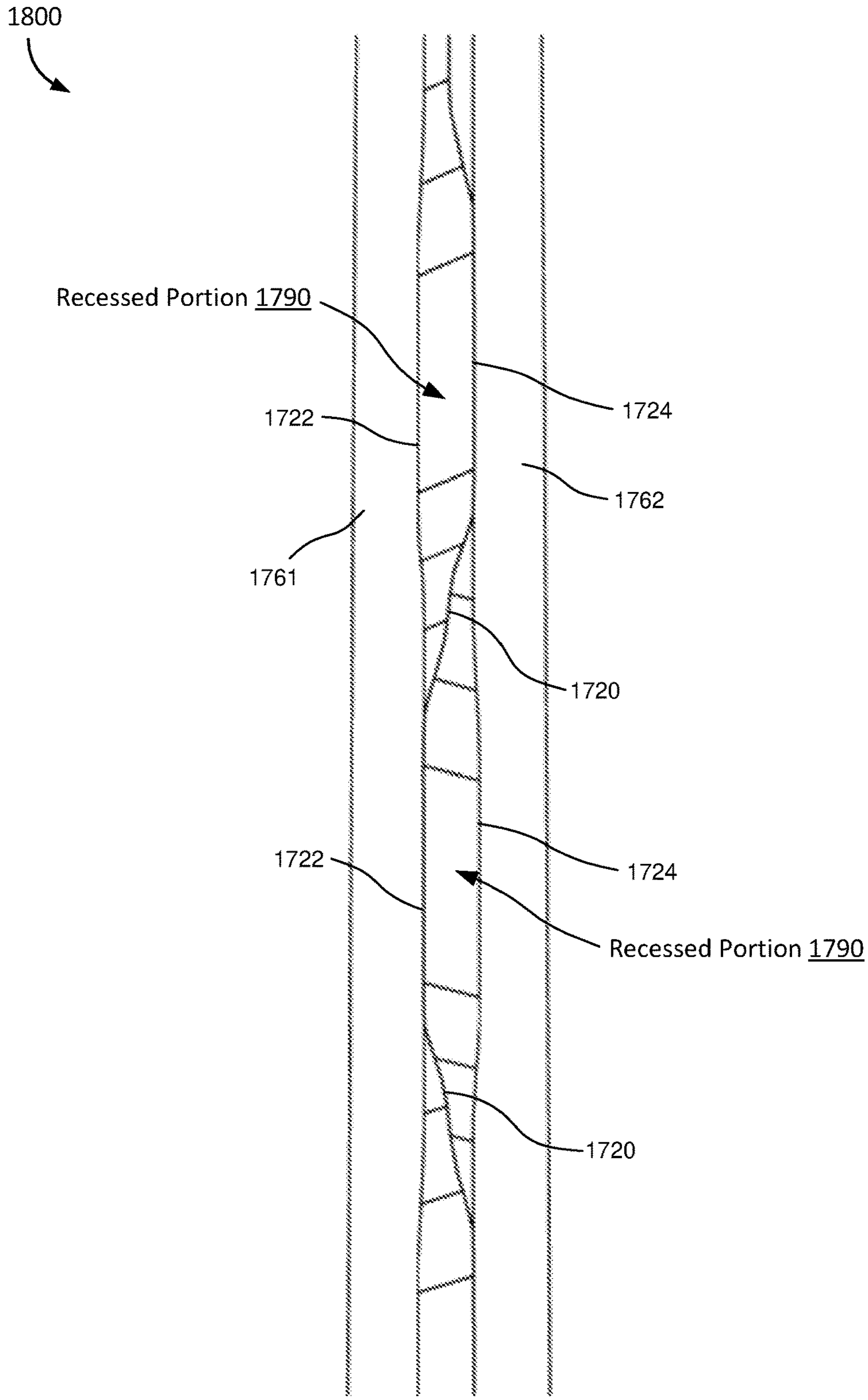
FIG. 18 shows a detailed bottom view of the serrations of the fixed blade knife of FIG. 10, according to various aspects of the present disclosure.
Figure 19:
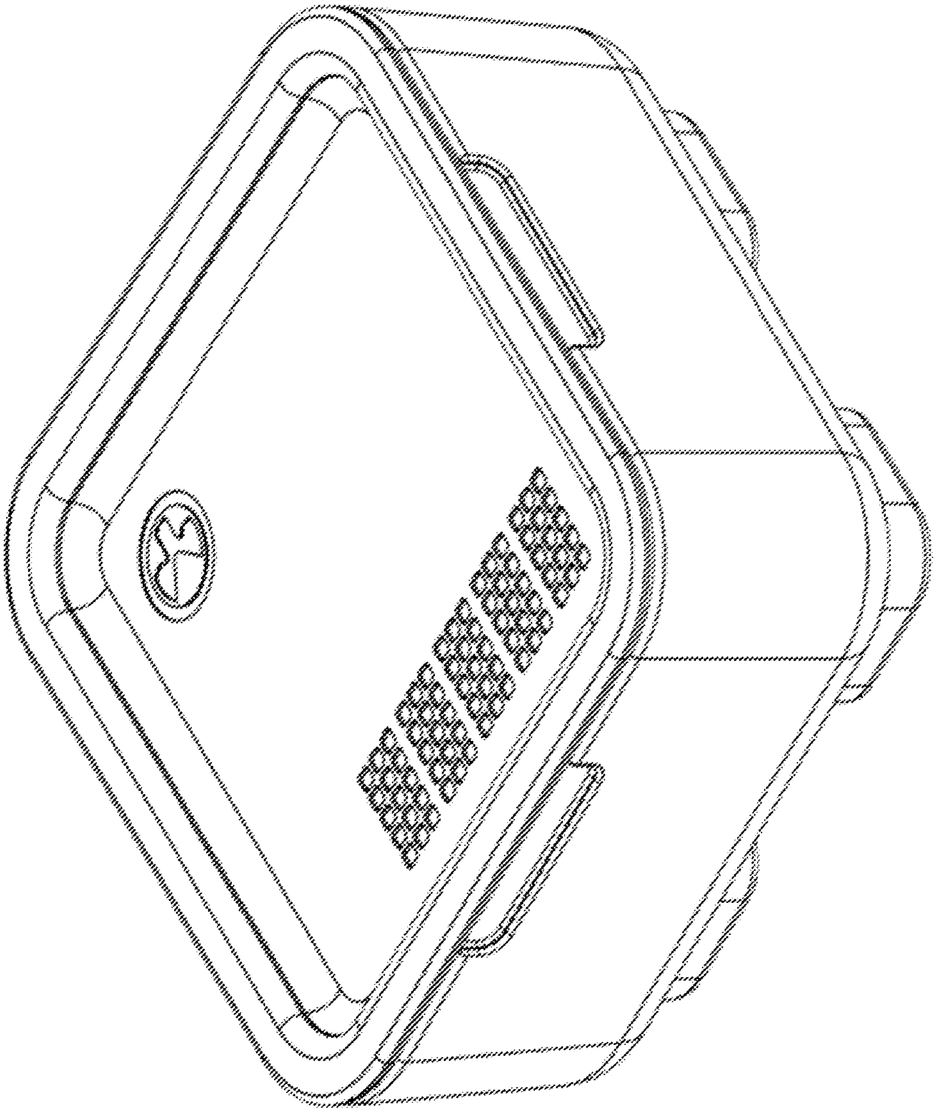
FIG. 19 illustrates a perspective top view of a first storage container, according to various aspects of the present disclosure.
Figure 20:
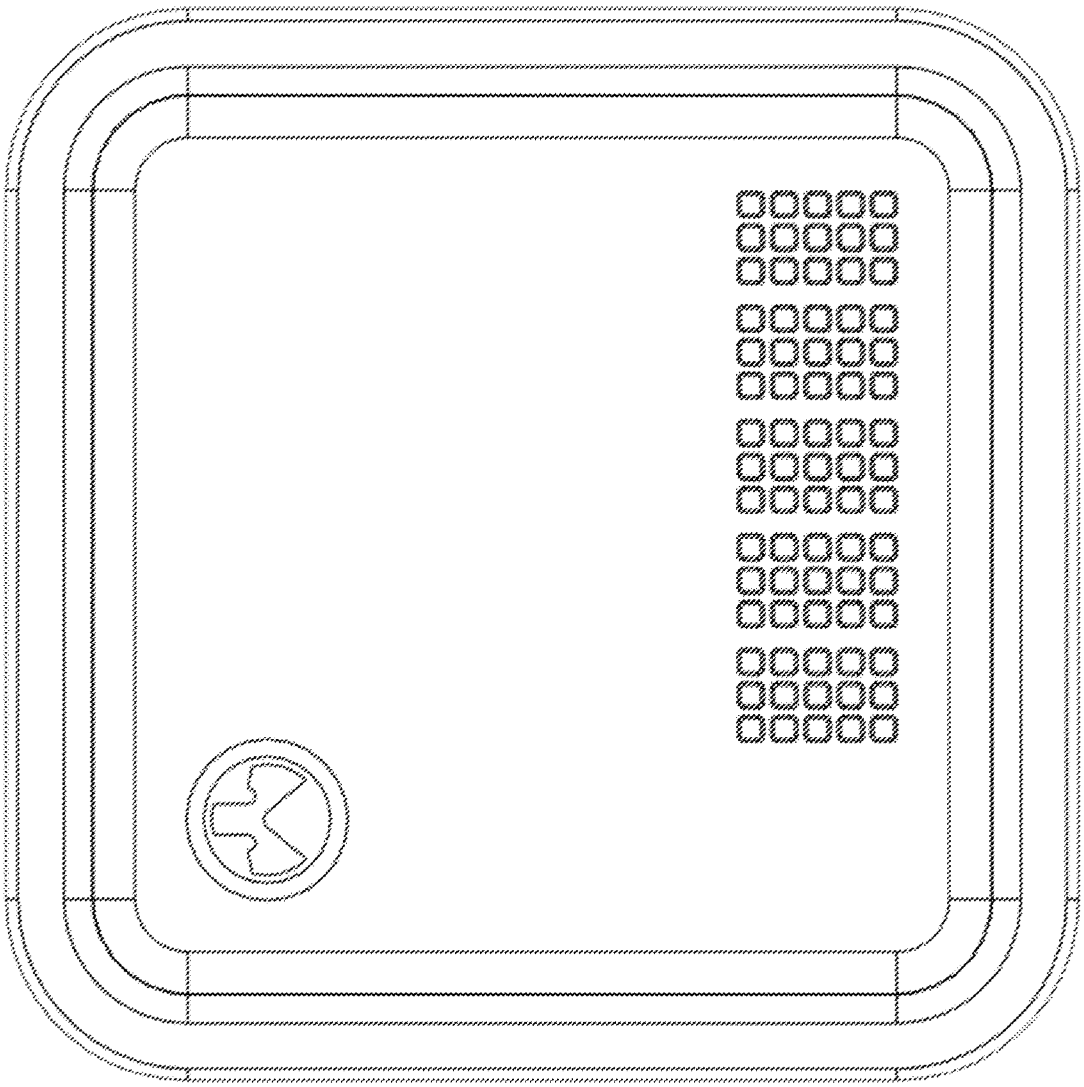
FIG. 20 illustrates a top view of the first storage container in FIG. 19, according to various aspects of the present disclosure.
Figure 21:
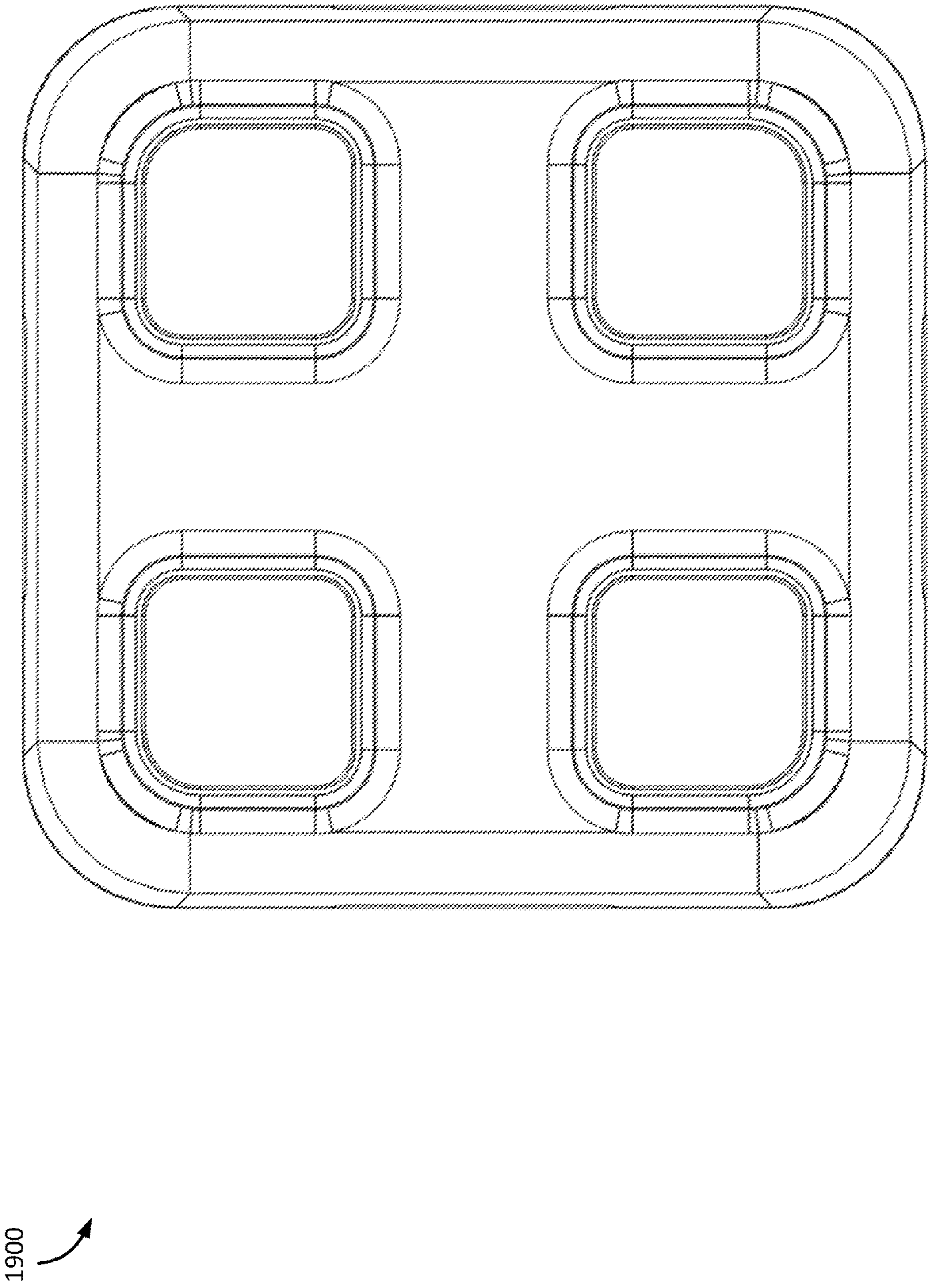
FIG. 21 illustrates a bottom view of the first storage container in FIG. 19, according to various aspects of the present disclosure.
Figure 22:
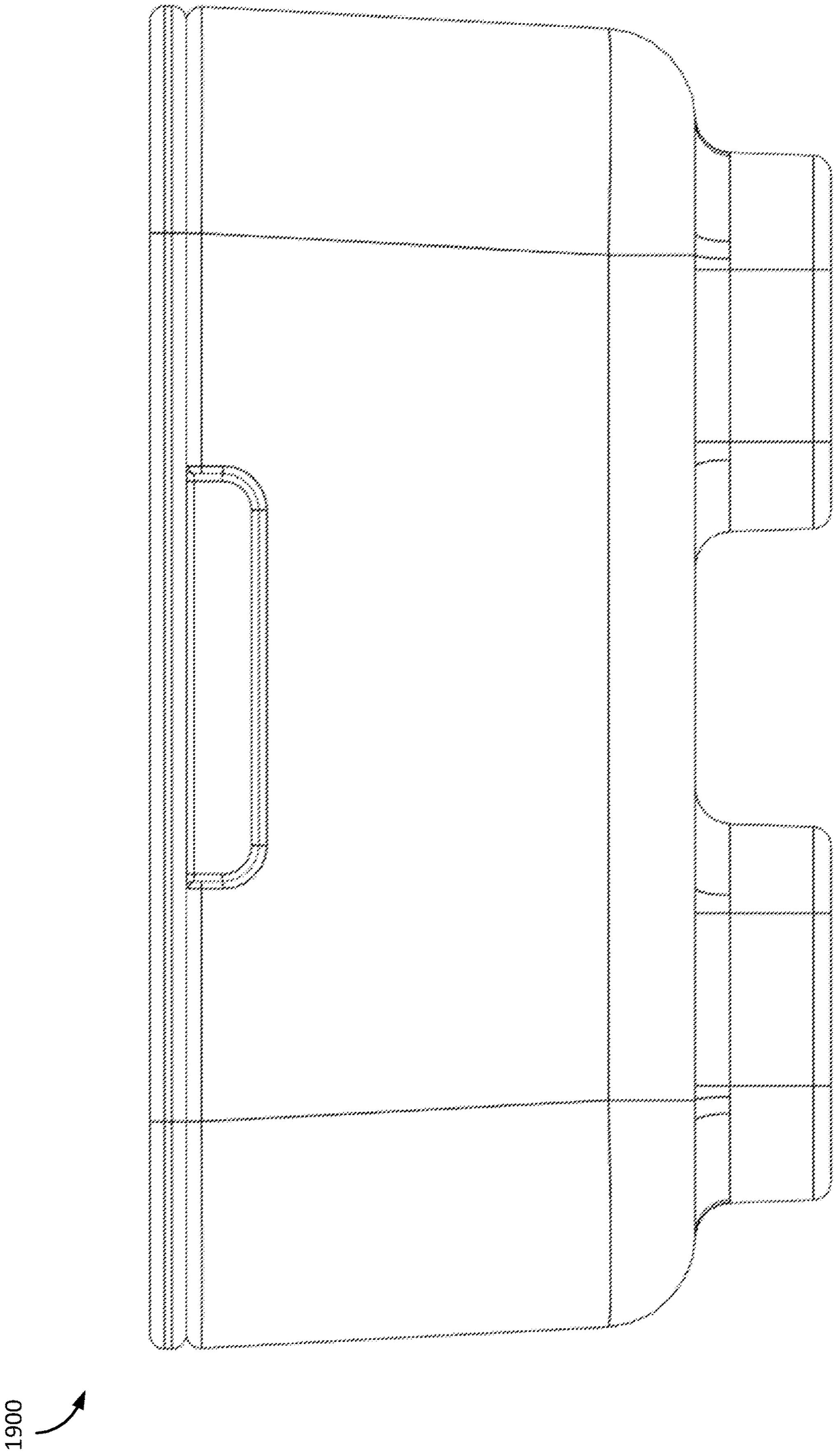
FIG. 22 illustrates a first side view of the first storage container in FIG. 19, according to various aspects of the present disclosure.
Figure 23:
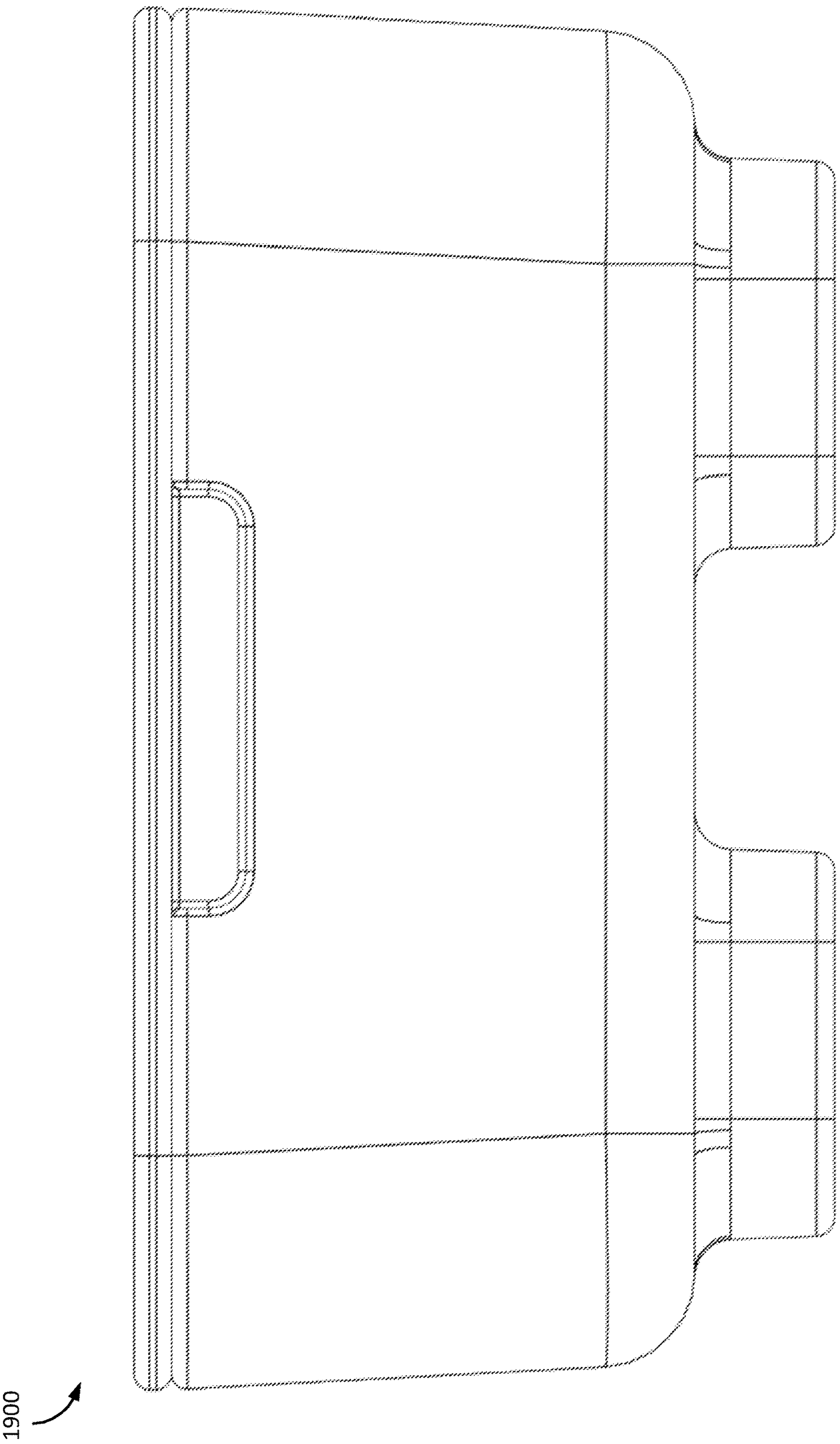
FIG. 23 illustrates a second side view of the first storage container in FIG. 19, according to various aspects of the present disclosure.
Figure 24:
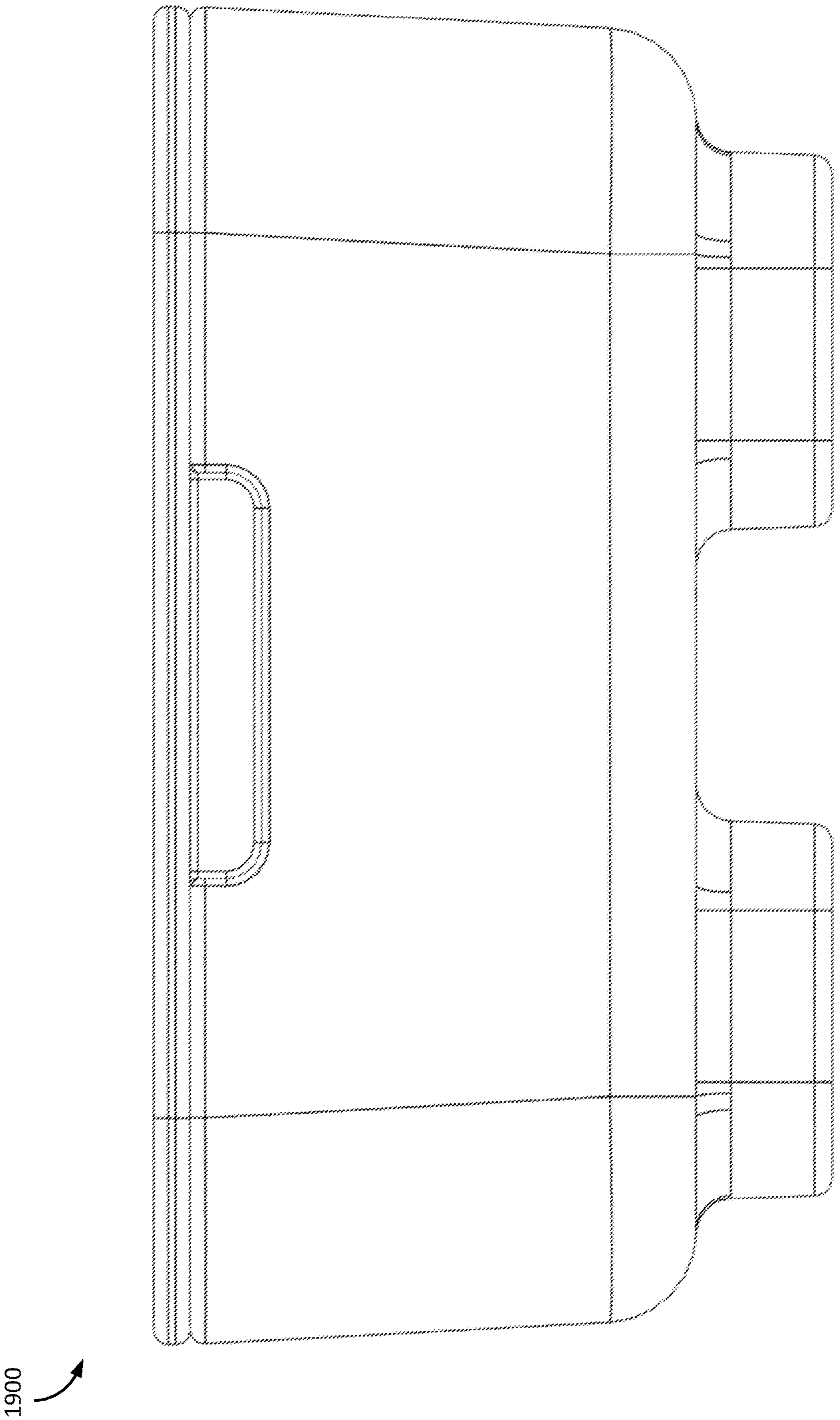
FIG. 24 illustrates a third side view of the first storage container in FIG. 19, according to various aspects of the present disclosure.
Figure 25:
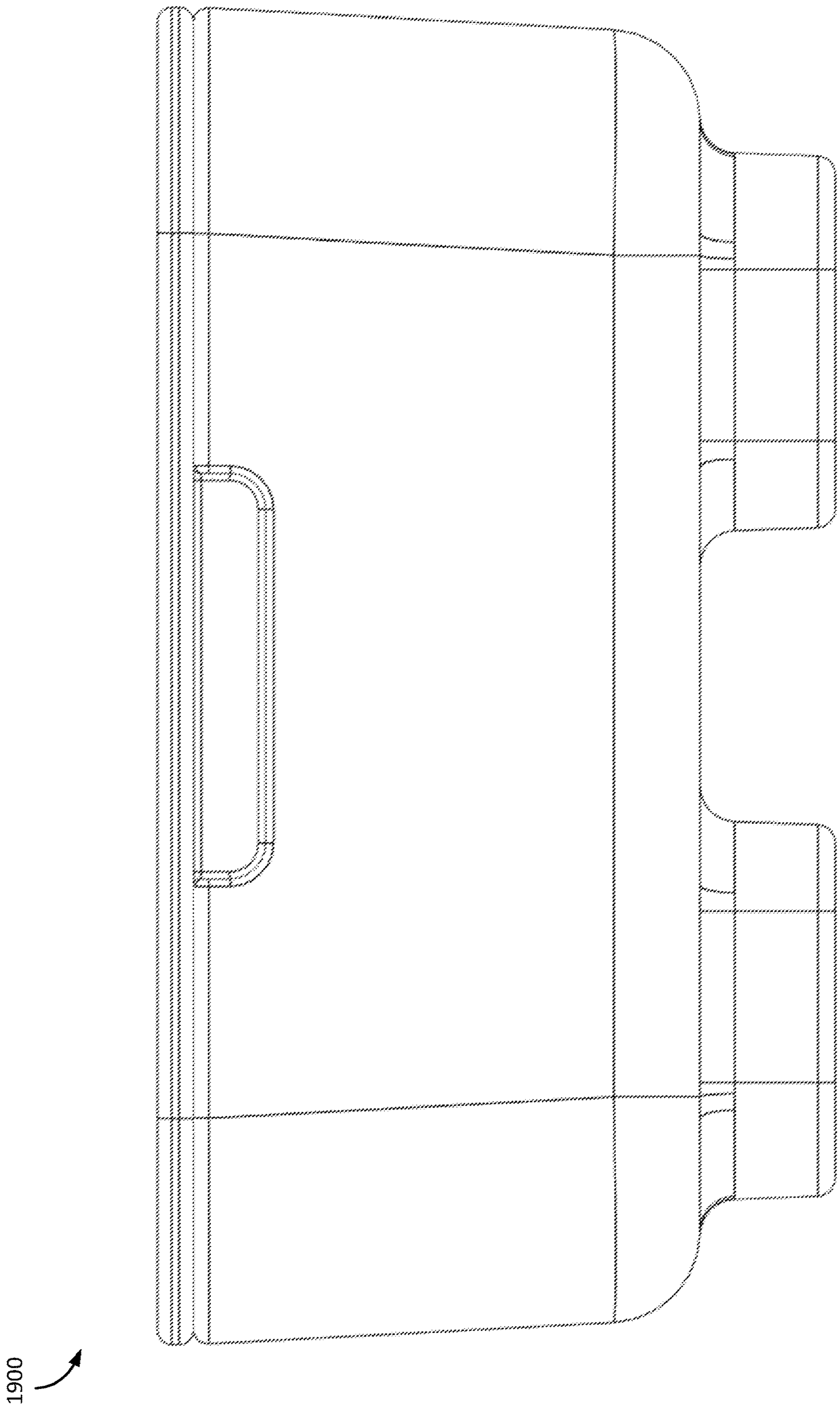
FIG. 25 illustrates a fourth side view of the first storage container in FIG. 19, according to various aspects of the present disclosure.
Figure 26:
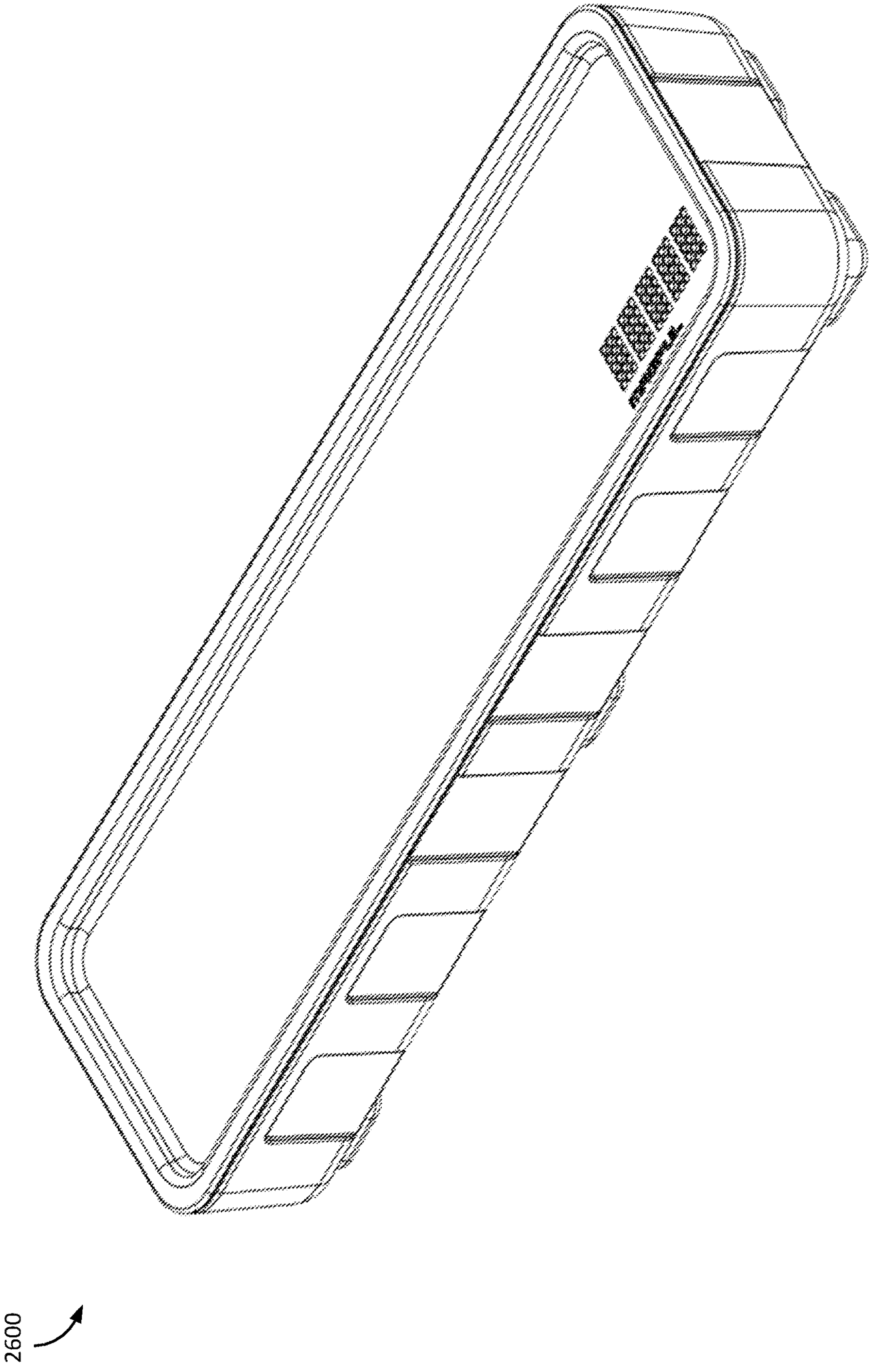
FIG. 26 illustrates a perspective top view of a second storage container, according to various aspects of the present disclosure.
Figure 27:
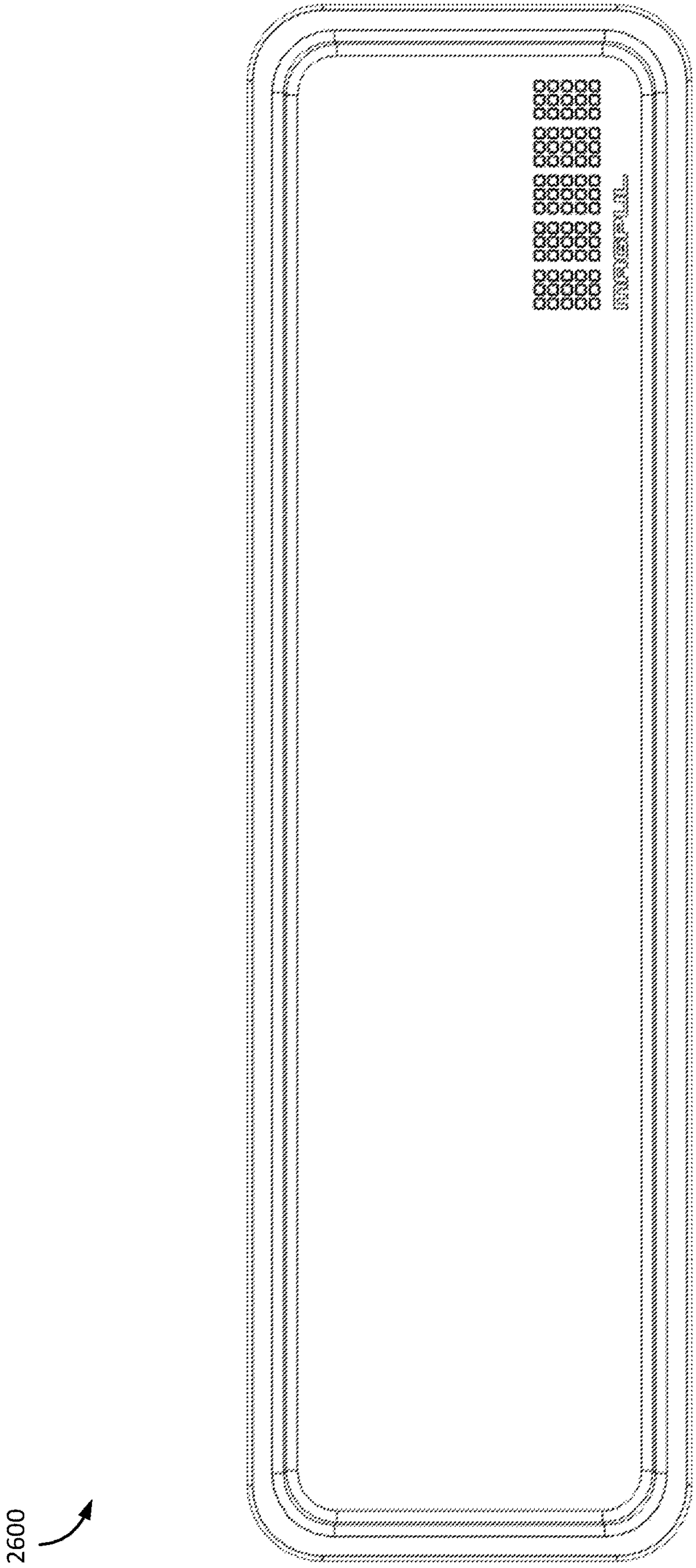
FIG. 27 illustrates a top view of the second storage container in FIG. 26, according to various aspects of the present disclosure.
Figure 28:
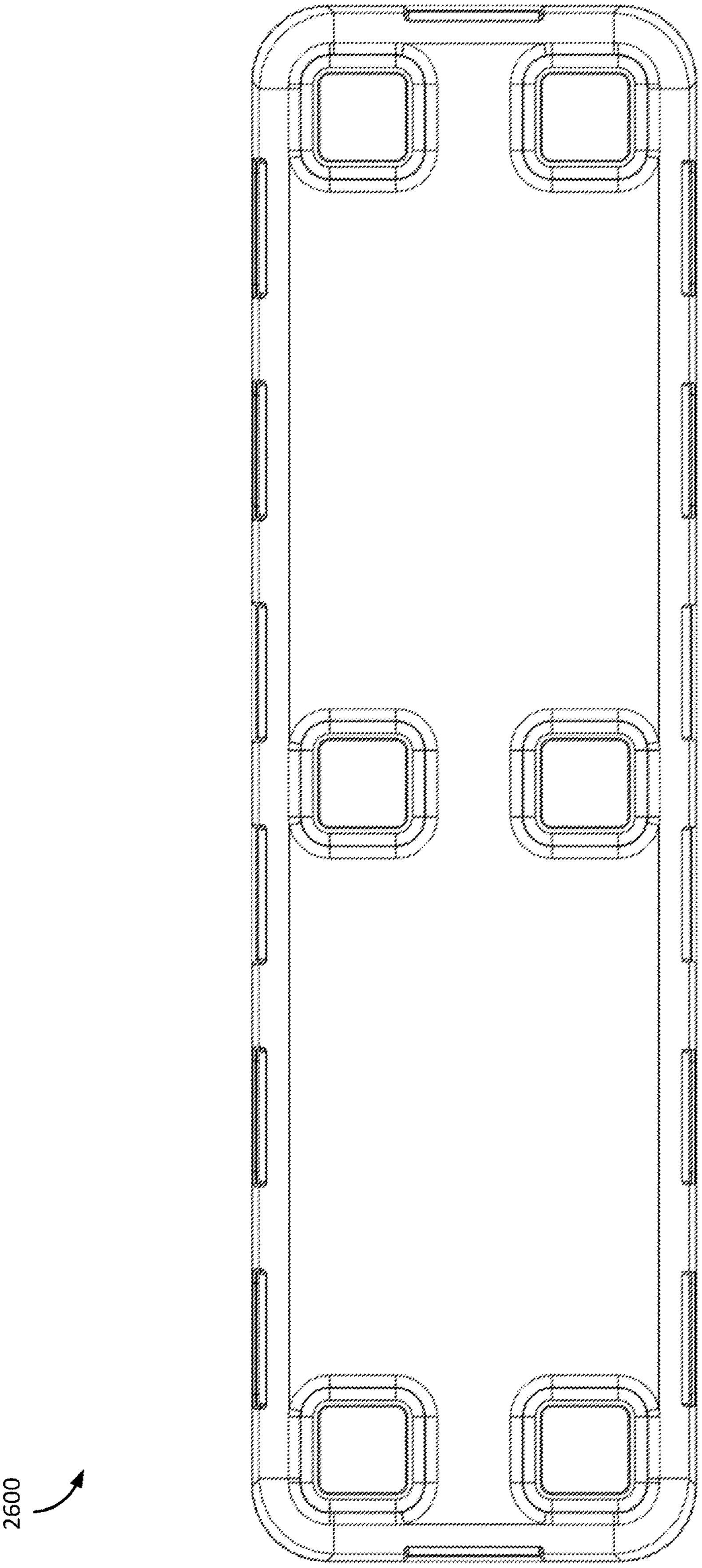
FIG. 28 illustrates a bottom view of the second storage container in FIG. 26, according to various aspects of the present disclosure.
Figure 29:
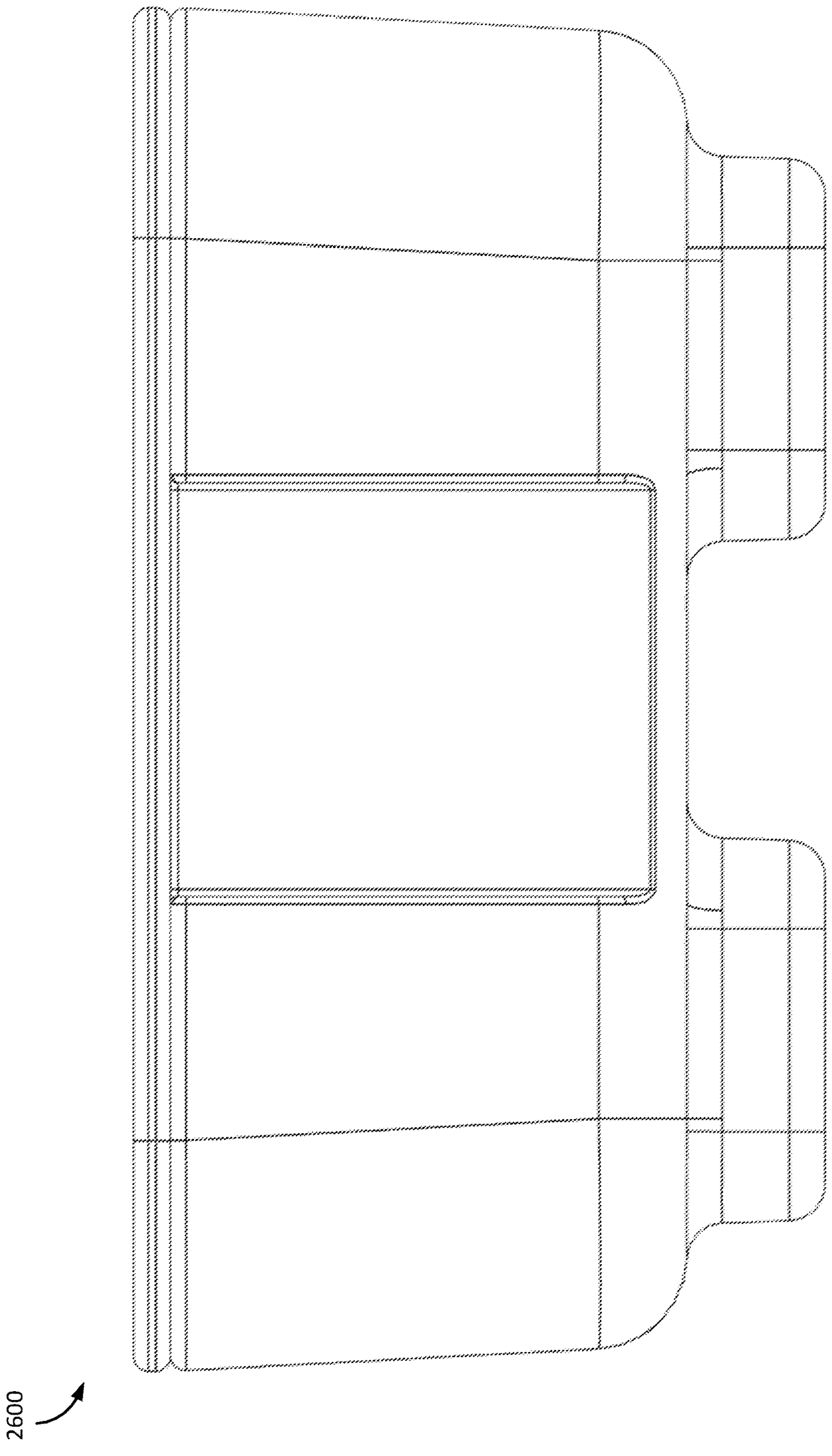
FIG. 29 illustrates a first side view of the second storage container in FIG. 26, according to various aspects of the present disclosure.
Figure 30:
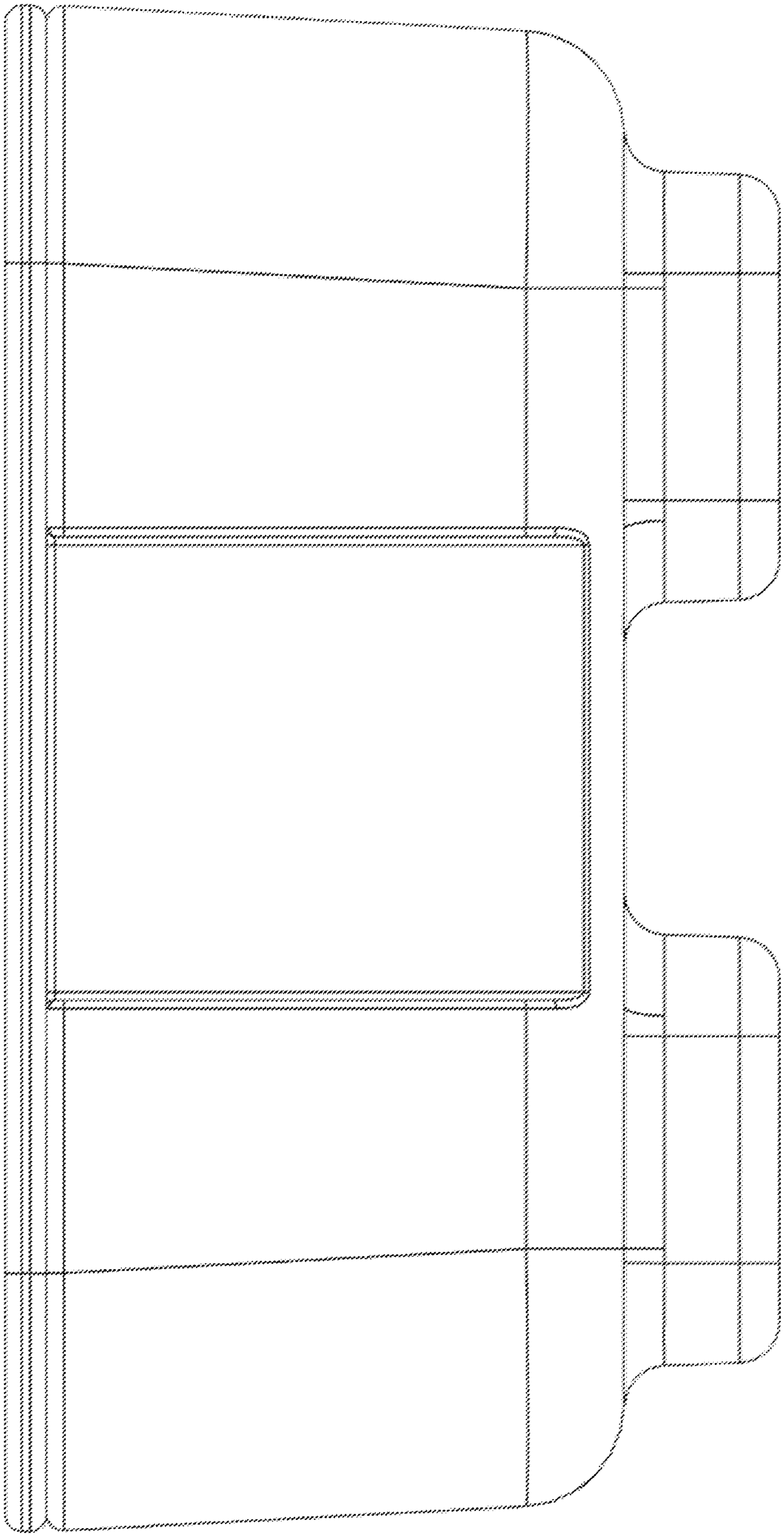
FIG. 30 illustrates a second side view of the second storage container in FIG. 26, according to various aspects of the present disclosure.
Figure 31:
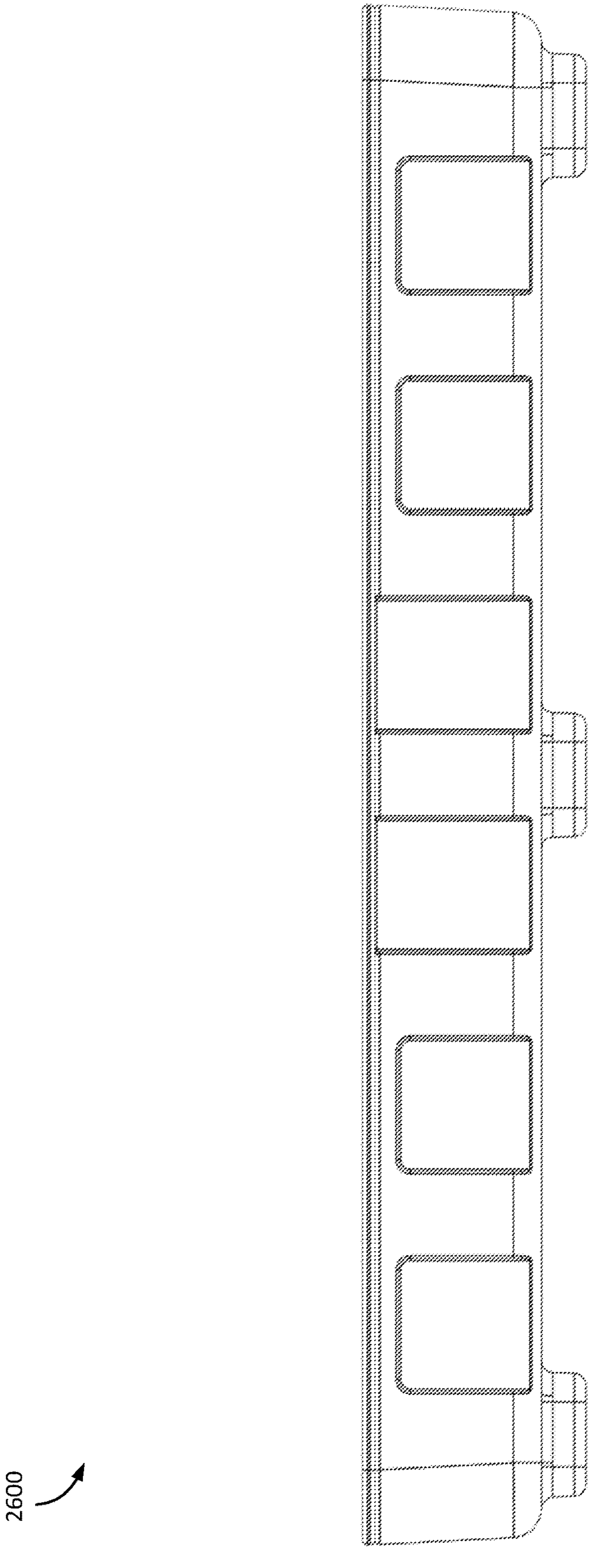
FIG. 31 illustrates a third side view of the second storage container in FIG. 26, according to various aspects of the present disclosure.
Figure 32:
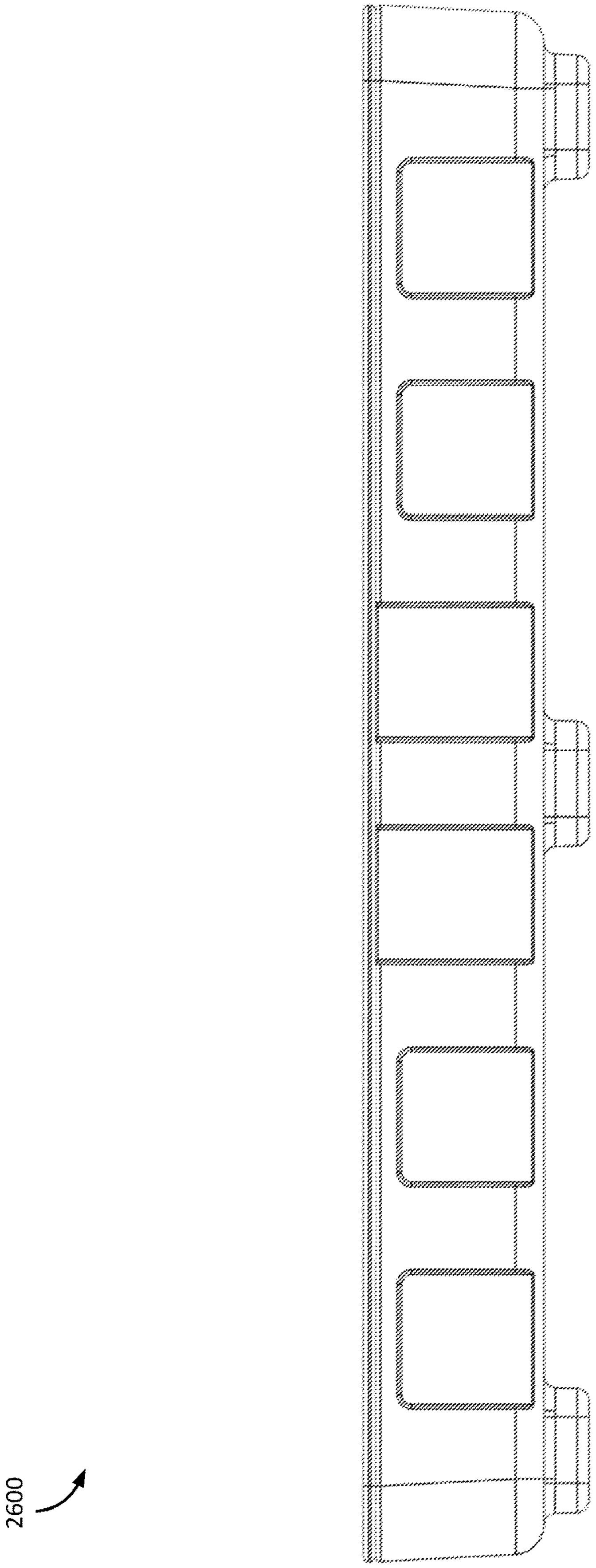
FIG. 32 illustrates a fourth side view of the second storage container in FIG. 26, according to various aspects of the present disclosure.
Figure 33:
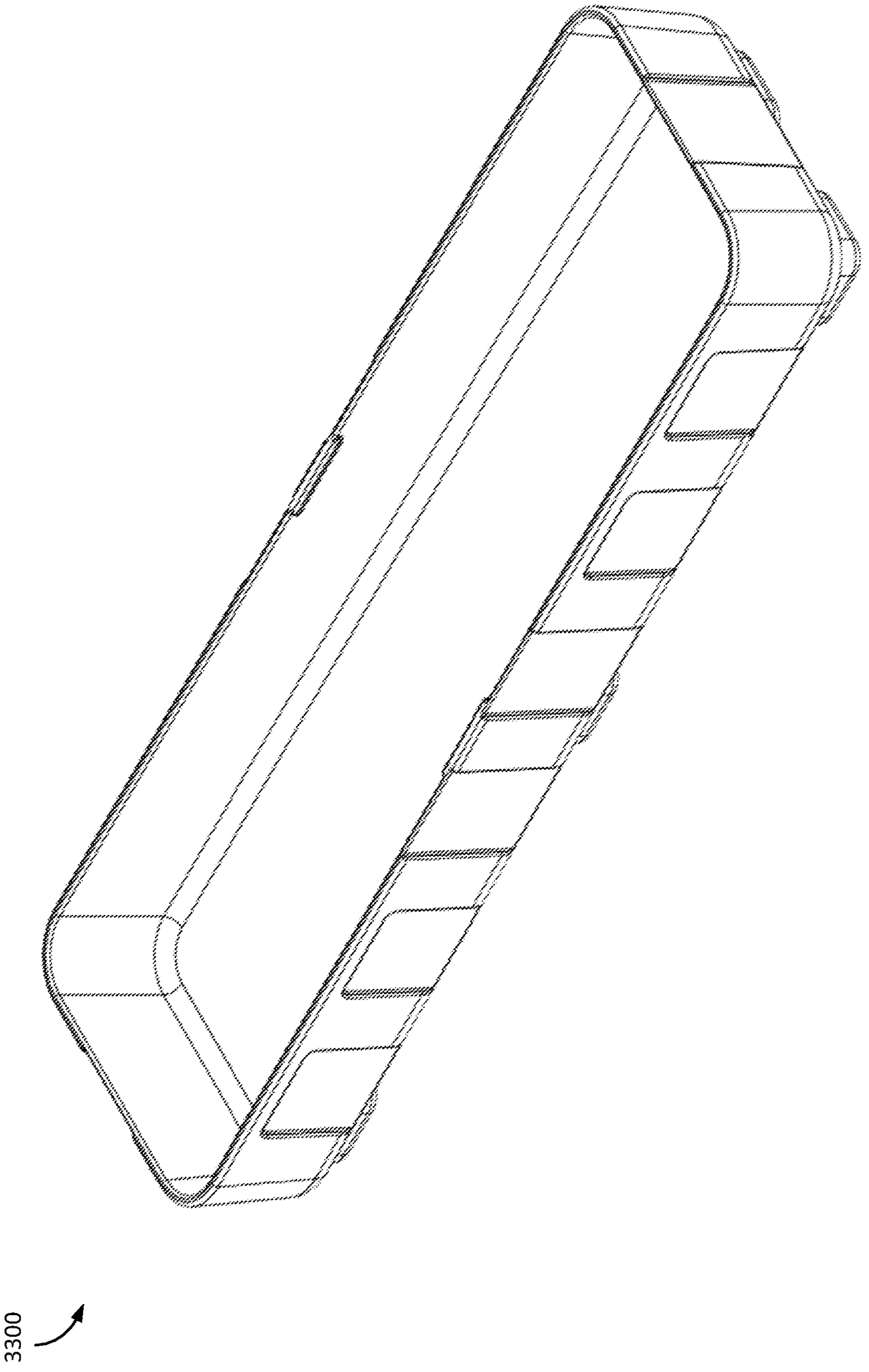
FIG. 33 illustrates a perspective top view of the second storage container in FIG. 26 with the lid removed, according to various aspects of the present disclosure.
Figure 34:
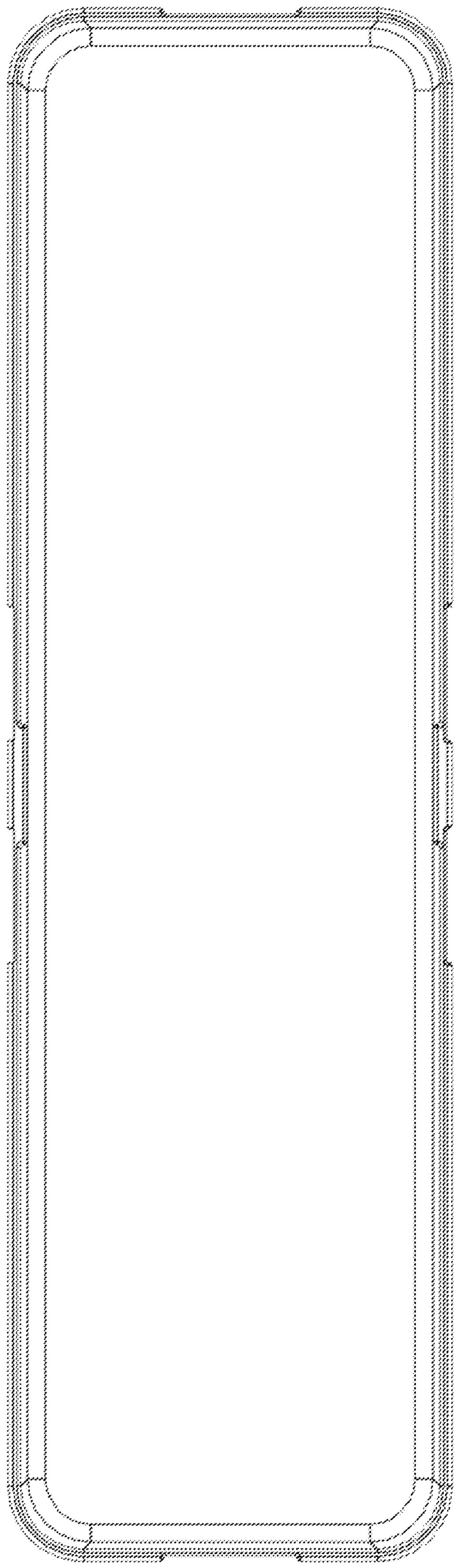
FIG. 34 illustrates a top view of the second storage container in FIG. 26 with the lid removed, according to various aspects of the present disclosure.
Figure 35:
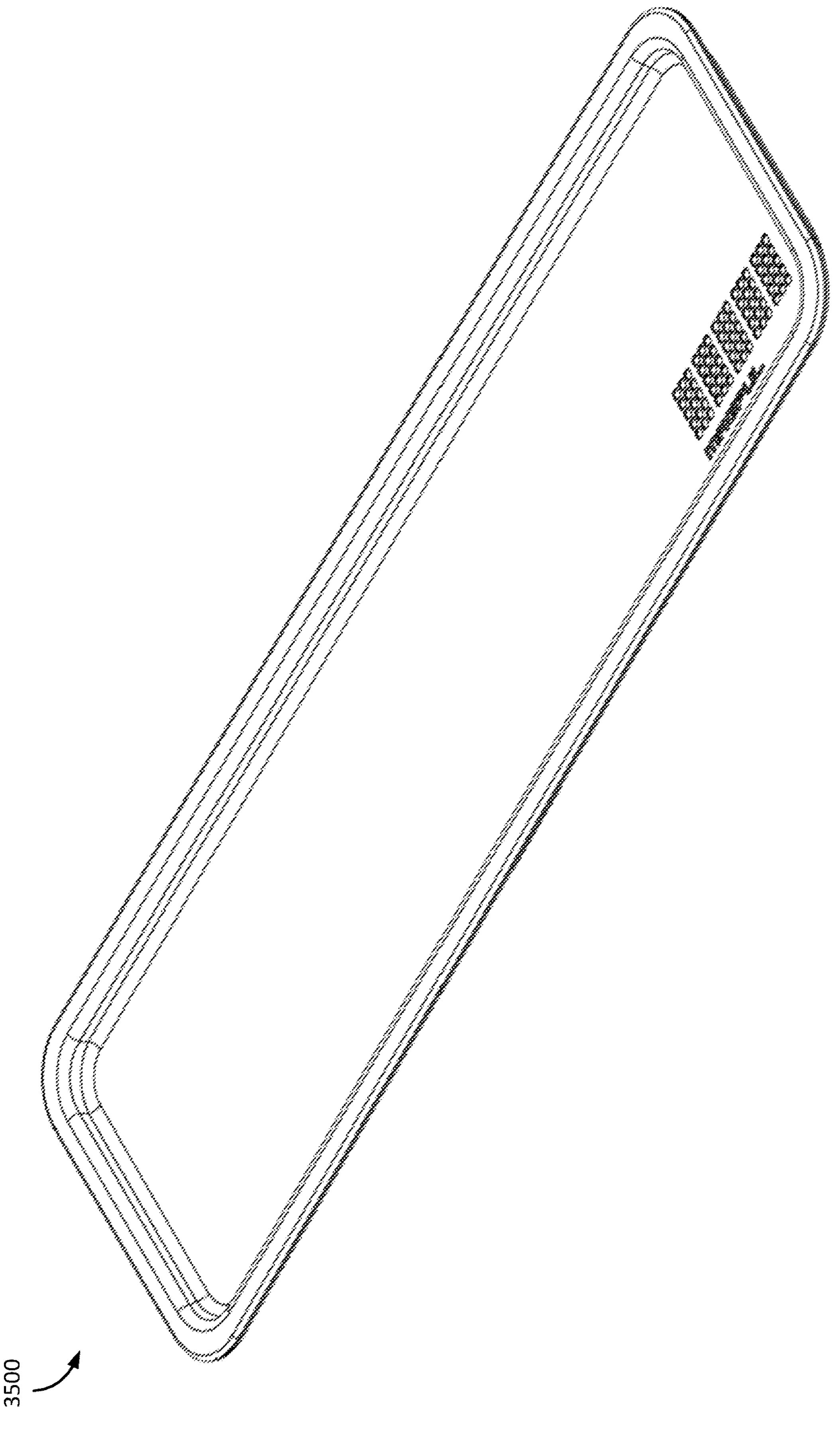
FIG. 35 illustrates a perspective top view of the lid of the second storage container in FIG. 26, according to various aspects of the present disclosure.
Figure 36:
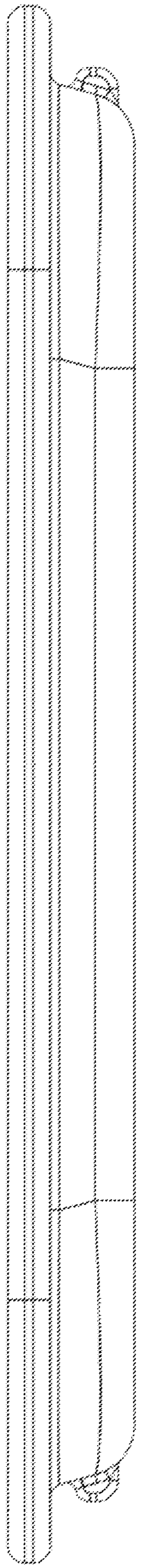
FIG. 36 illustrates a side view of the lid of the second storage container in FIG. 26, according to various aspects of the present disclosure.
Figure 37:
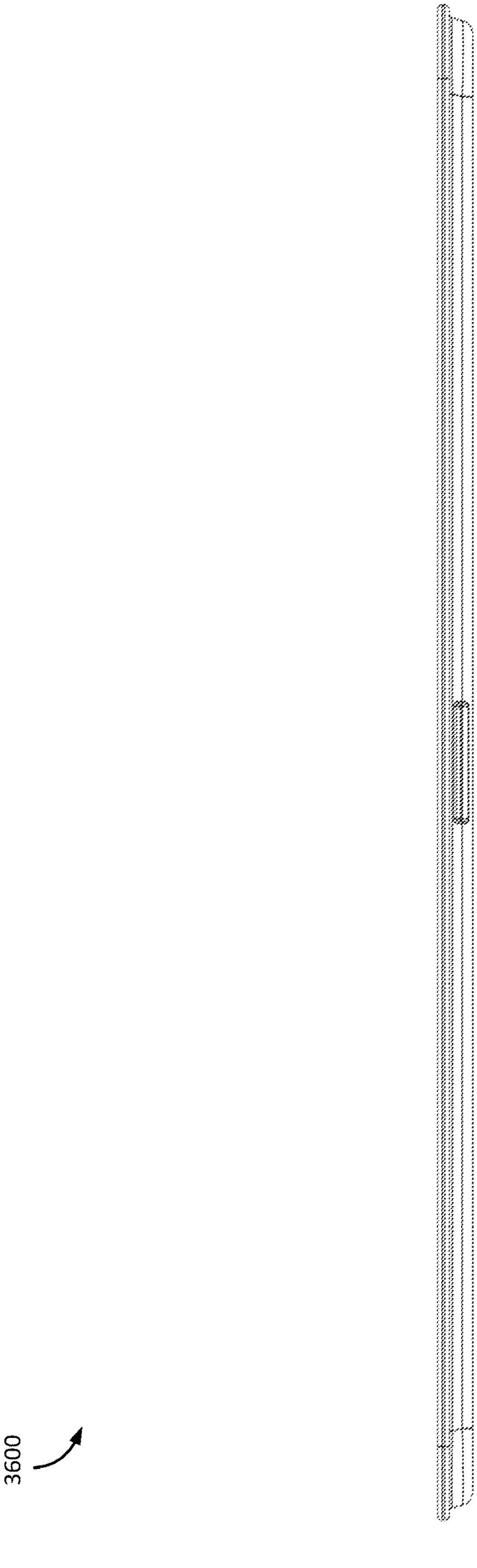
FIG. 37 illustrates another side view of the lid of the second storage container in FIG. 26, according to various aspects of the present disclosure.
Figure 38:
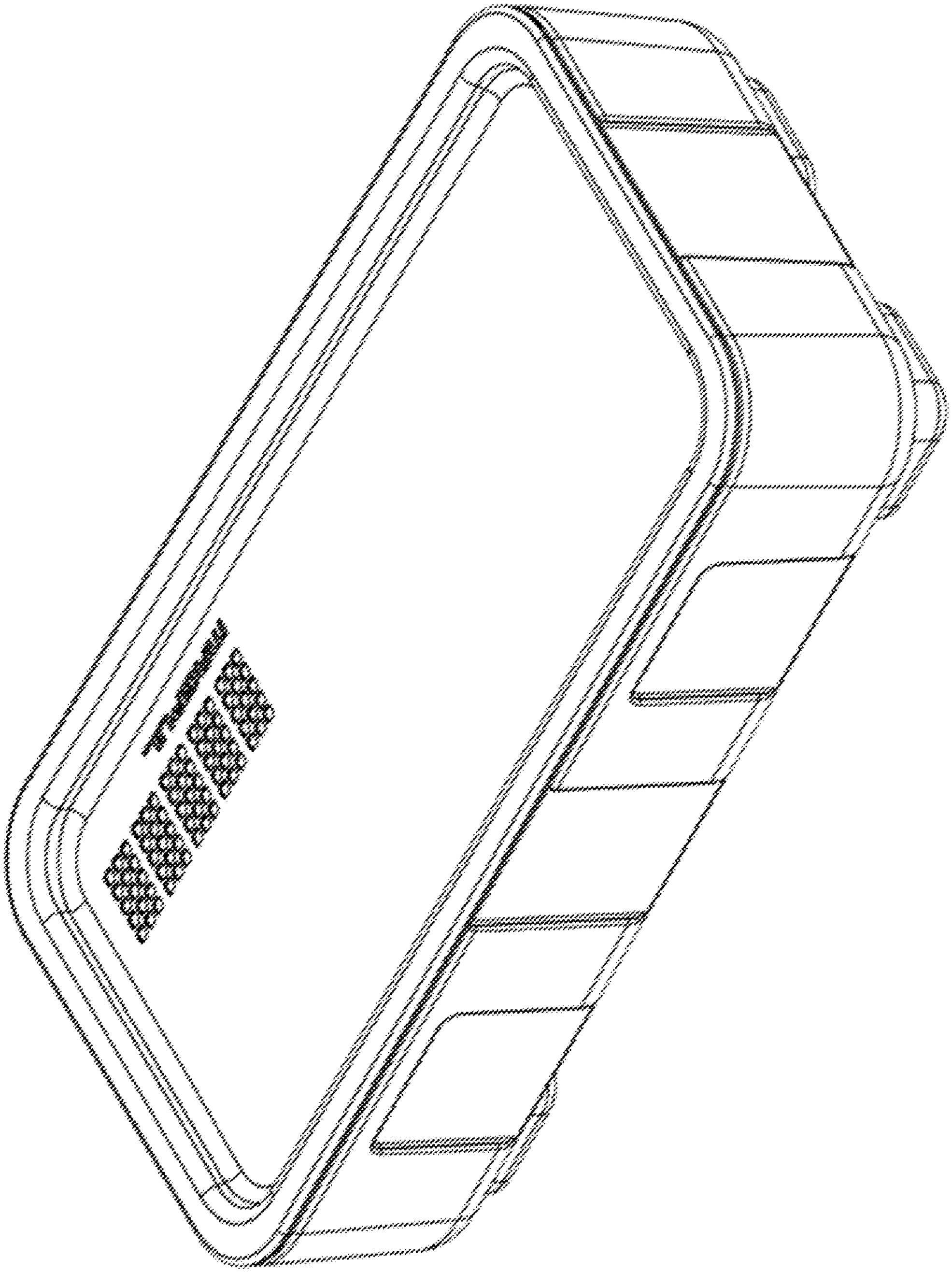
FIG. 38 illustrates a perspective top view of a third storage container, according to various aspects of the present disclosure.
Figure 39:
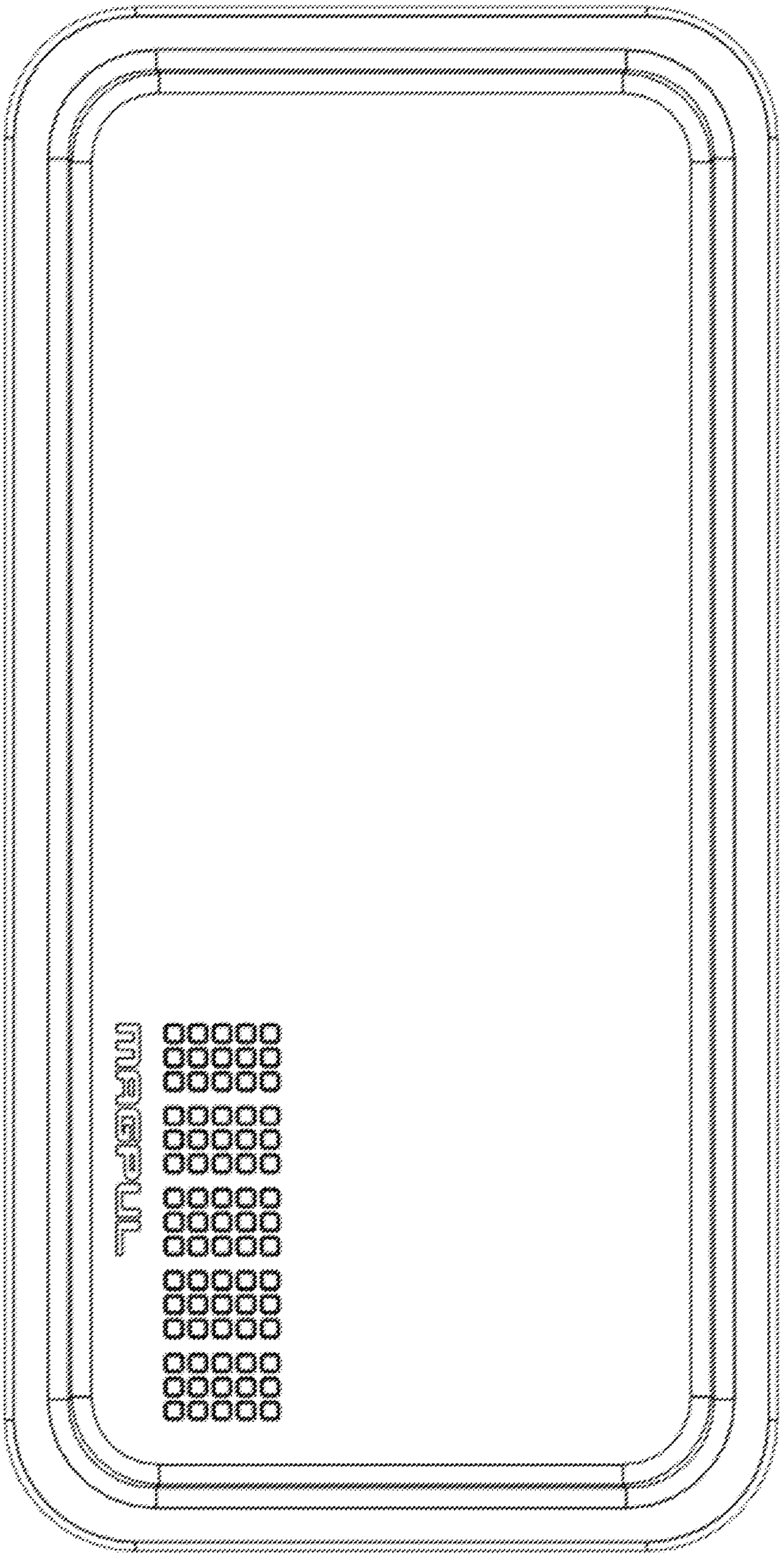
FIG. 39 illustrates a top view of the third storage container in FIG. 38, according to various aspects of the present disclosure.
Figure 40:
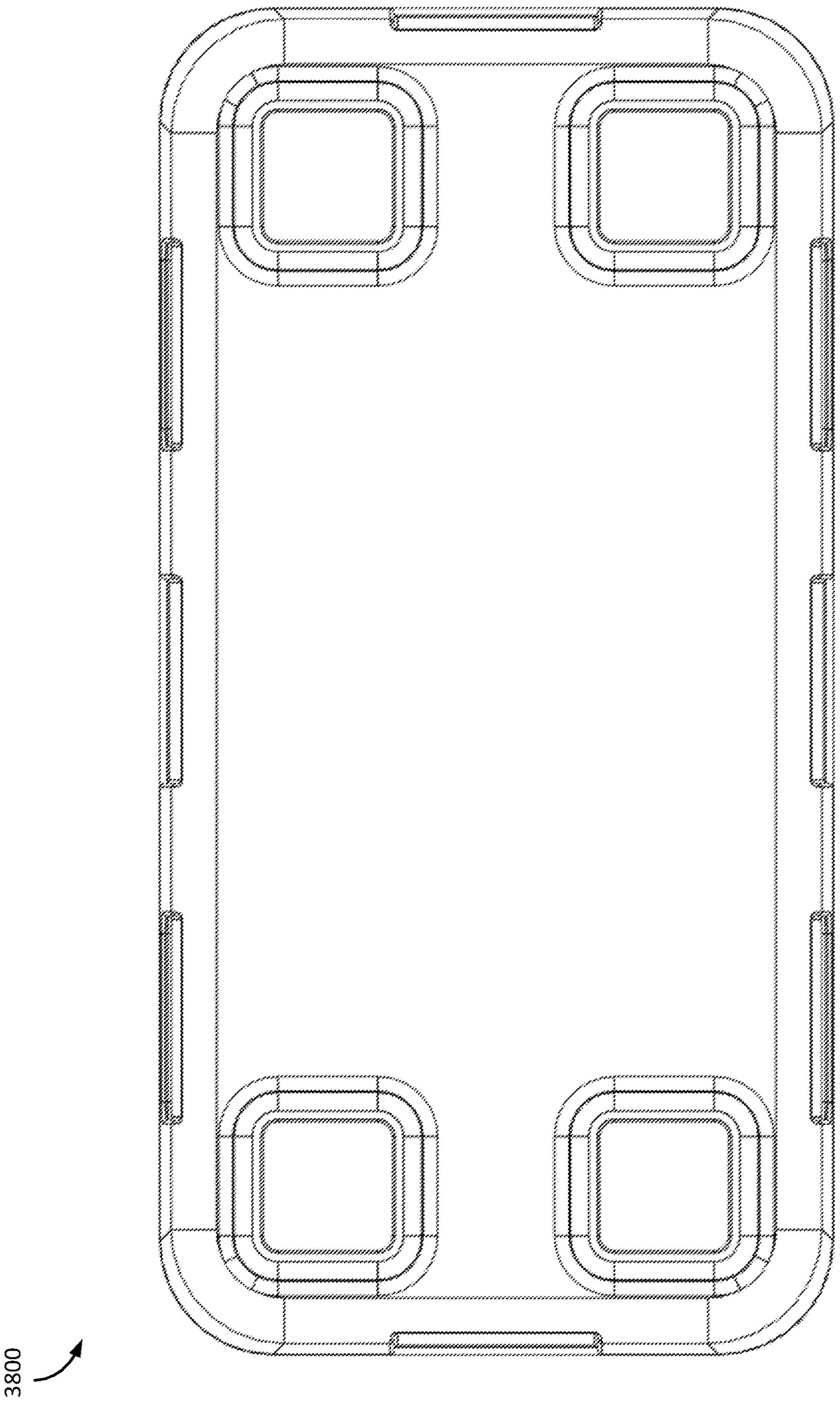
FIG. 40 illustrates a bottom view of the third storage container in FIG. 38, according to various aspects of the present disclosure.
Figure 41:
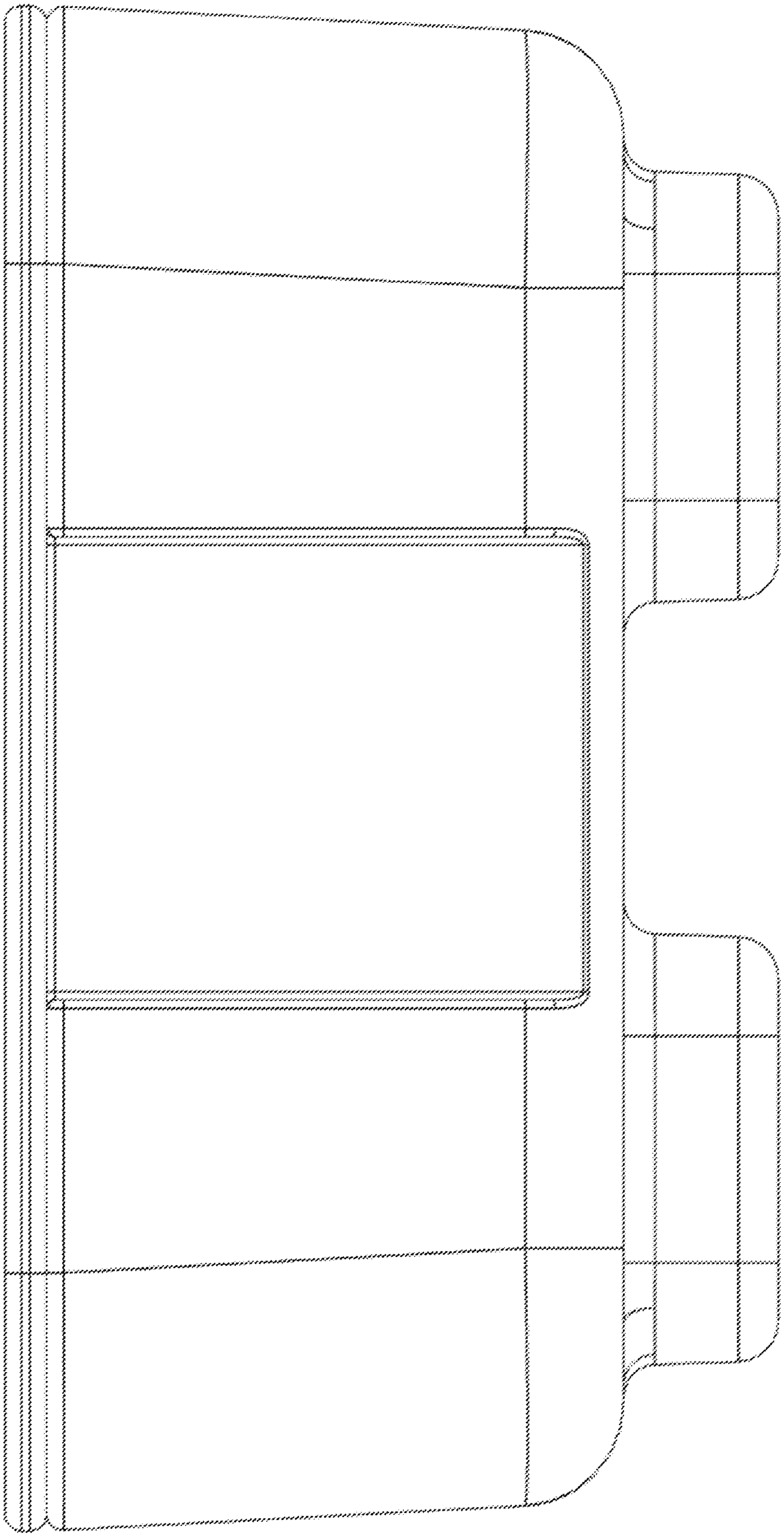
FIG. 41 illustrates a first side view of the third storage container in FIG. 38, according to various aspects of the present disclosure.
Figure 42:
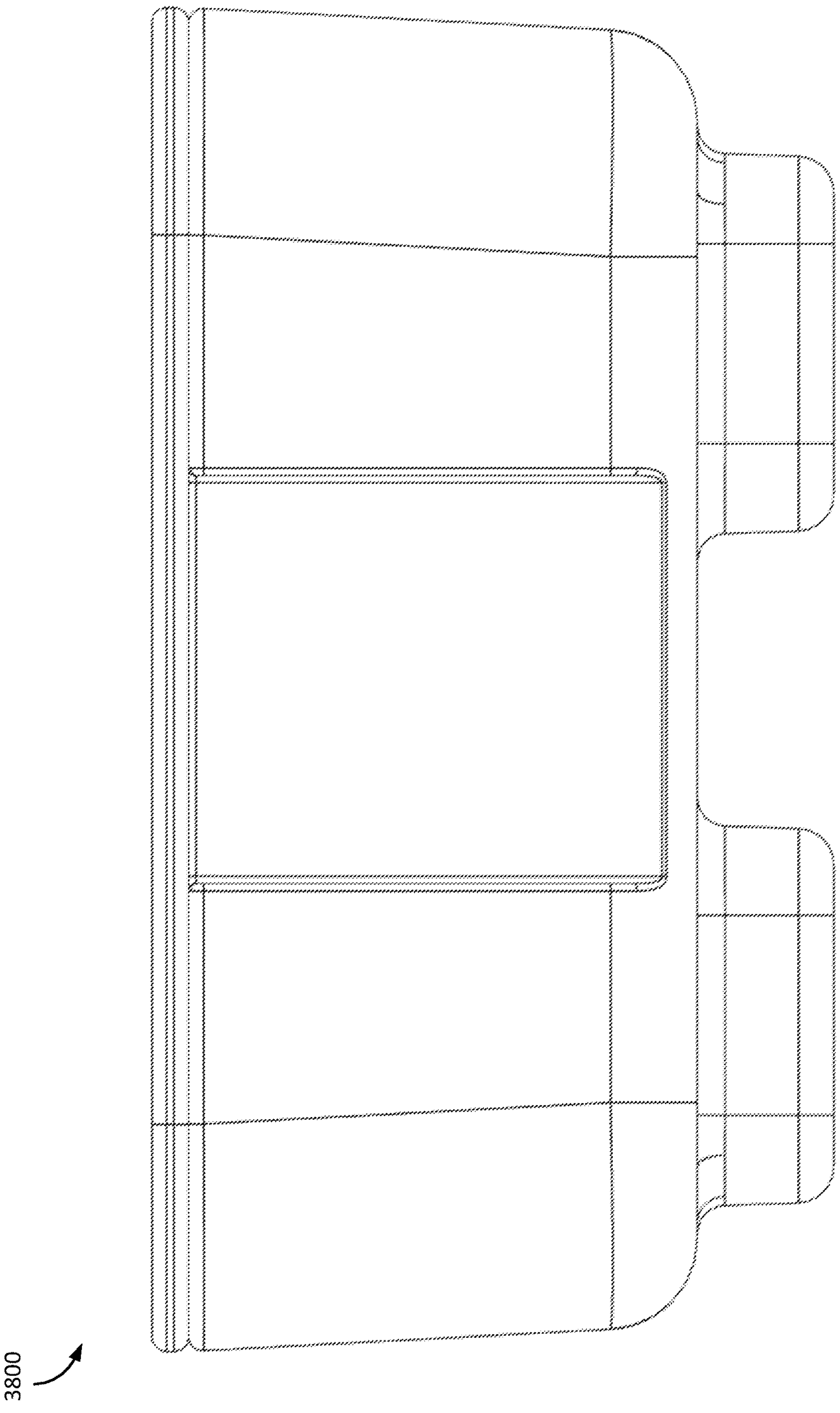
FIG. 42 illustrates a second side view of the third storage container in FIG. 38, according to various aspects of the present disclosure.
Figure 43:
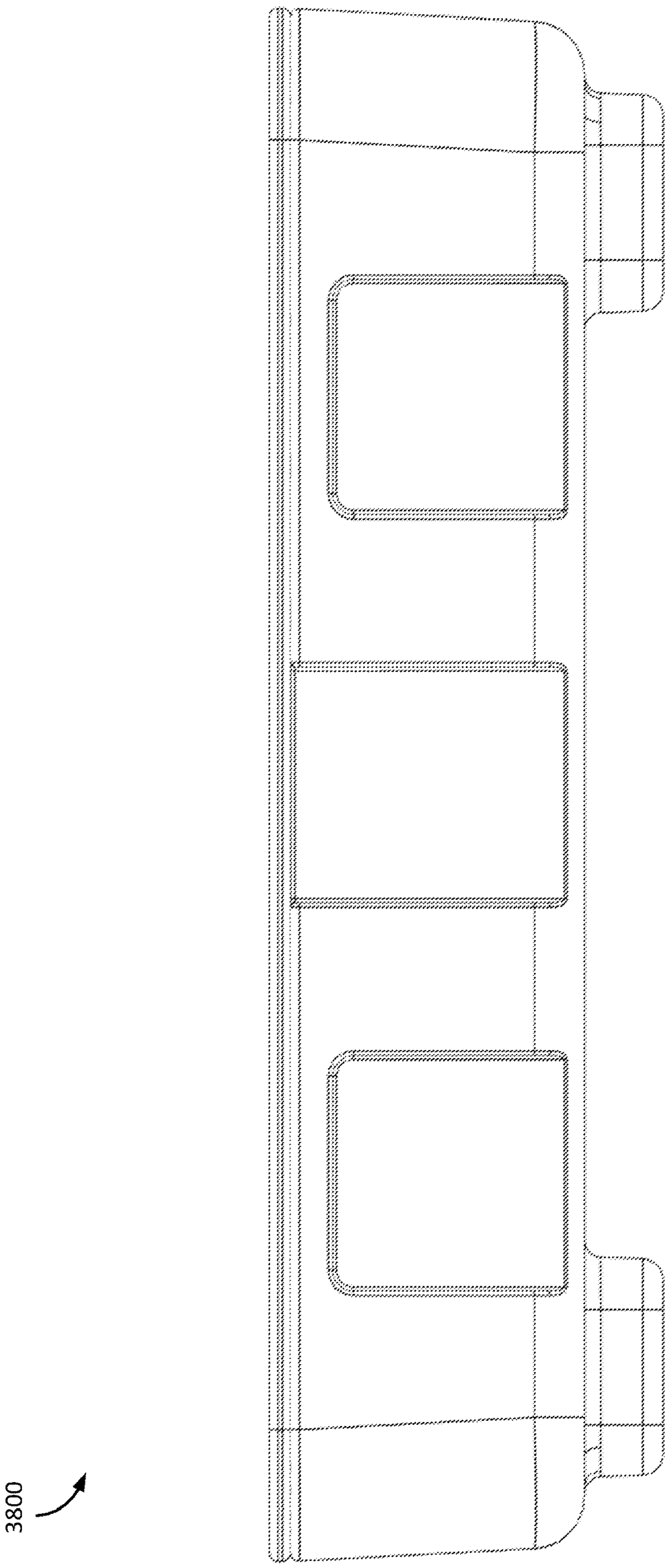
FIG. 43 illustrates a third side view of the third storage container in FIG. 38, according to various aspects of the present disclosure.
Figure 44:
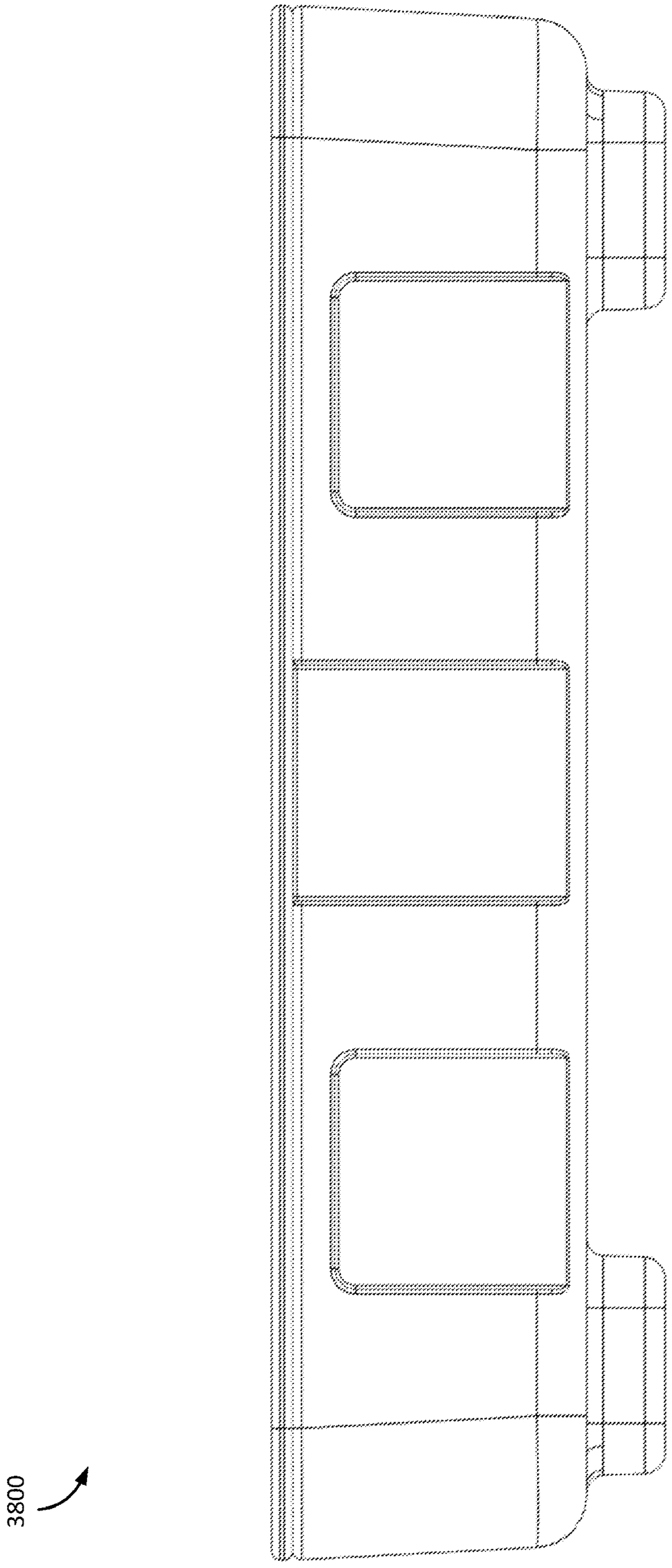
FIG. 44 illustrates a fourth side view of the third storage container in FIG. 38, according to various aspects of the present disclosure.
Figure 45:
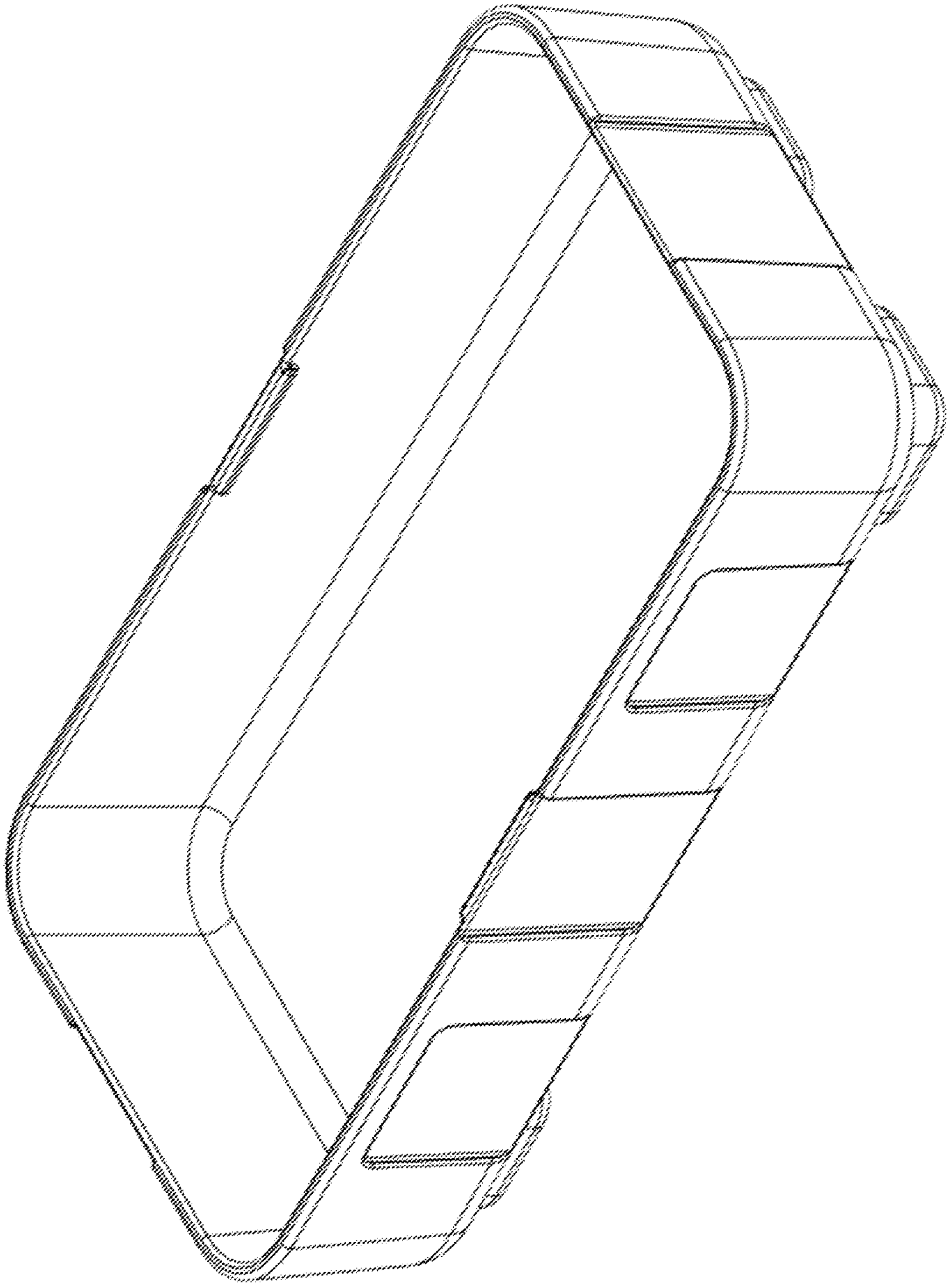
FIG. 45 illustrates a perspective top view of the third storage container in FIG. 38 with the lid removed, according to various aspects of the present disclosure.
Figure 46:
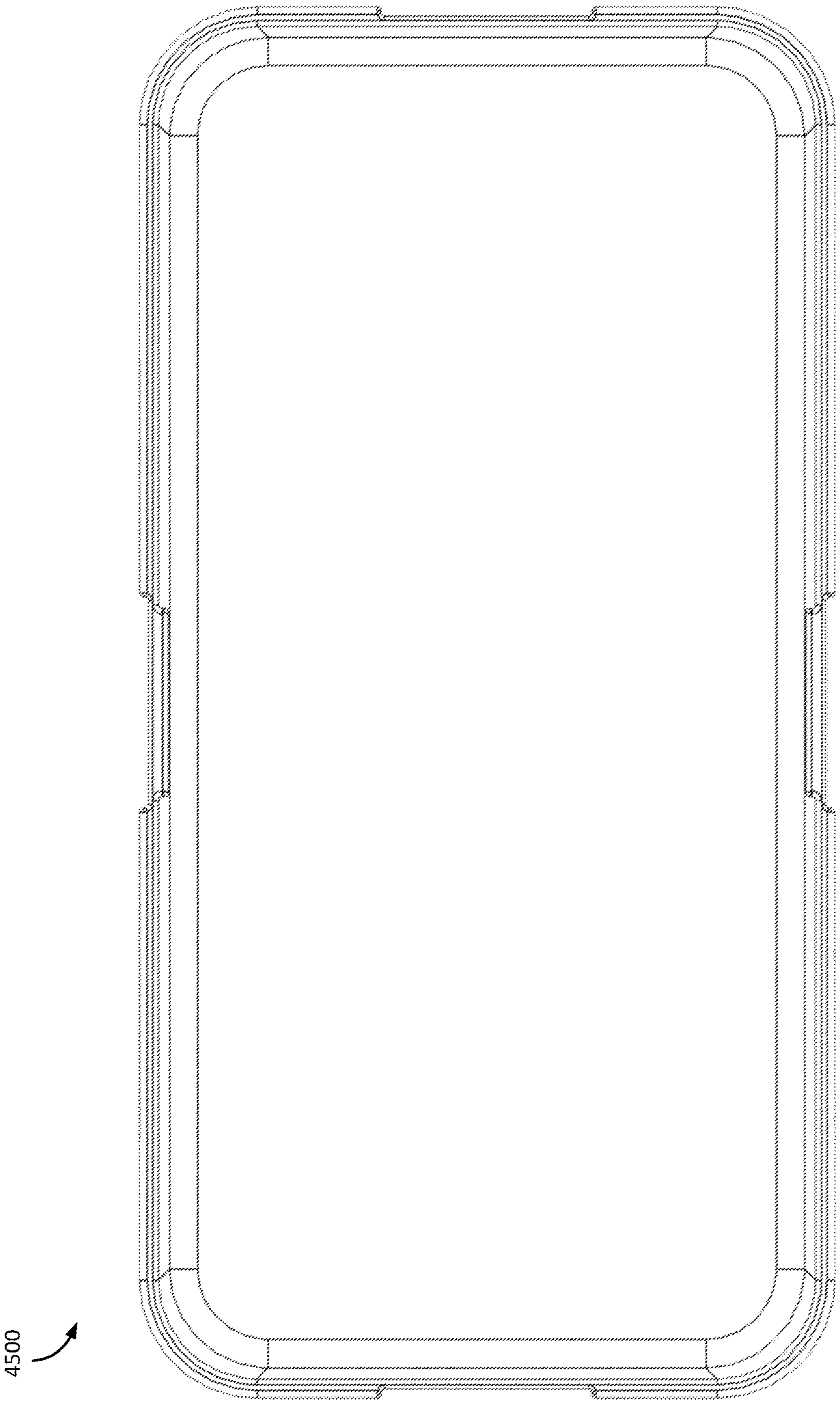
FIG. 46 illustrates a top view of the third storage container in FIG. 38 with the lid removed, according to various aspects of the present disclosure.
Figure 47:
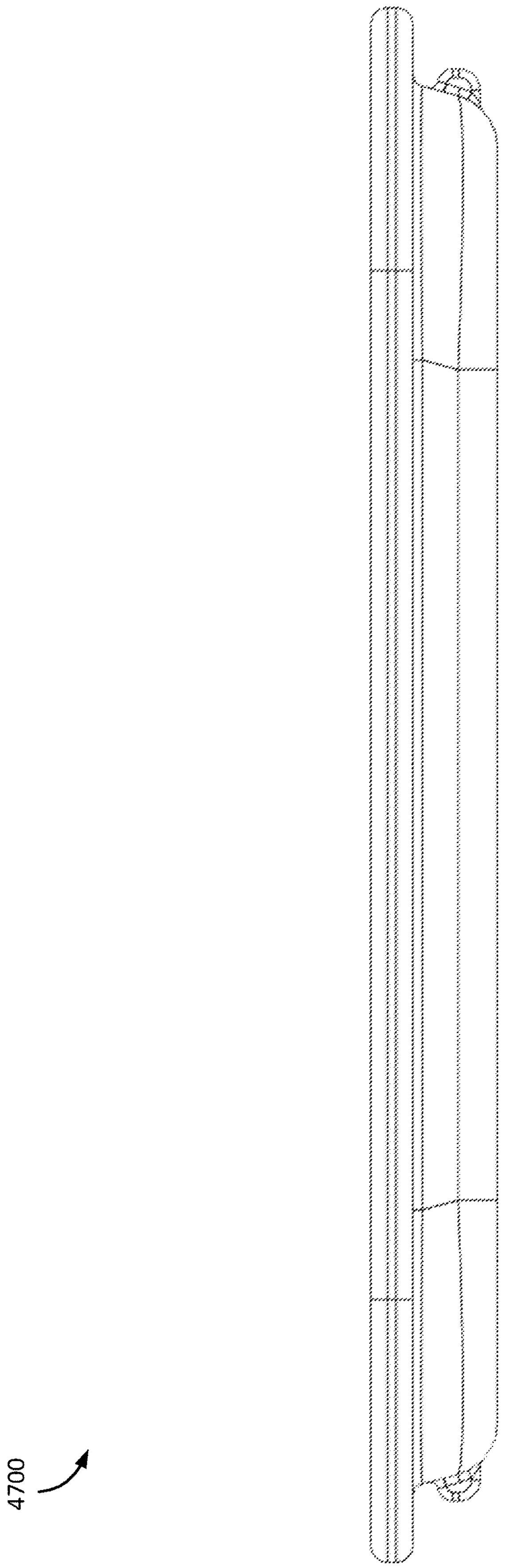
FIG. 47 illustrates a side view of the lid of the third storage container in FIG. 38, according to various aspects of the present disclosure.
Figure 48:
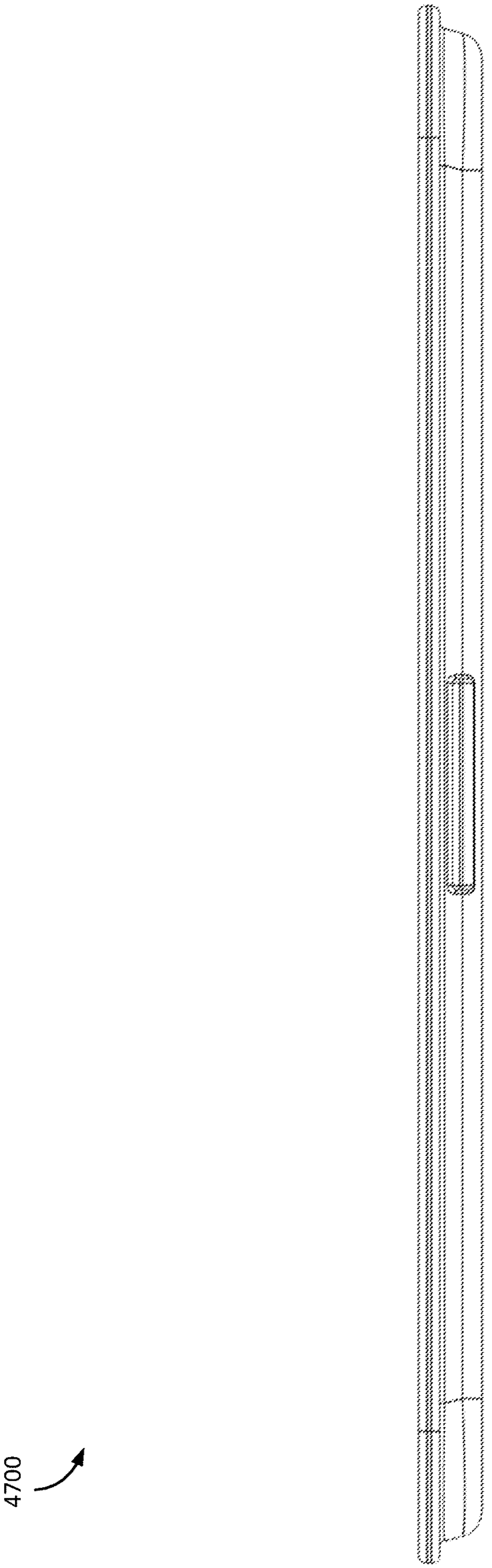
FIG. 48 illustrates another side view of the lid of the of the third storage container in FIG. 38, according to various aspects of the present disclosure.
Figure 49:
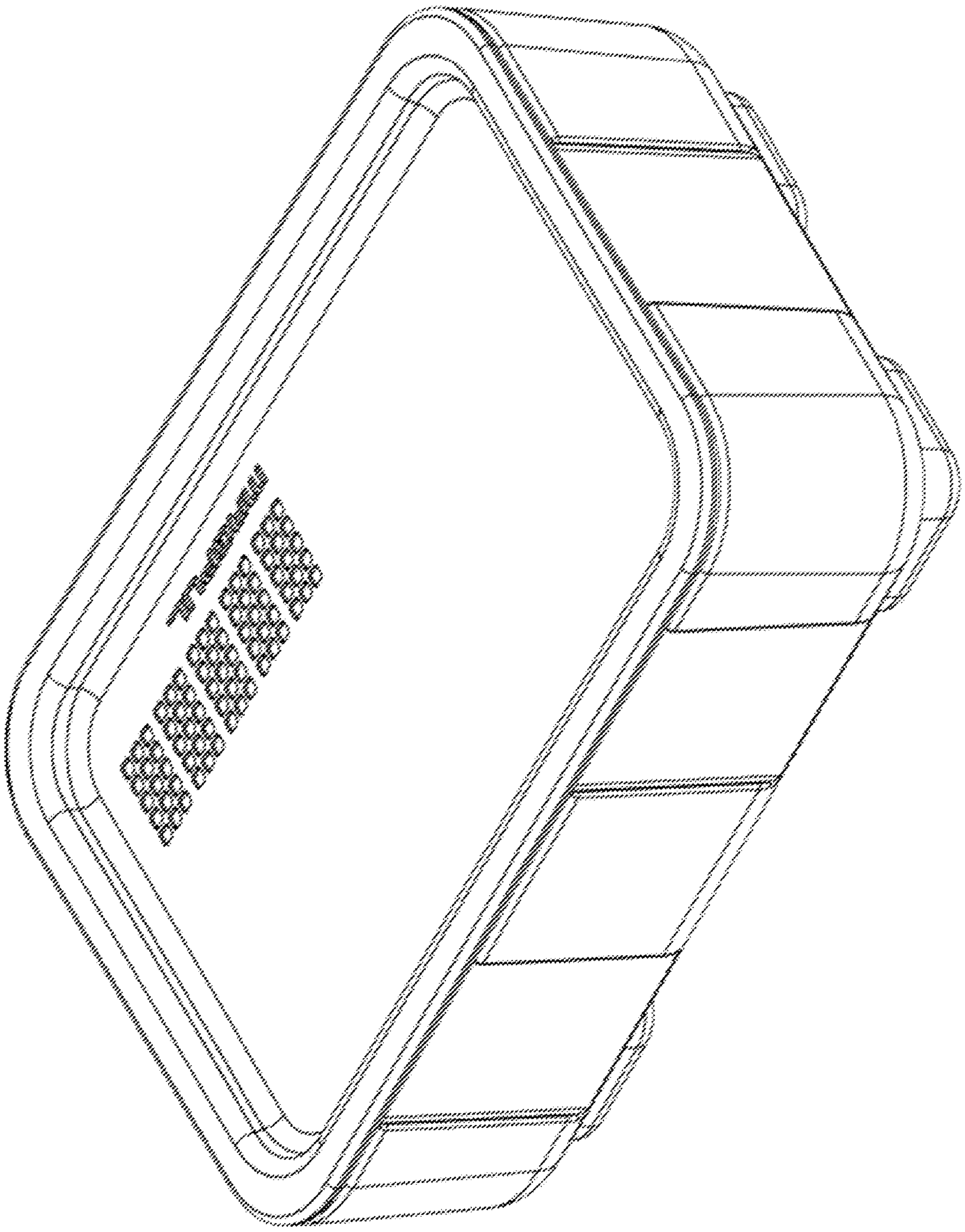
FIG. 49 illustrates a perspective top view of a fourth storage container, according to various aspects of the present disclosure.
Figure 50:
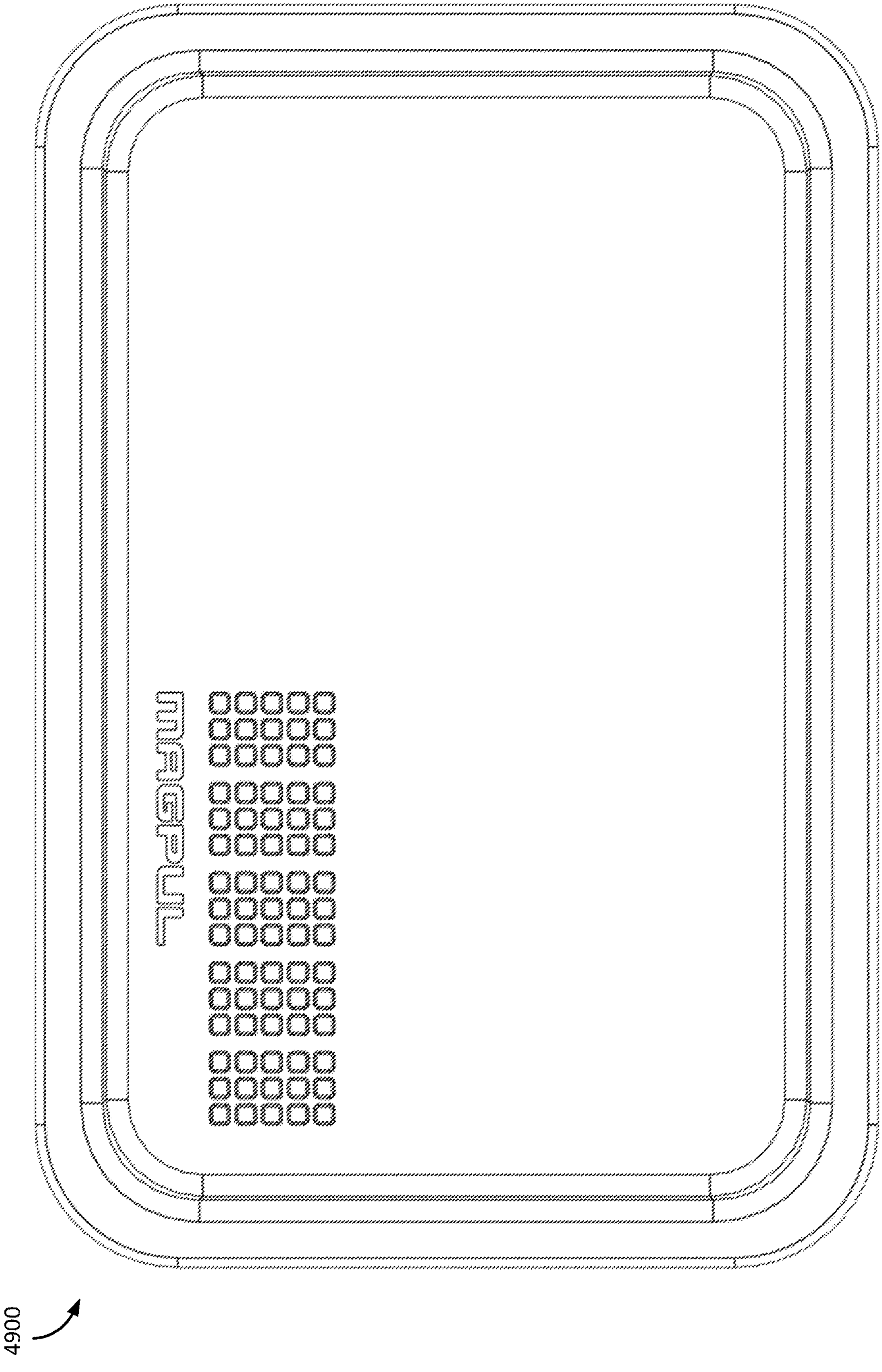
FIG. 50 illustrates a top view of the fourth storage container in FIG. 49, according to various aspects of the present disclosure.
Figure 51:
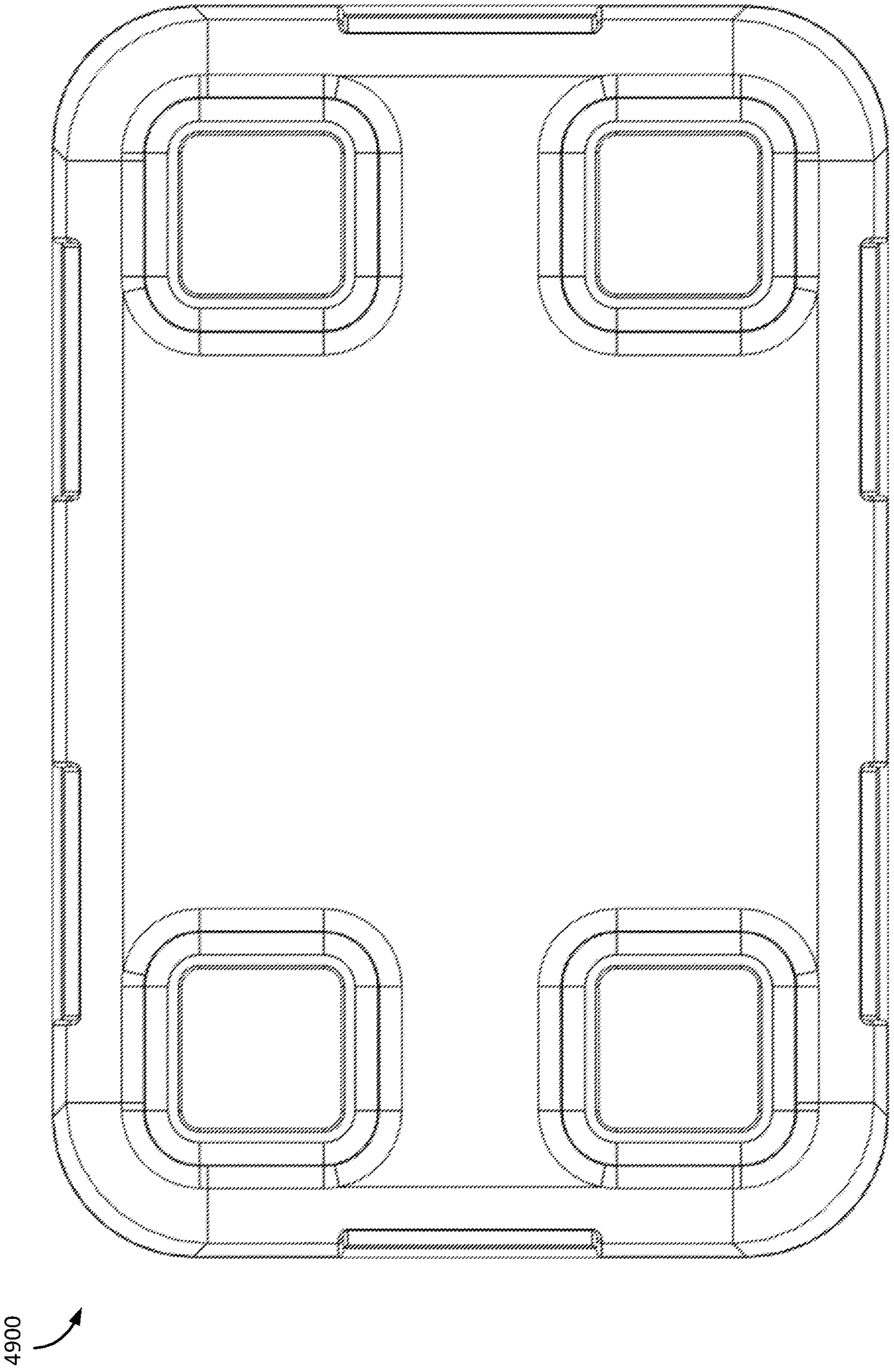
FIG. 51 illustrates a bottom view of the fourth storage container in FIG. 49 according to various aspects of the present disclosure.
Figure 52:
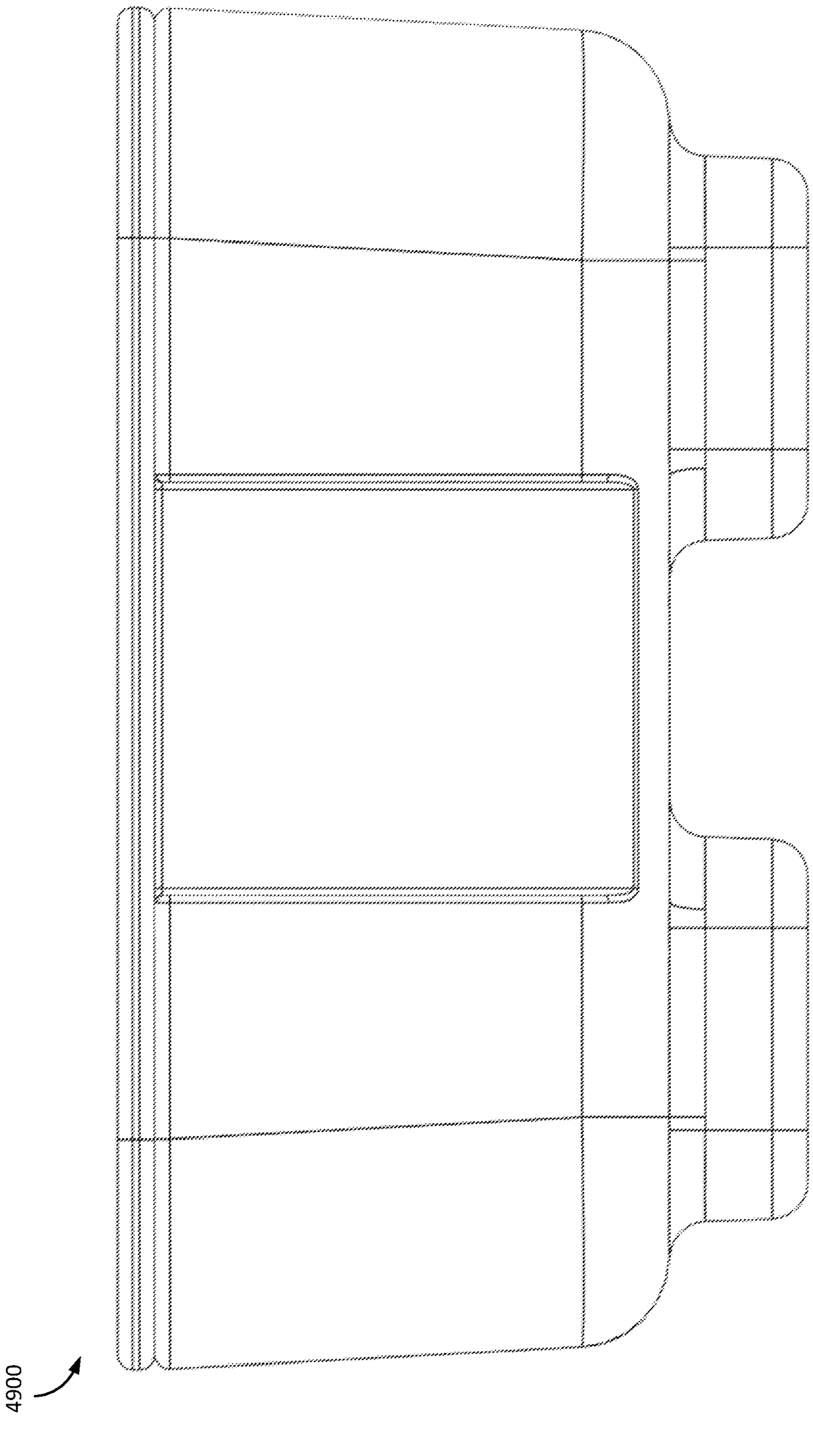
FIG. 52 illustrates a first side view of the fourth storage container in FIG. 49, according to various aspects of the present disclosure.
Figure 53:
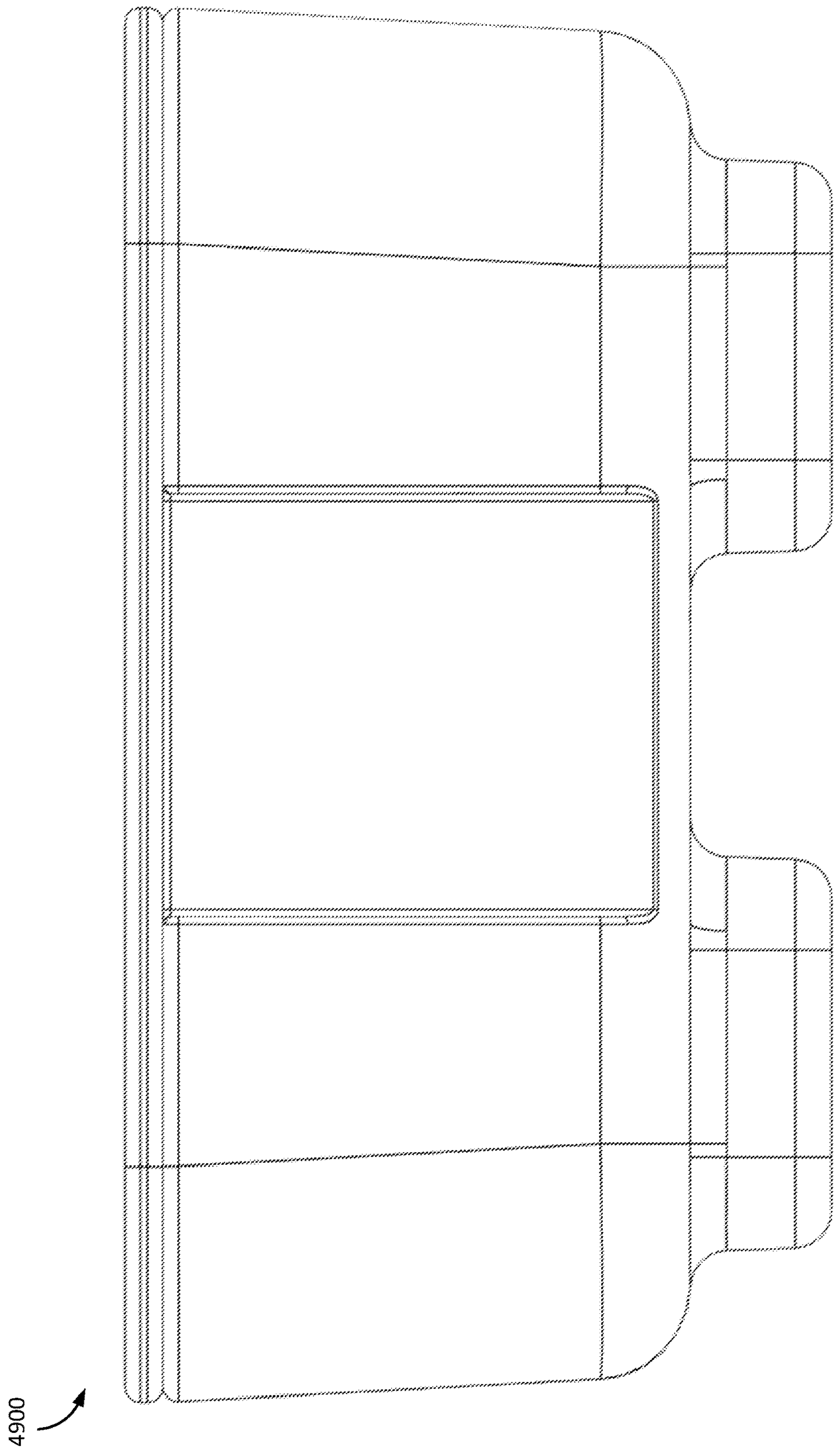
FIG. 53 illustrates a second side view of the fourth storage container in FIG. 49, according to various aspects of the present disclosure.
Figure 54:
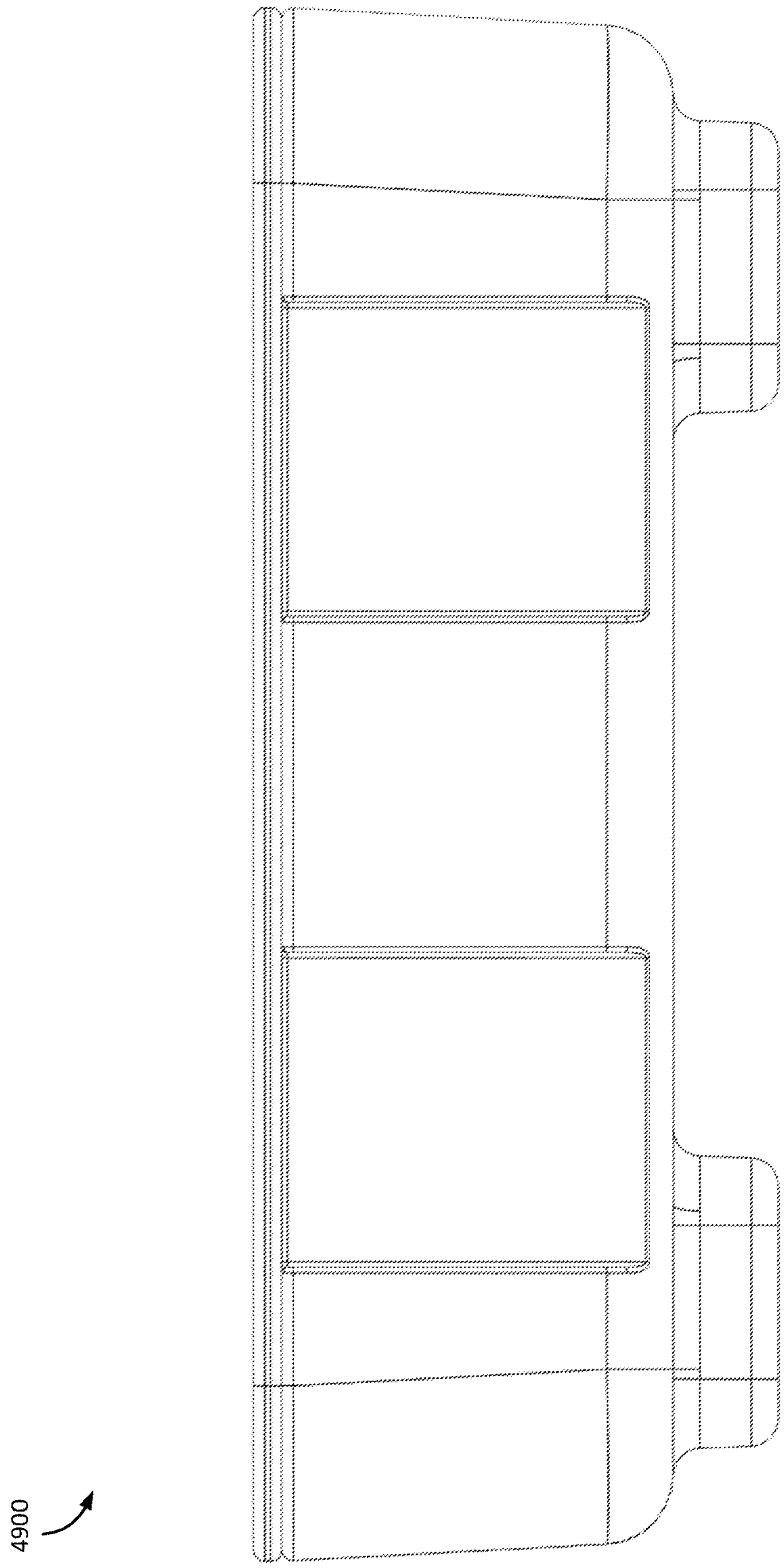
FIG. 54 illustrates a third side view of the fourth storage container in FIG. 49, according to various aspects of the present disclosure.
Figure 55:
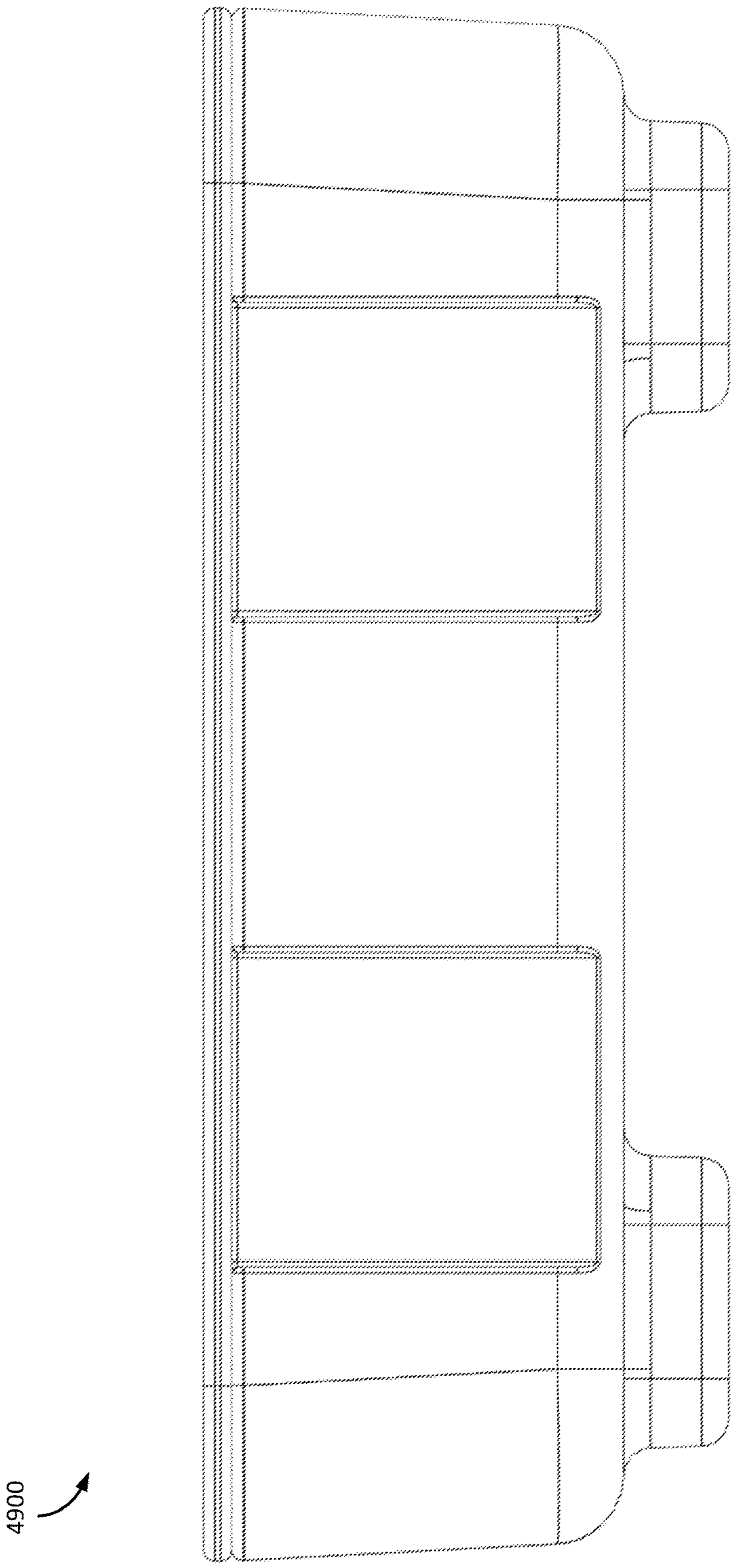
FIG. 55 illustrates a fourth side view of the fourth storage container in FIG. 49, according to various aspects of the present disclosure.
Figure 56:
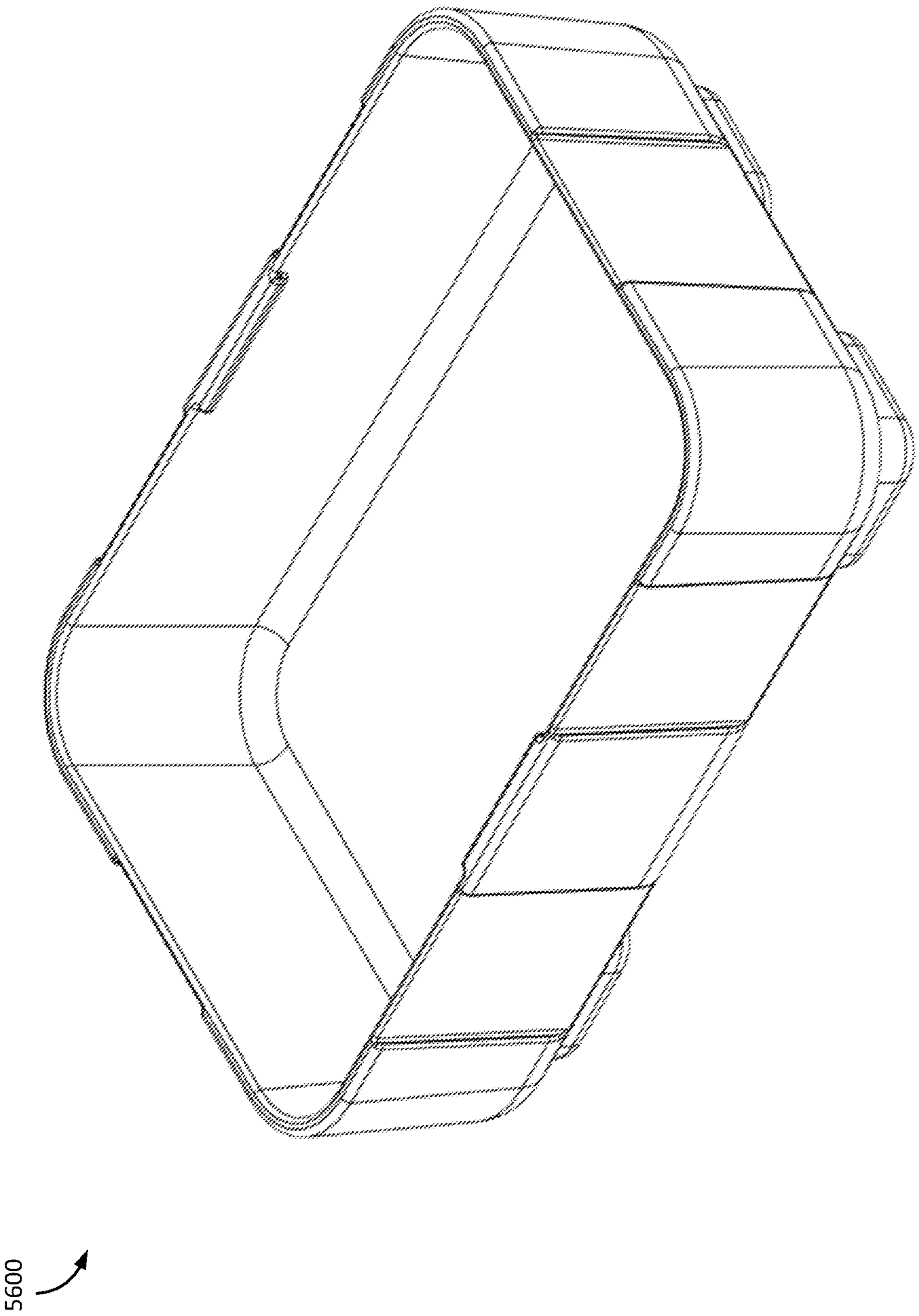
FIG. 56 illustrates a perspective top view of the fourth storage container in FIG. 49 with the lid removed, according to various aspects of the present disclosure.
Figure 57:
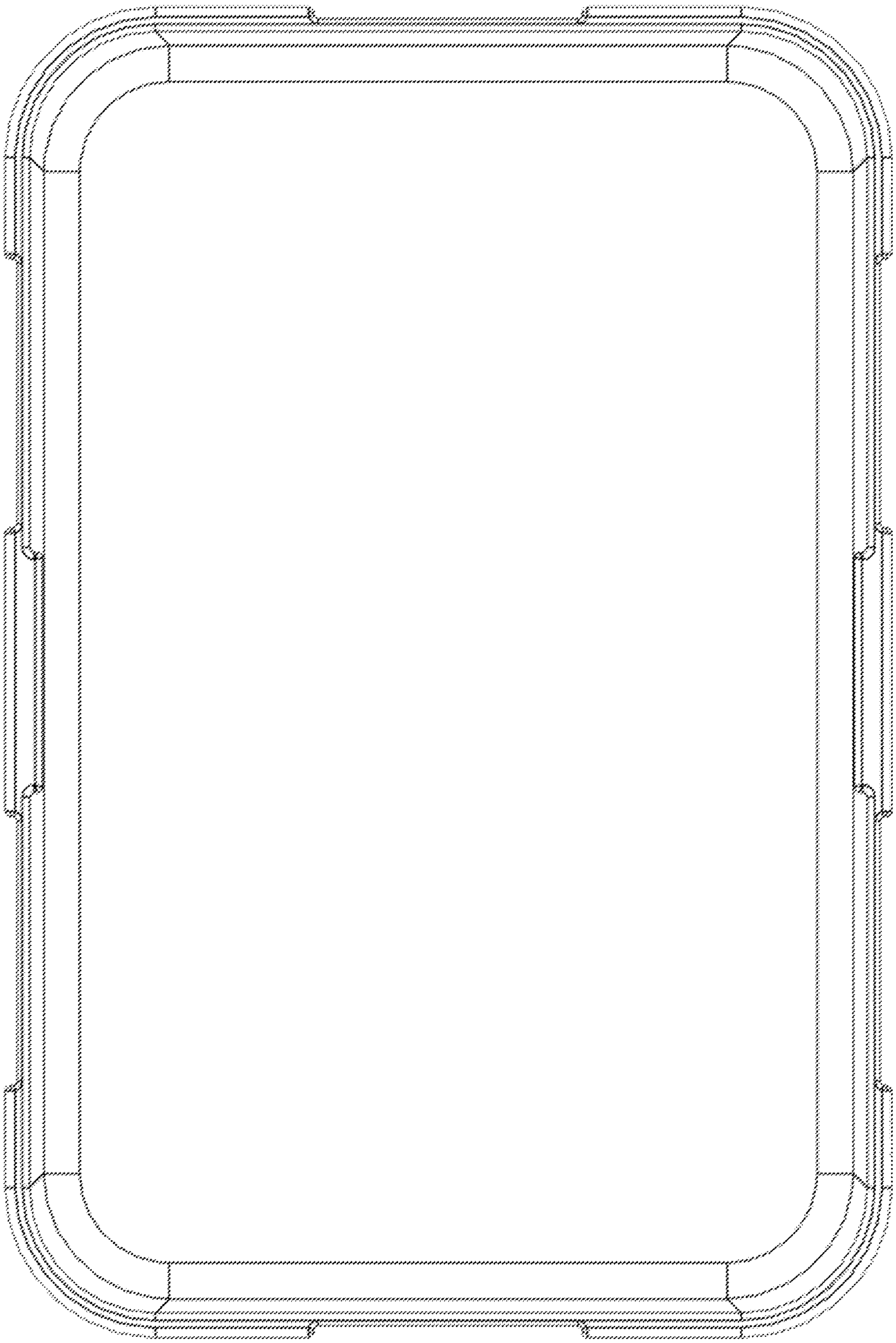
FIG. 57 illustrates a top view of the fourth storage container in FIG. 49 with the lid removed, according to various aspects of the present disclosure.
Figure 58:
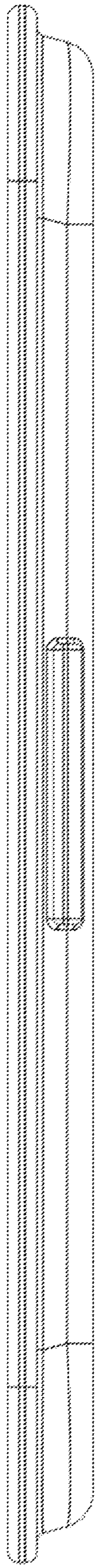
FIG. 58 illustrates a side view of the lid of the fourth storage container in FIG. 49, according to various aspects of the present disclosure.
Figure 59:
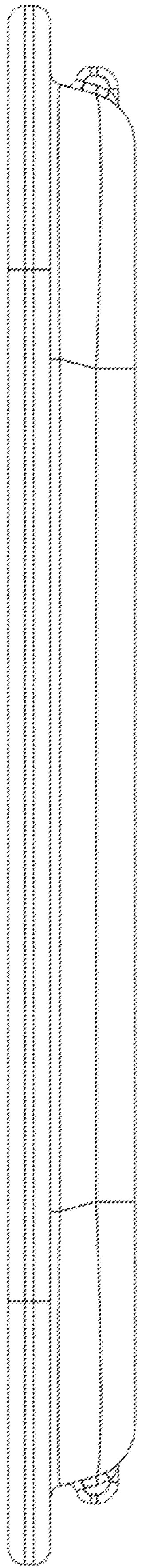
FIG. 59 illustrates a side view of the lid of the fourth storage container in FIG. 49, according to various aspects of the present disclosure.
Figure 60:
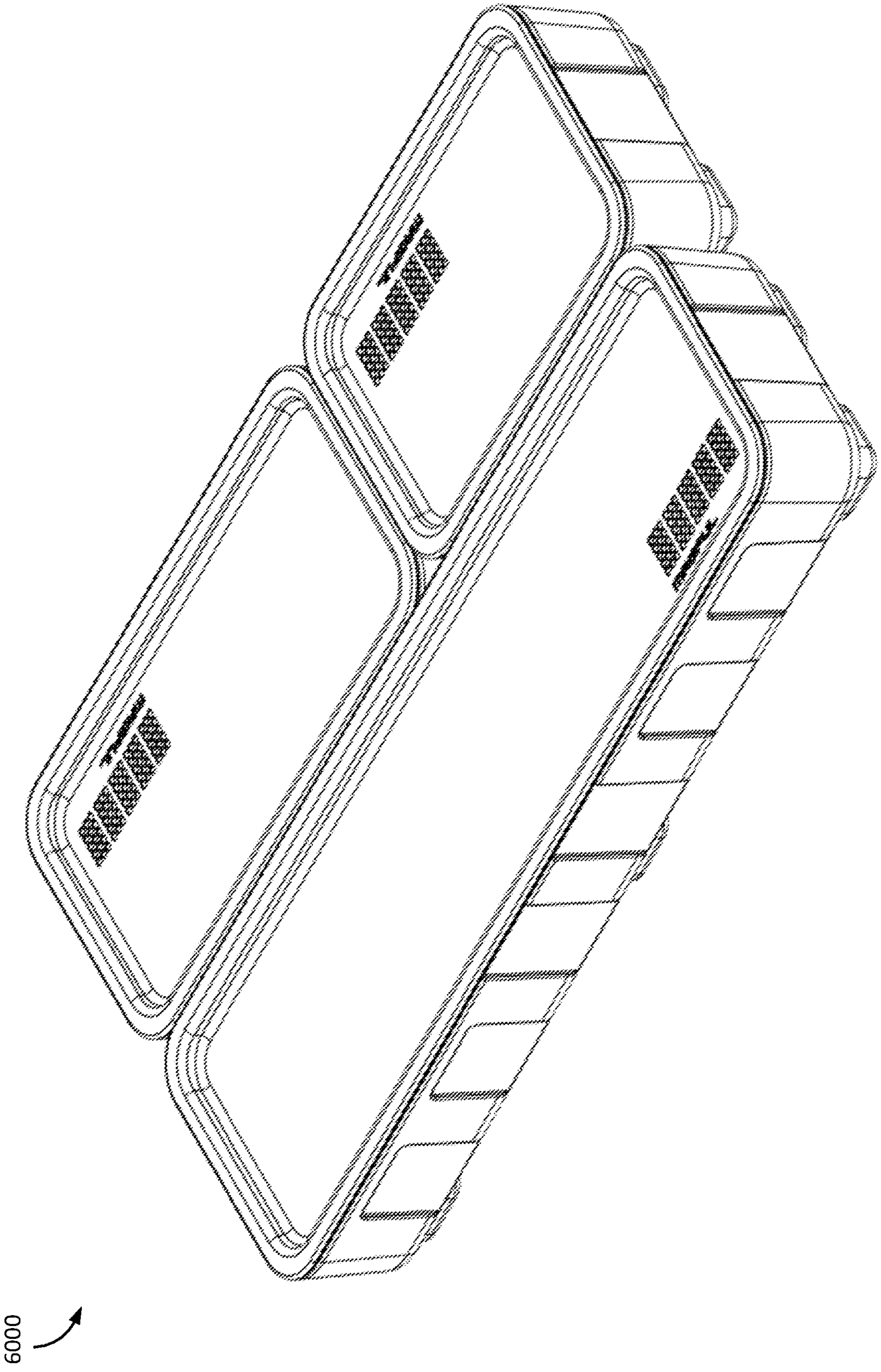
FIG. 60 illustrates a perspective top view of a plurality of storage containers, according to various aspects of the present disclosure.
Figure 61:
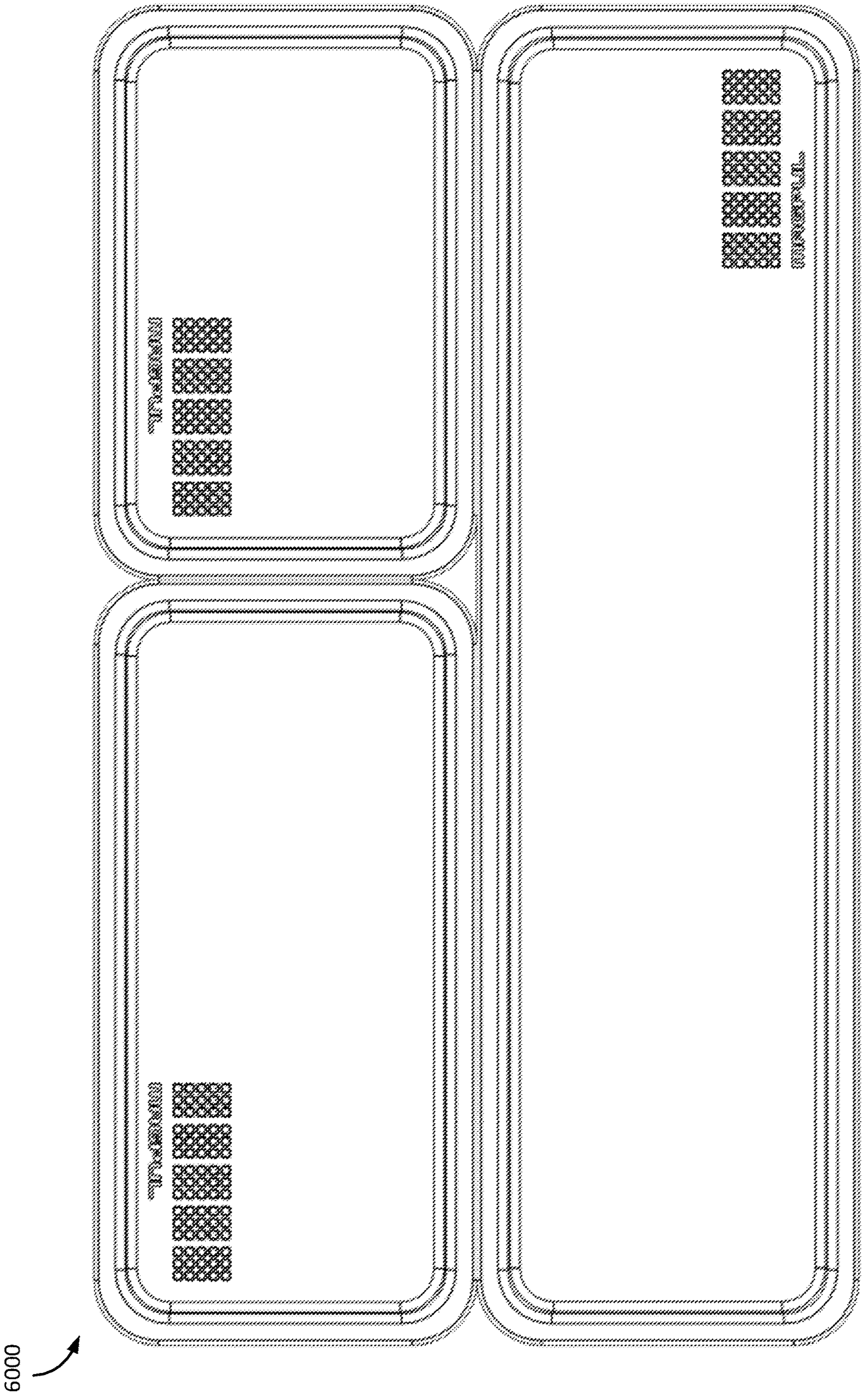
FIG. 61 illustrates a top view of the plurality of storage containers in FIG. 60, according to various aspects of the present disclosure.
Figure 62:
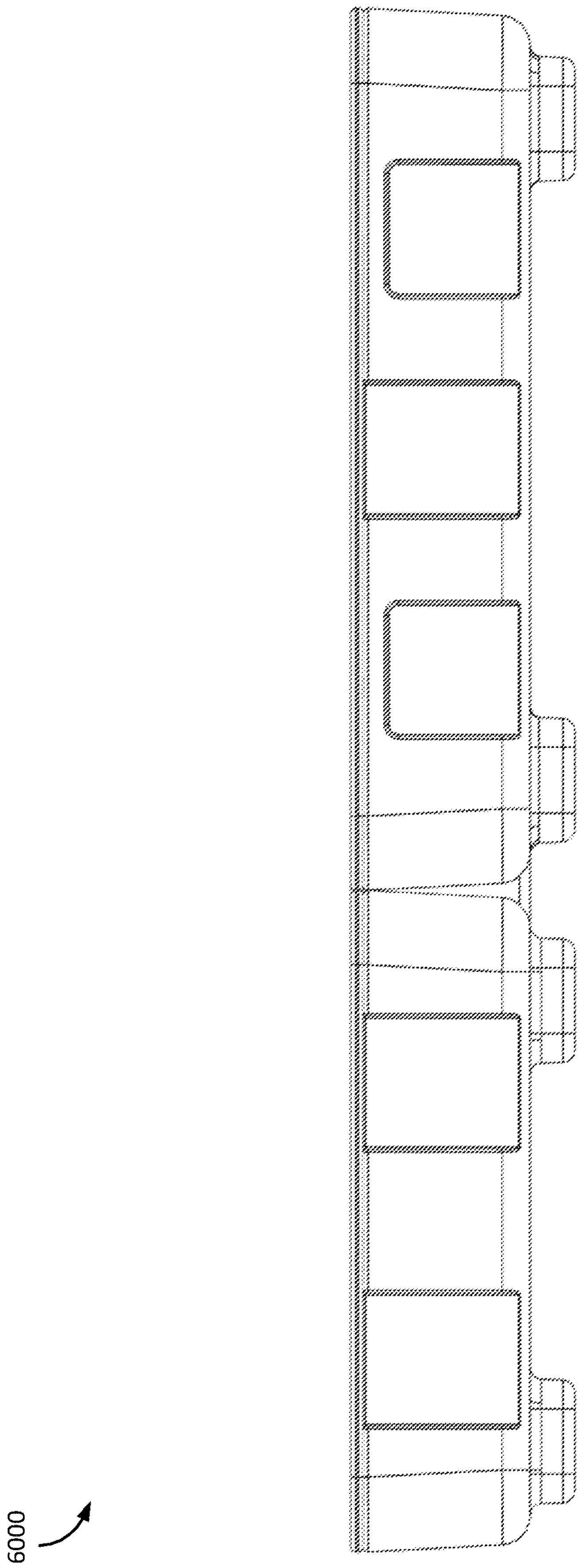
FIG. 62 illustrates a first side view of the plurality of storage containers in FIG. 60, according to various aspects of the present disclosure.
Figure 63:
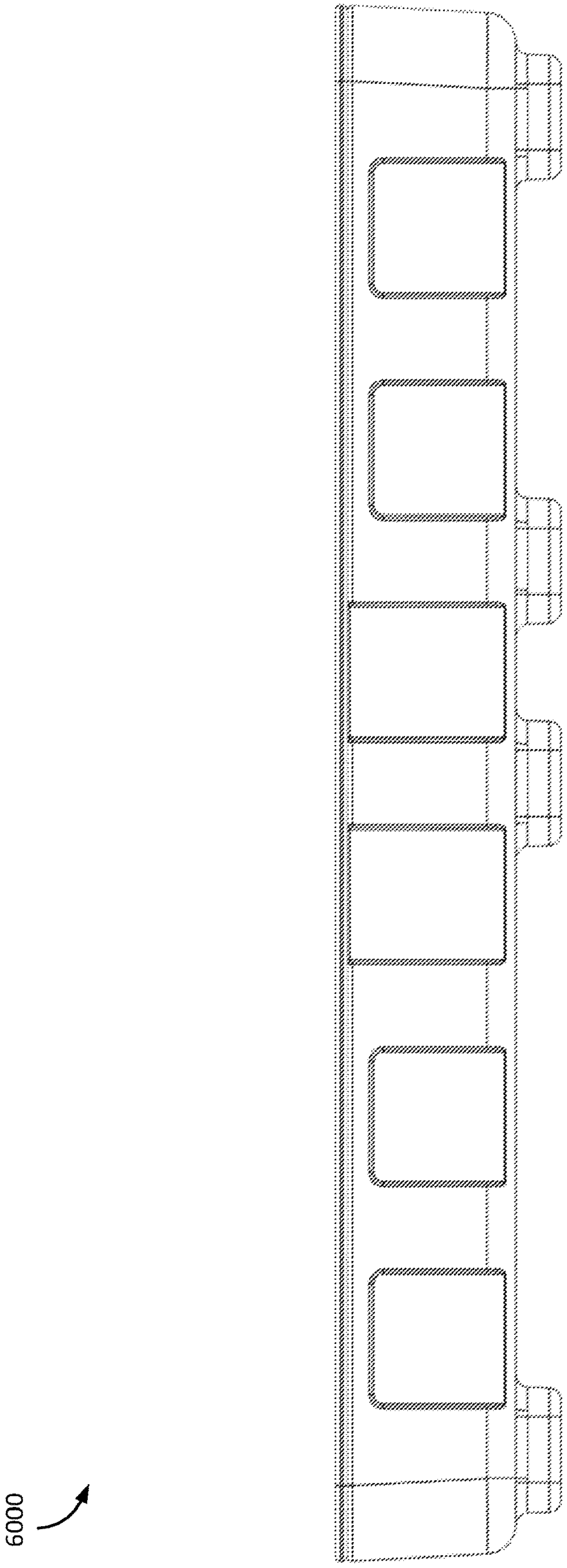
FIG. 63 illustrates a second side view of the plurality of storage containers in FIG. 60, according to various aspects of the present disclosure.
Figure 64:
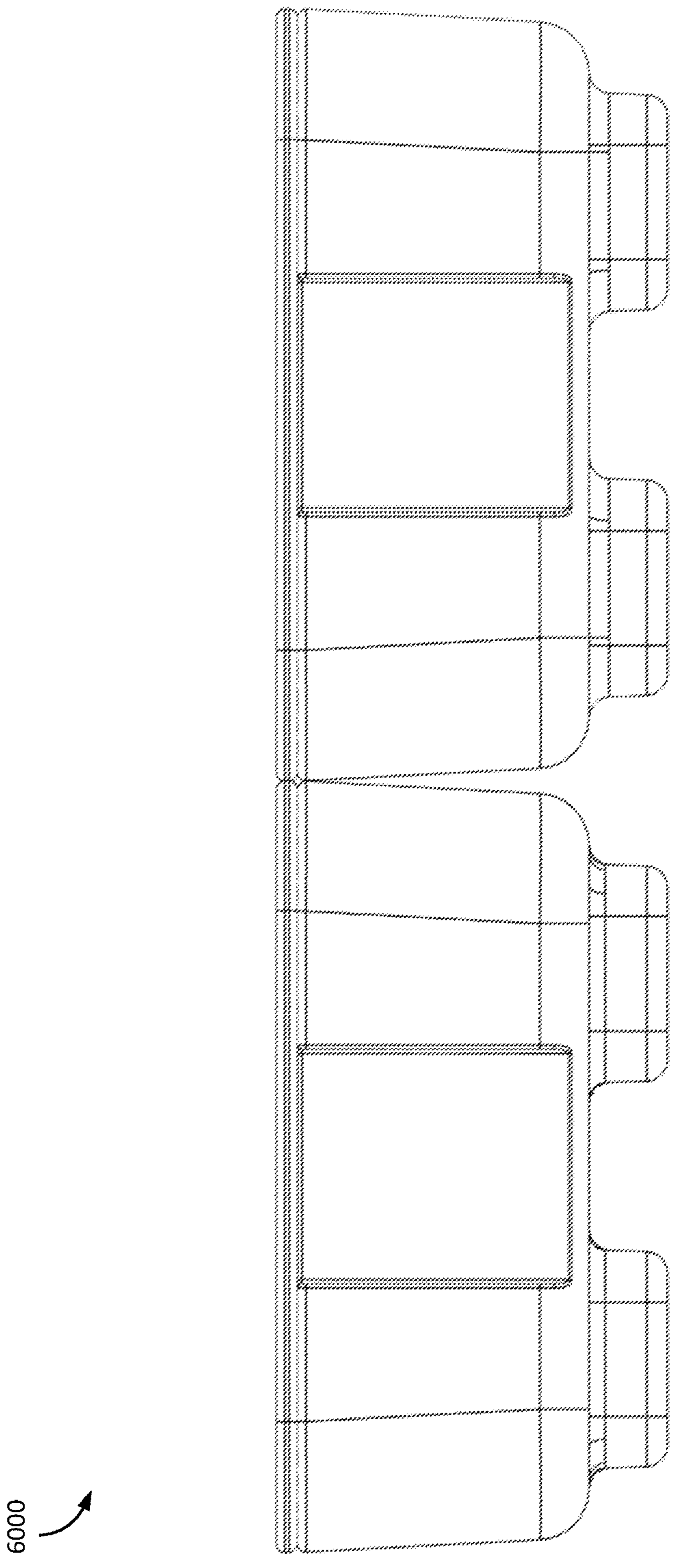
FIG. 64 illustrates a third side view of the plurality of storage containers in FIG. 60, according to various aspects of the present disclosure.
Figure 65:
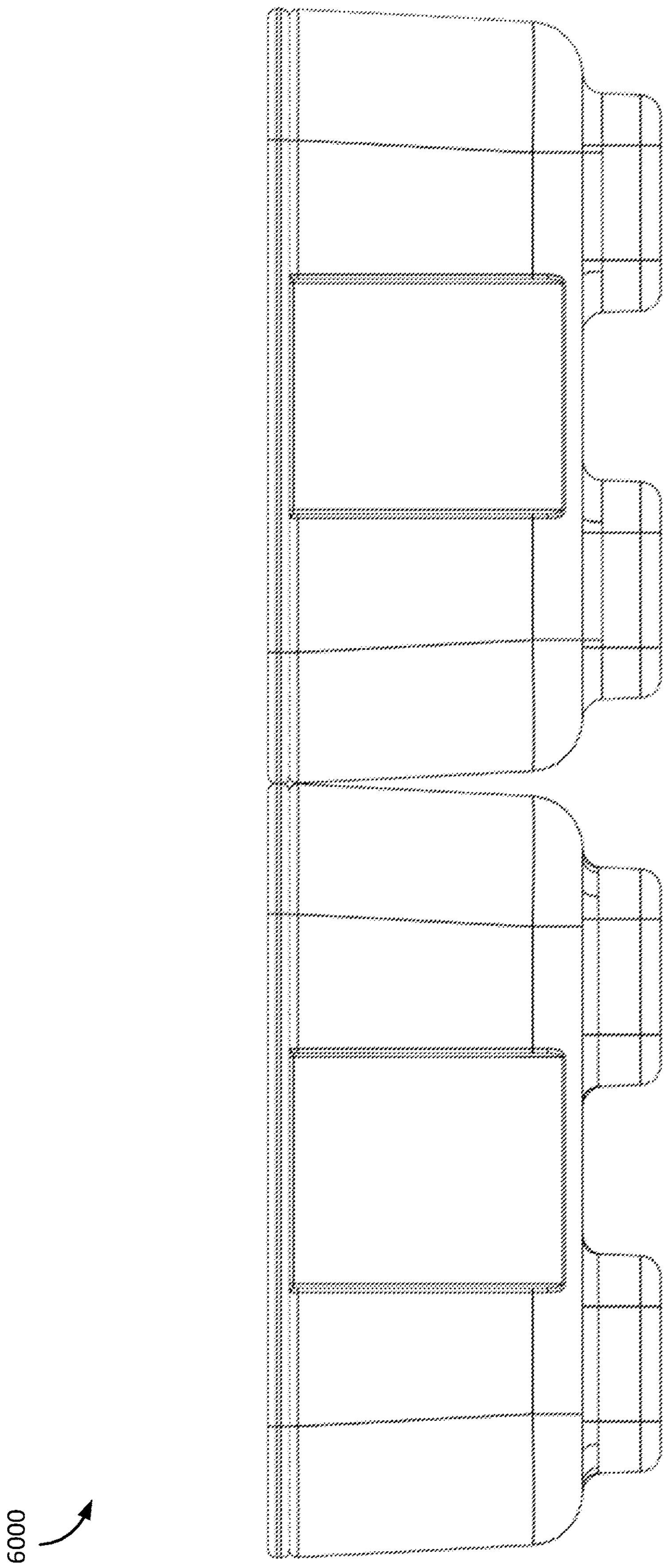
FIG. 65 illustrates a fourth side view of the plurality of storage containers in FIG. 60, according to various aspects of the present disclosure.
Figure 66:
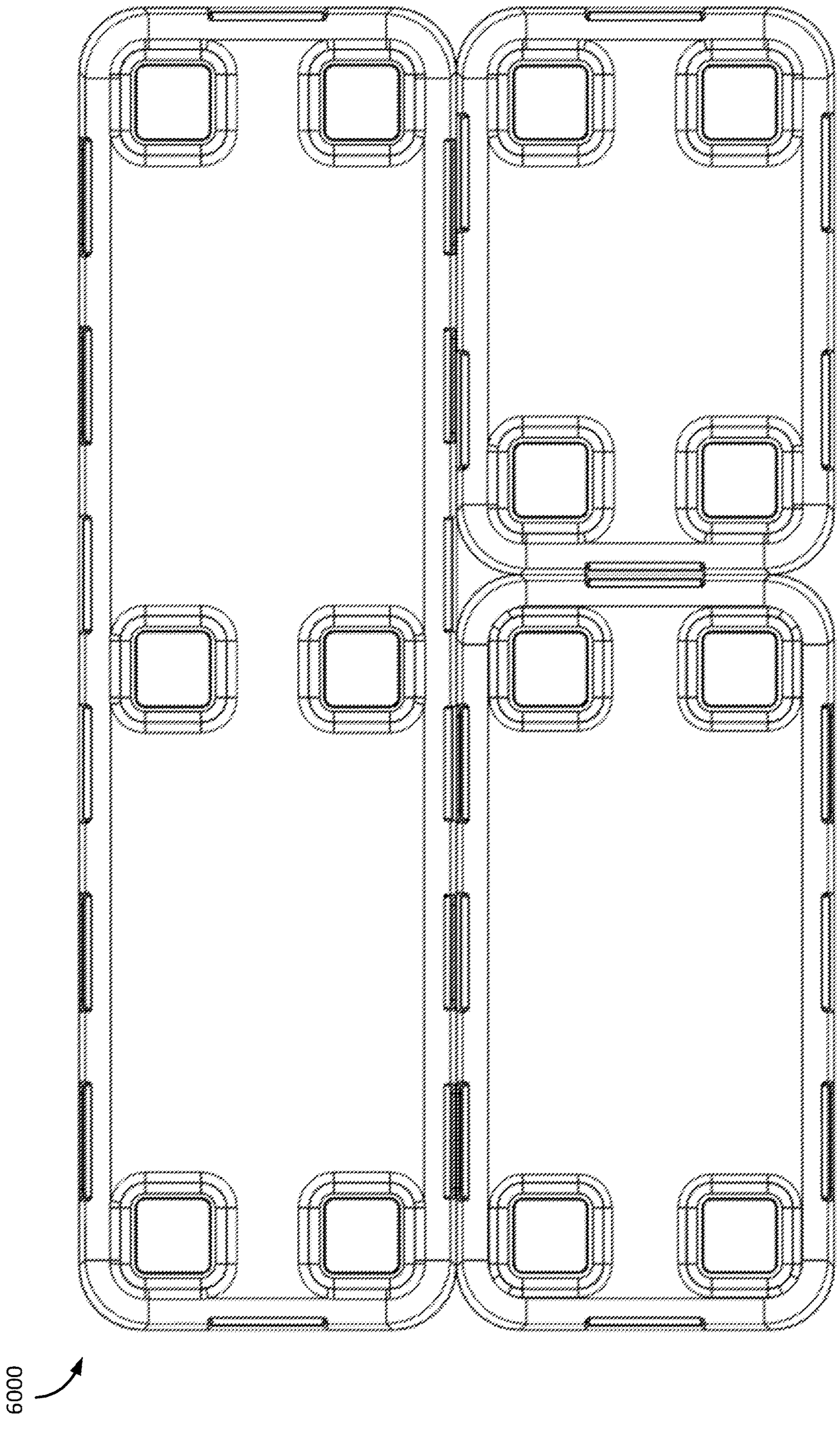
FIG. 66 illustrates a bottom view of the plurality of storage containers in FIG. 60, according to various aspects of the present disclosure.
Figure 67:
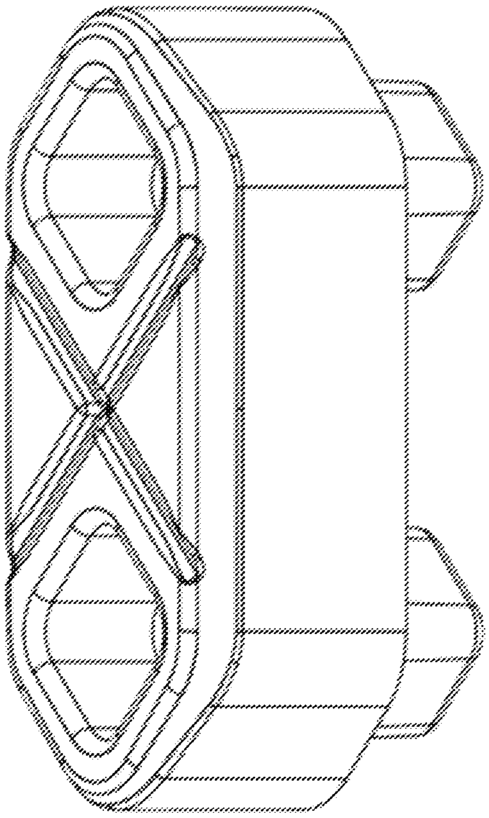
FIG. 67 illustrates a perspective top view of a first insert block, according to various aspects of the present disclosure.
Figure 68:
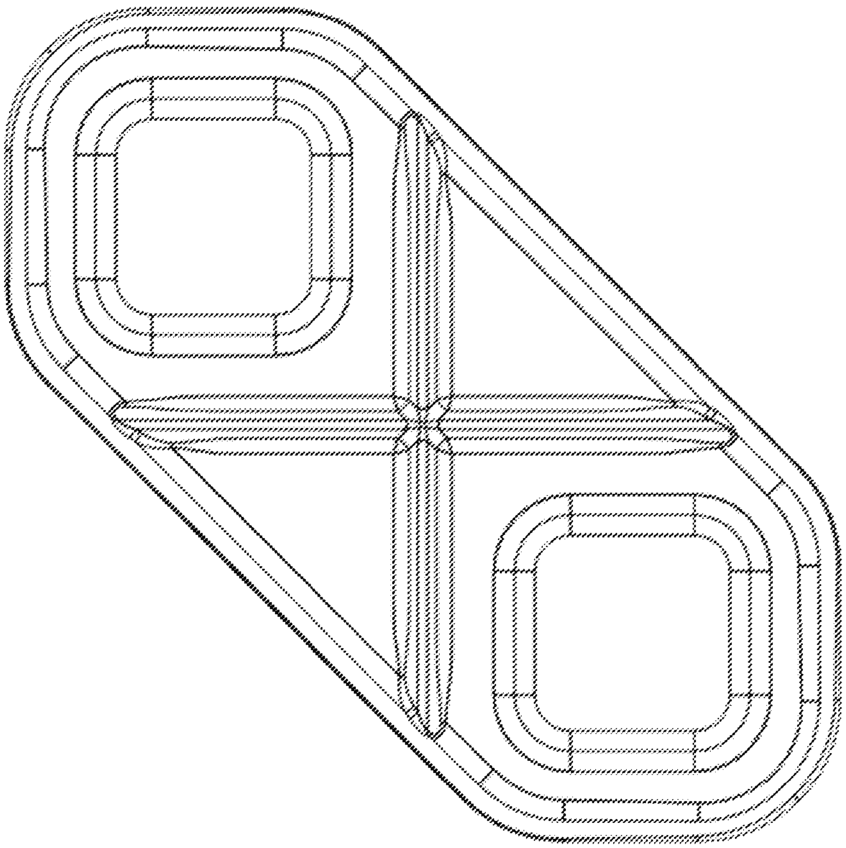
FIG. 68 illustrates a top view of the first insert block in FIG. 67, according to various aspects of the present disclosure.
Figure 69:
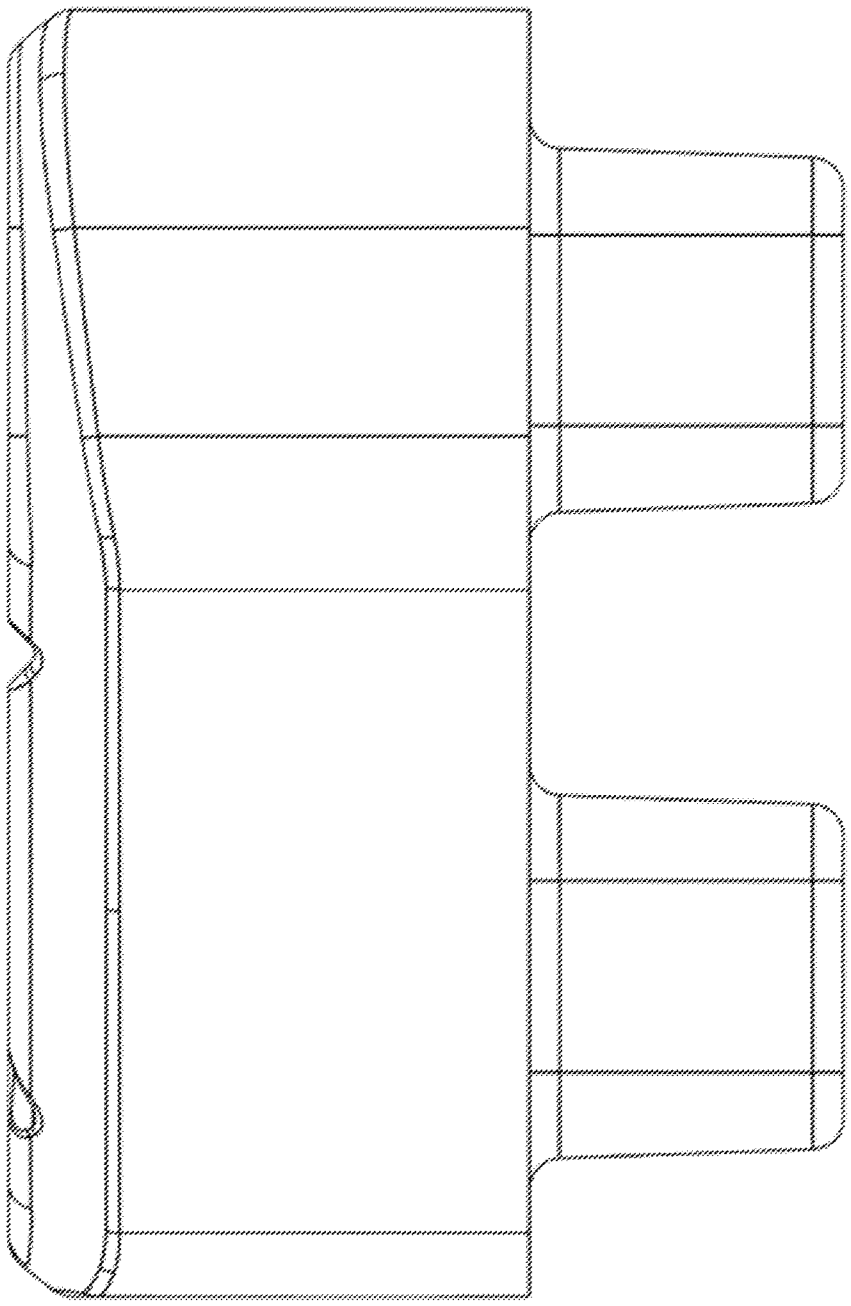
FIG. 69 illustrates a first side view of the first insert block in FIG. 67, according to various aspects of the present disclosure.
Figure 70:
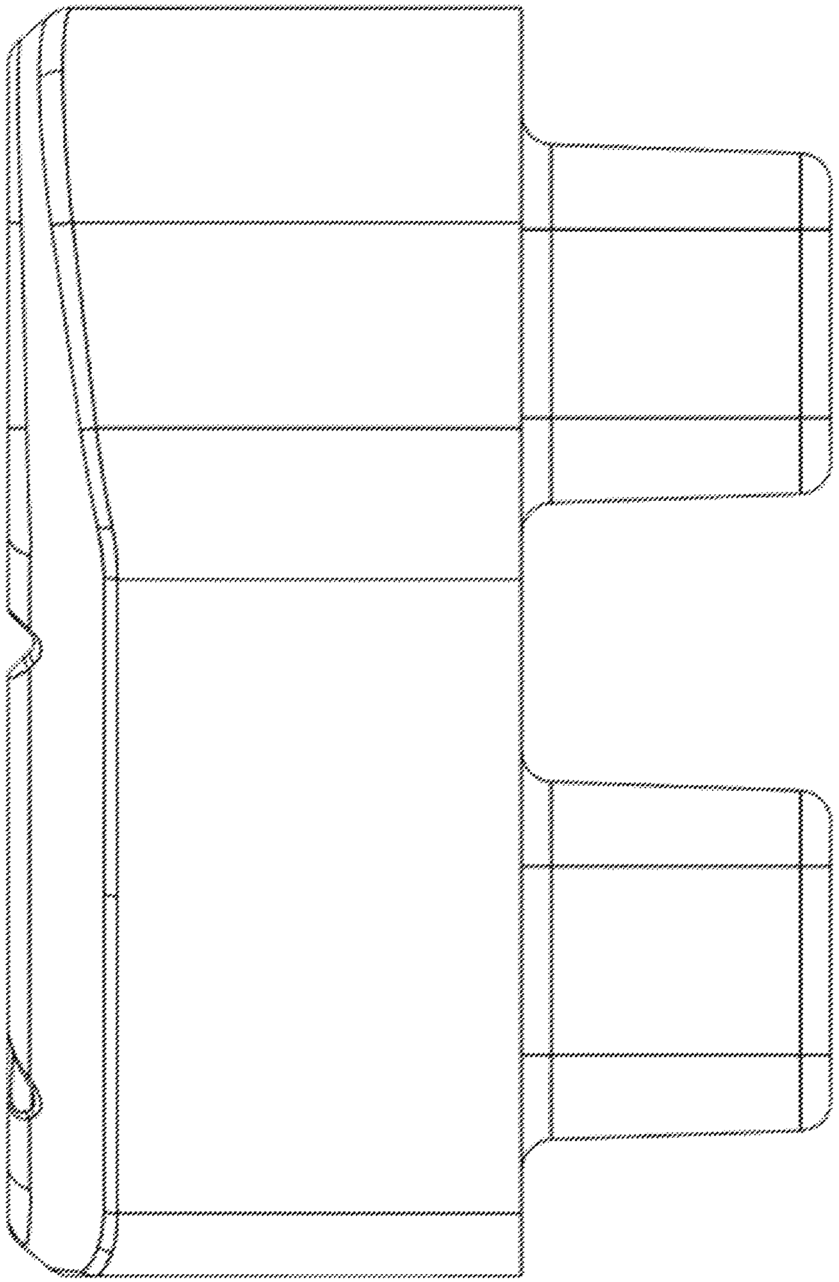
FIG. 70 illustrates a second side view of the first insert block in FIG. 67, according to various aspects of the present disclosure.
Figure 71:
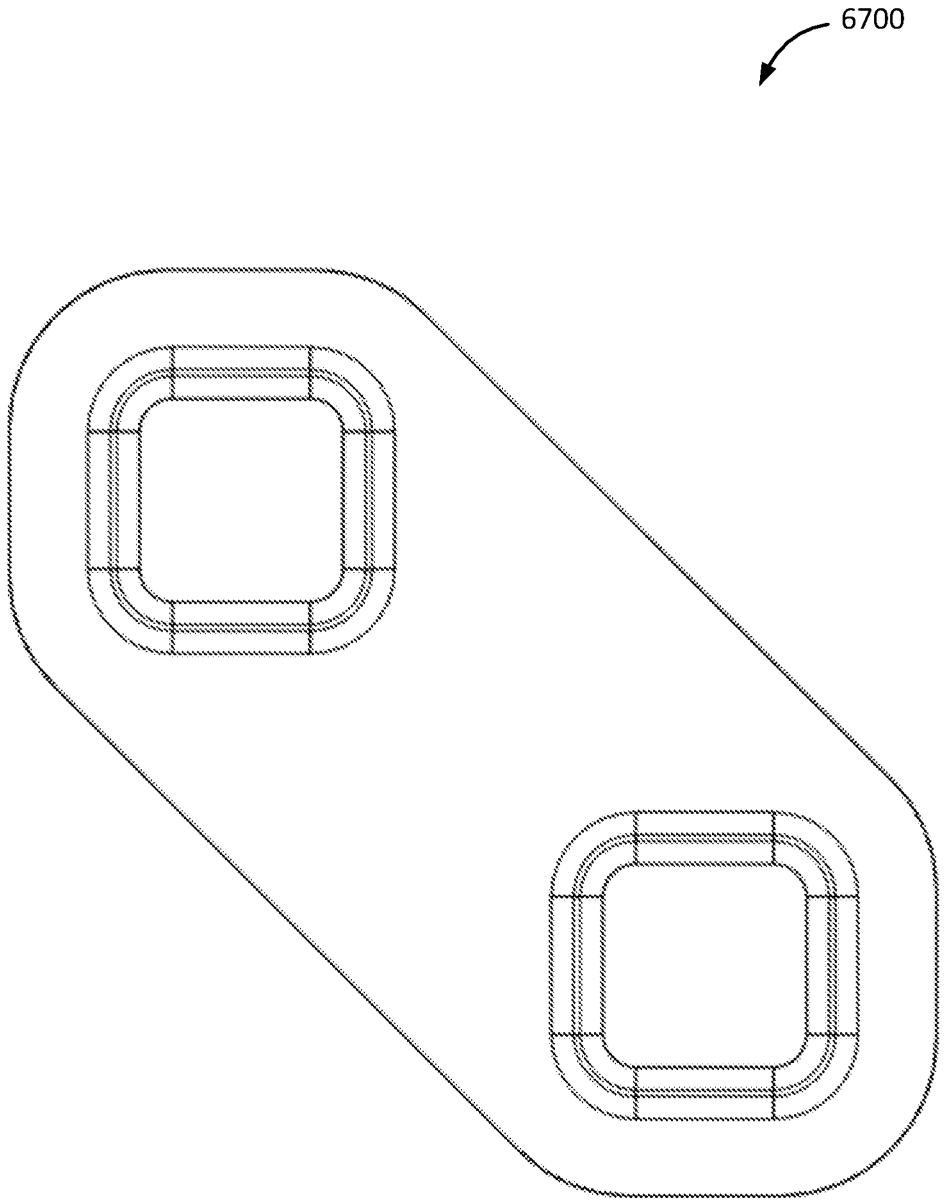
FIG. 71 illustrates a bottom view of the first insert block in FIG. 67, according to various aspects of the present disclosure.
Figure 72:
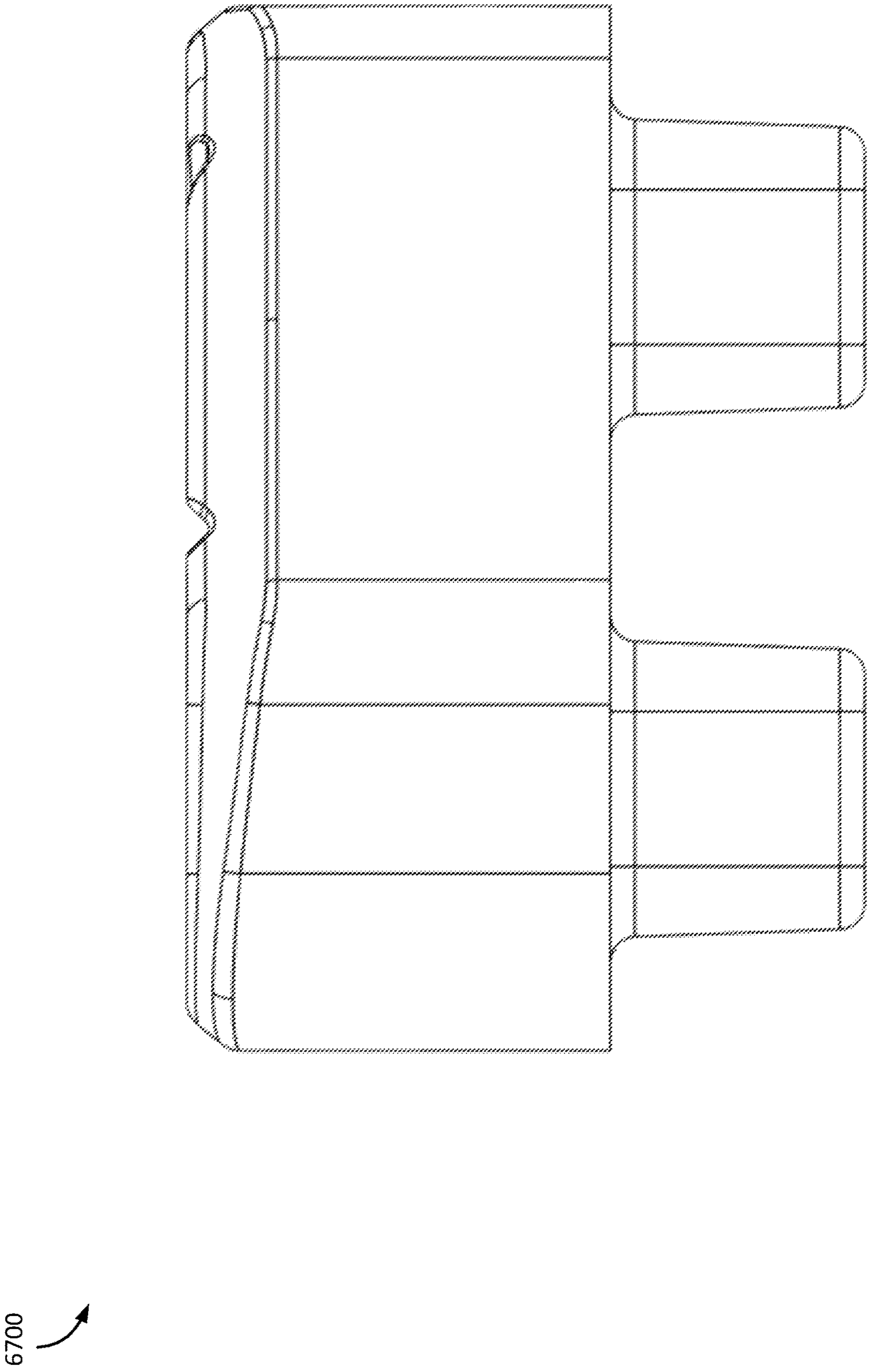
FIG. 72 illustrates a third side view of the first insert block in FIG. 67, according to various aspects of the present disclosure.
Figure 73:
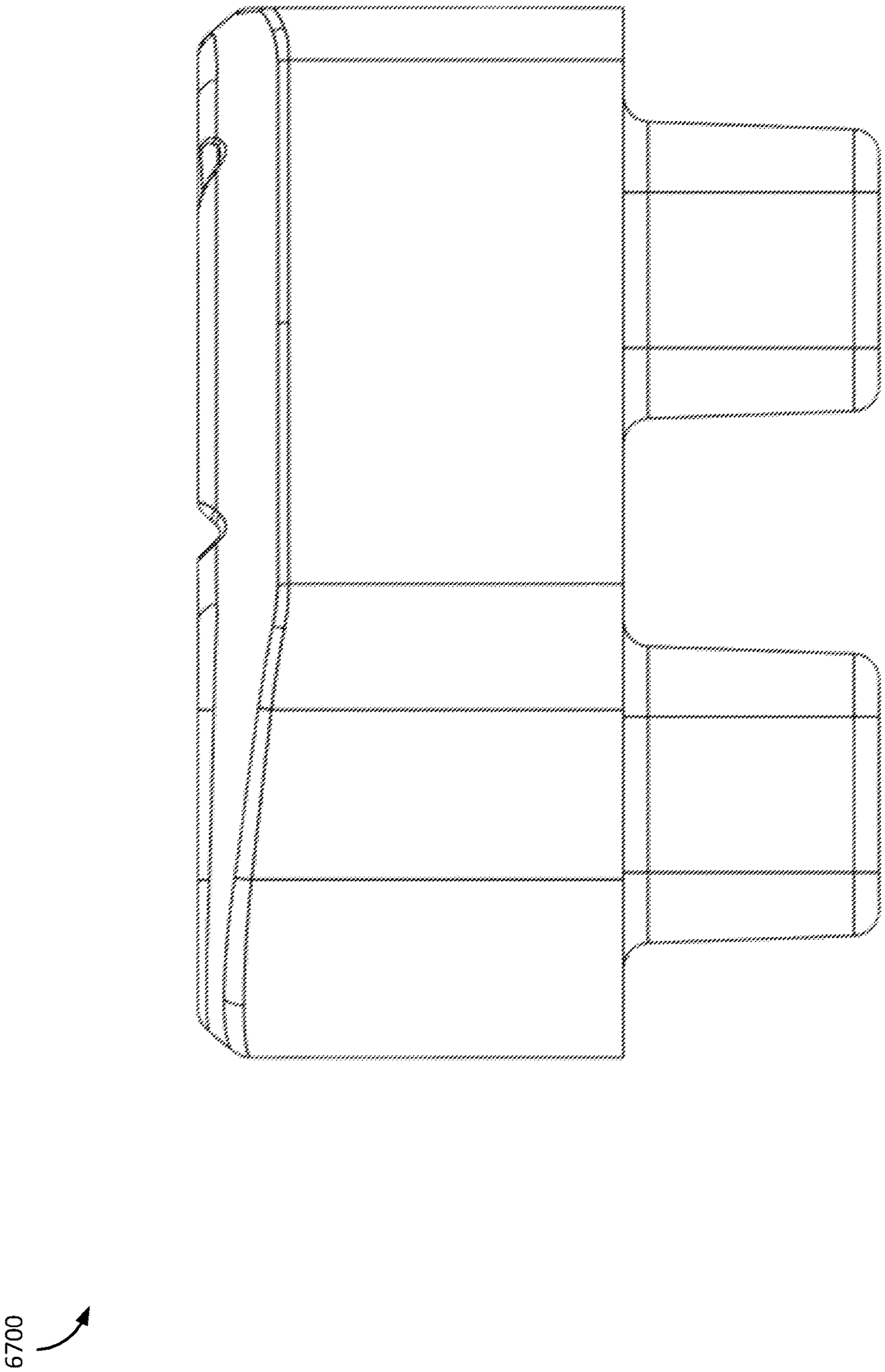
FIG. 73 illustrates a fourth side view of the first insert block in FIG. 67, according to various aspects of the present disclosure.
Figure 74:
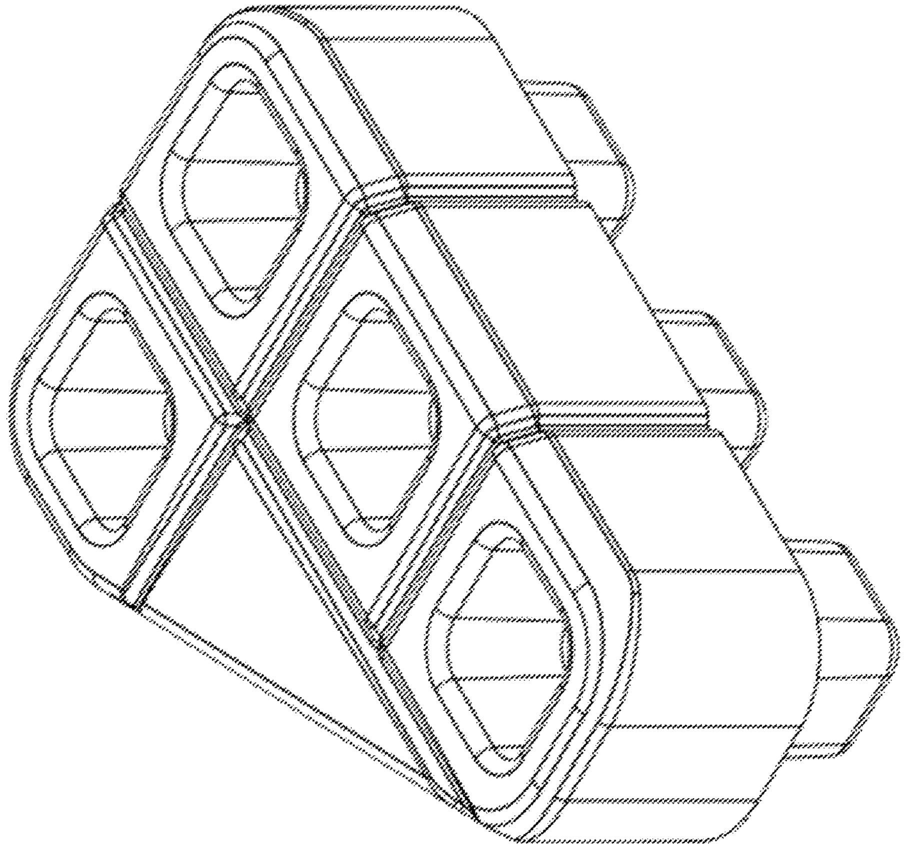
FIG. 74 illustrates a perspective top view of a second insert block, according to various aspects of the present disclosure.
Figure 75:
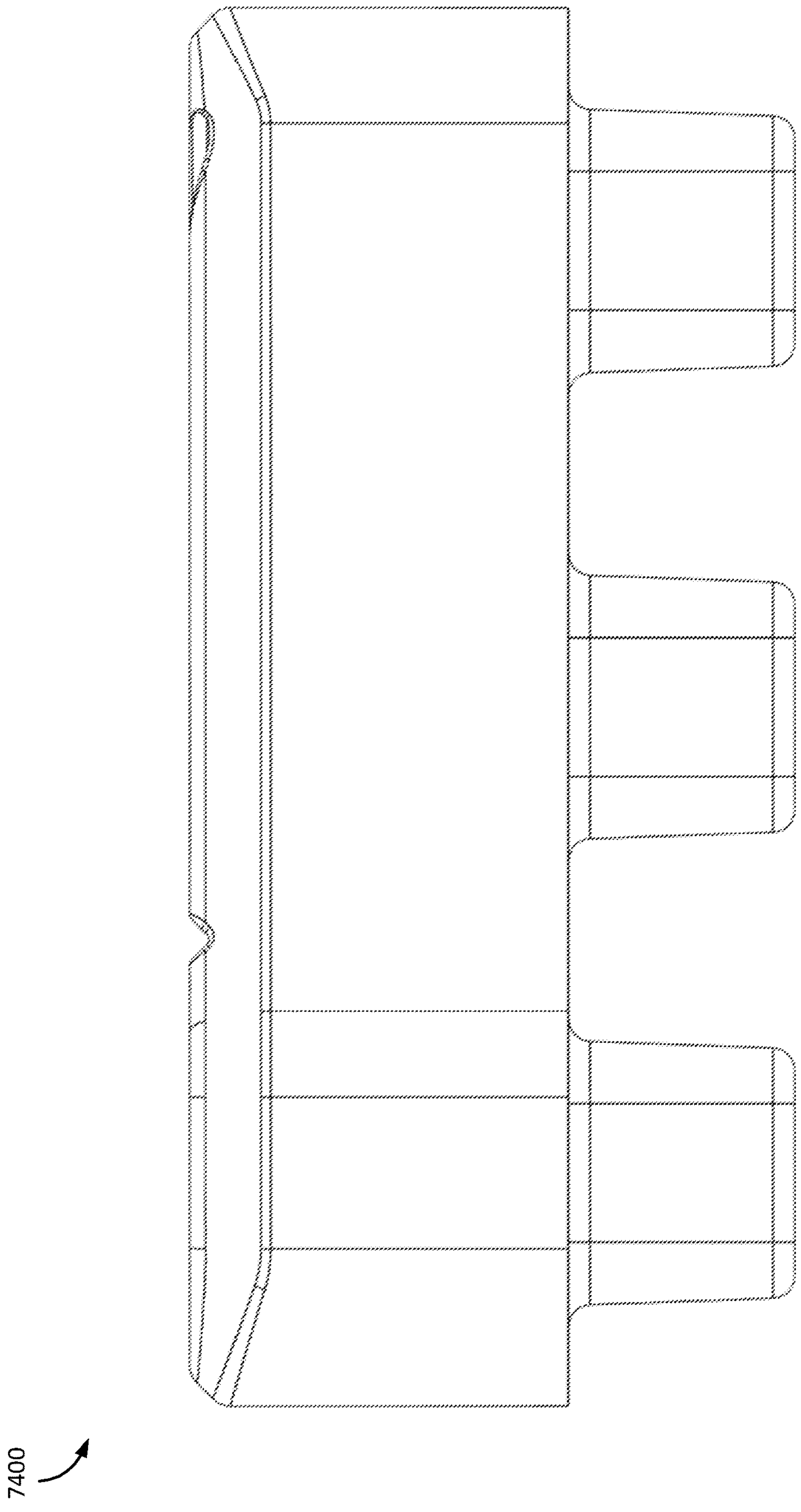
FIG. 75 illustrates a first side view of the second insert block in FIG. 74, according to various aspects of the present disclosure.
Figure 76:
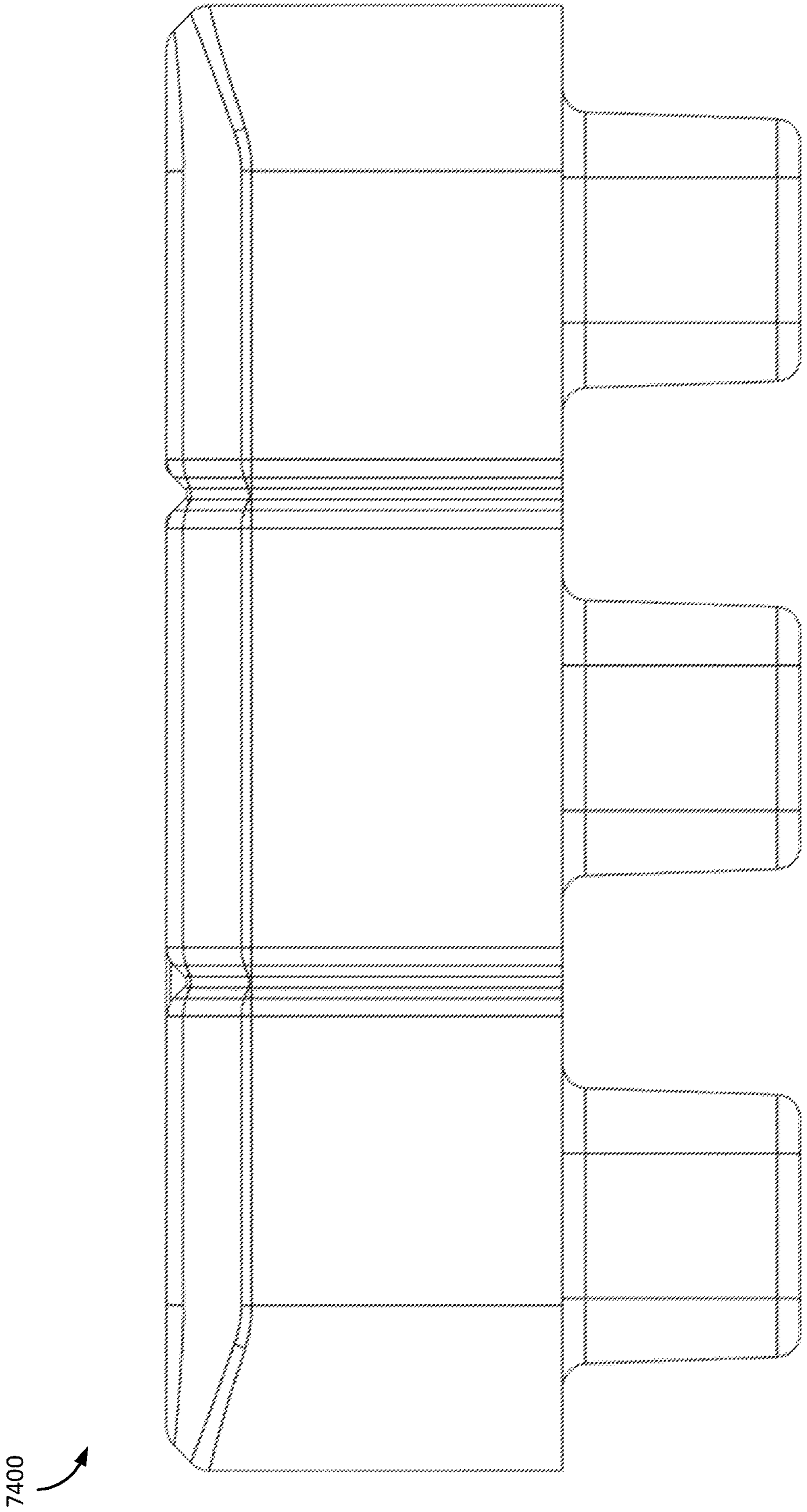
FIG. 76 illustrates a second side view of the second insert block in FIG. 74, according to various aspects of the present disclosure.
Figure 77:
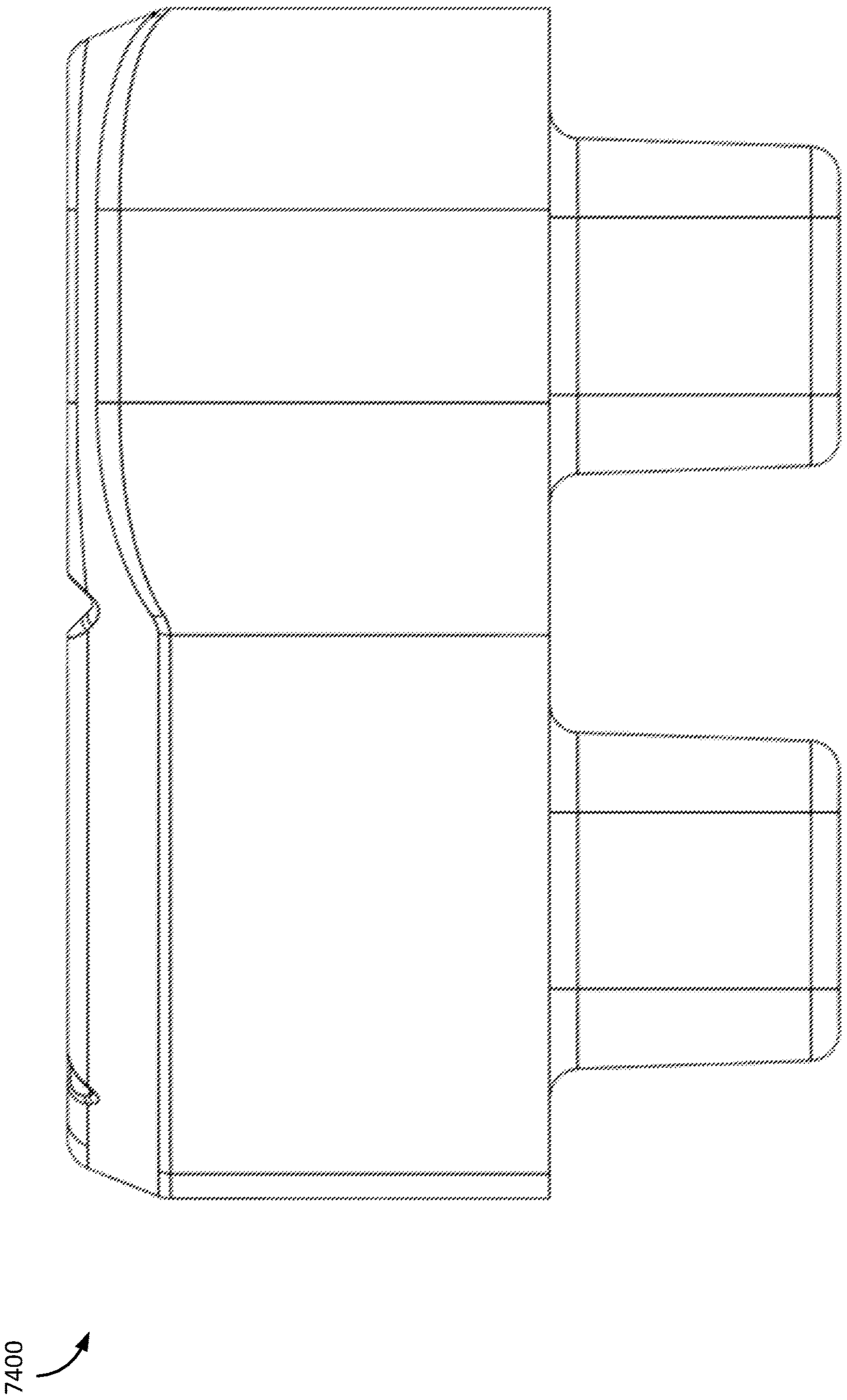
FIG. 77 illustrates a third side view of the second insert block in FIG. 74, according to various aspects of the present disclosure.
Figure 78:
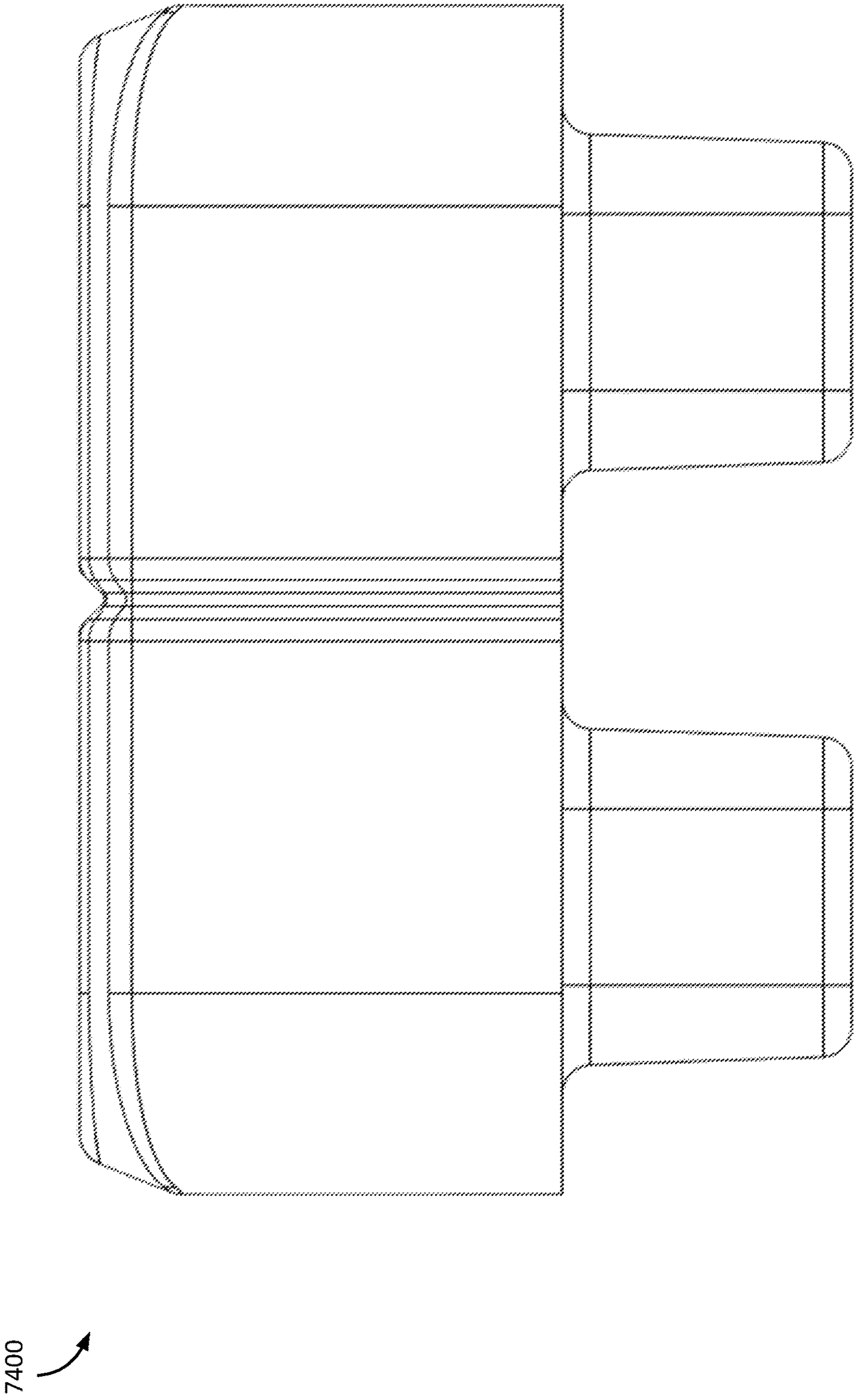
FIG. 78 illustrates a fourth side view of the second insert block in FIG. 74, according to various aspects of the present disclosure.
Figure 79:
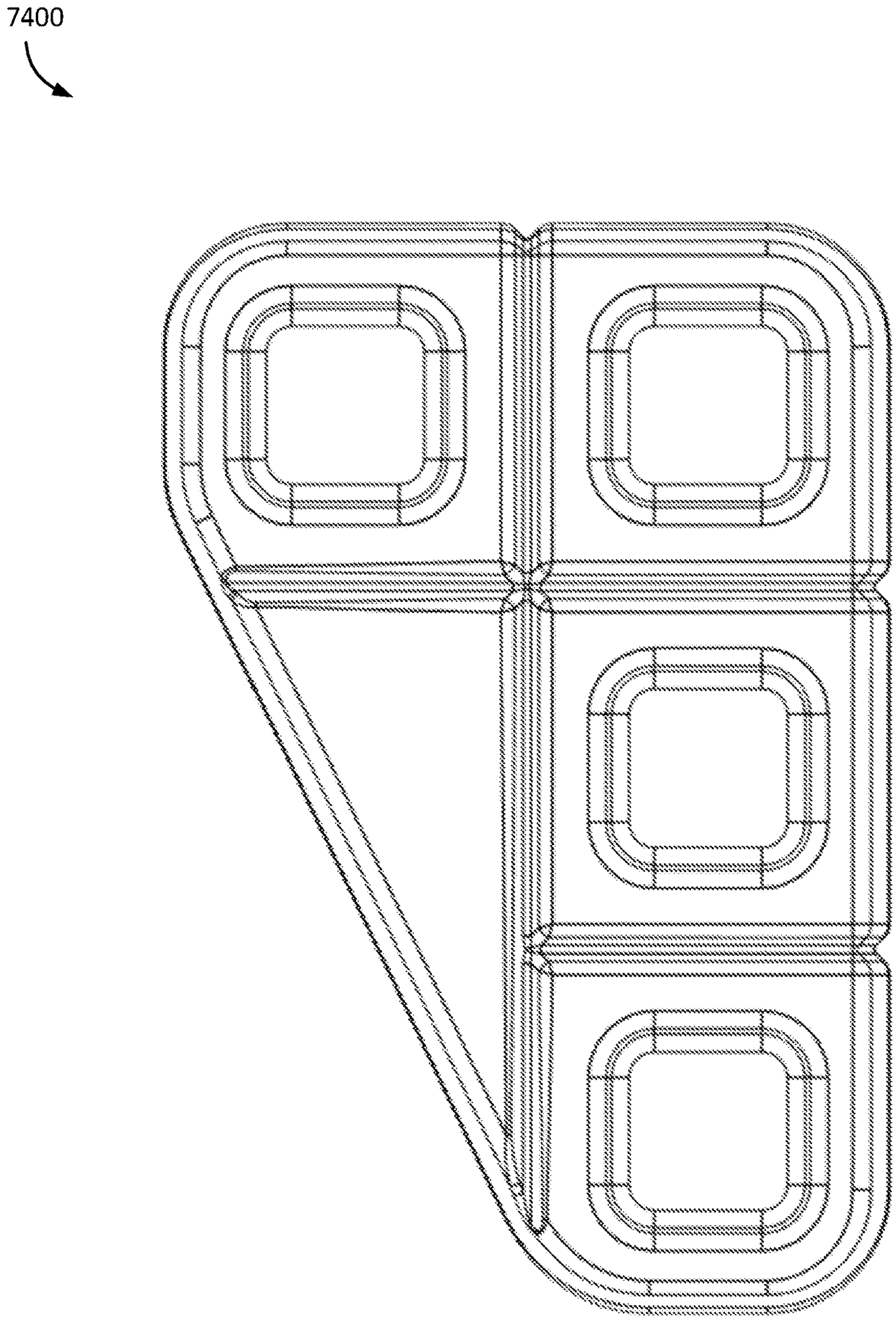
FIG. 79 illustrates a top view of the second insert block in FIG. 74, according to various aspects of the present disclosure.
Figure 80:
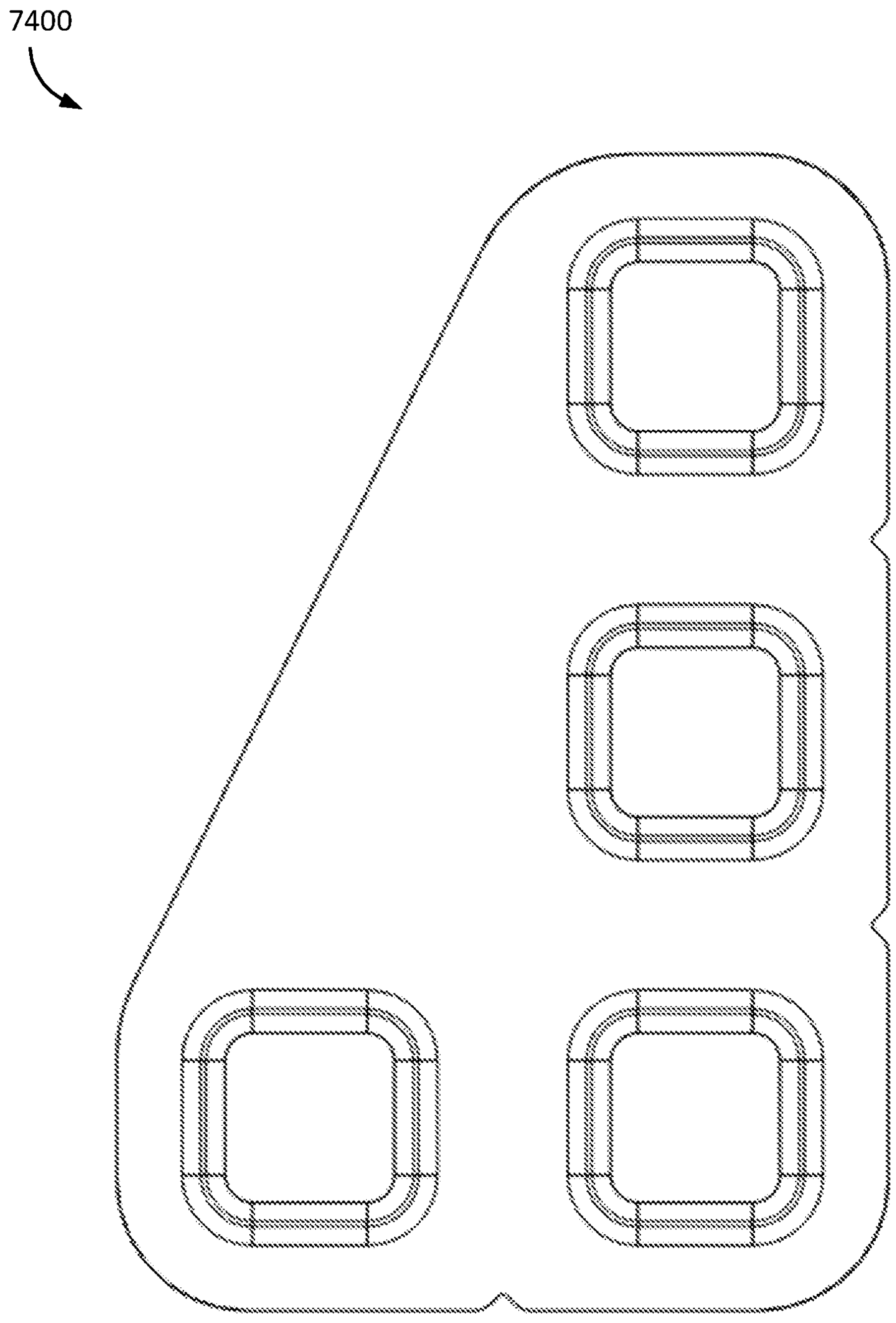
FIG. 80 illustrates a bottom view of the second insert block in FIG. 74, according to various aspects of the present disclosure.
Figure 81:
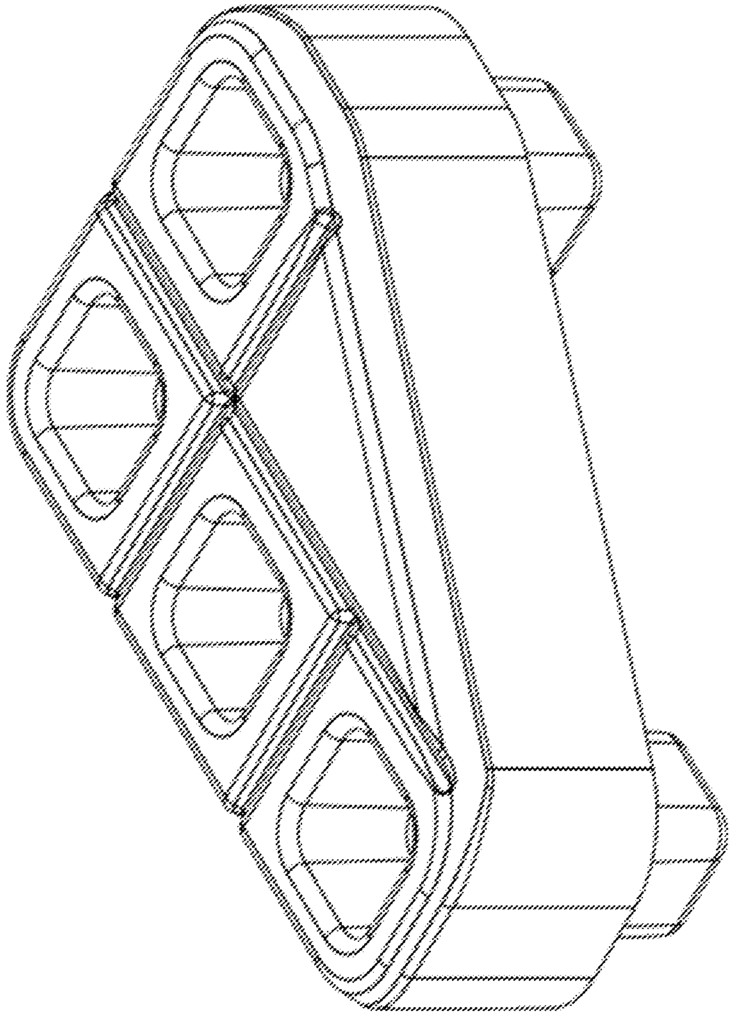
FIG. 81 illustrates a perspective top view of a third insert block, according to various aspects of the present disclosure.
Figure 82:
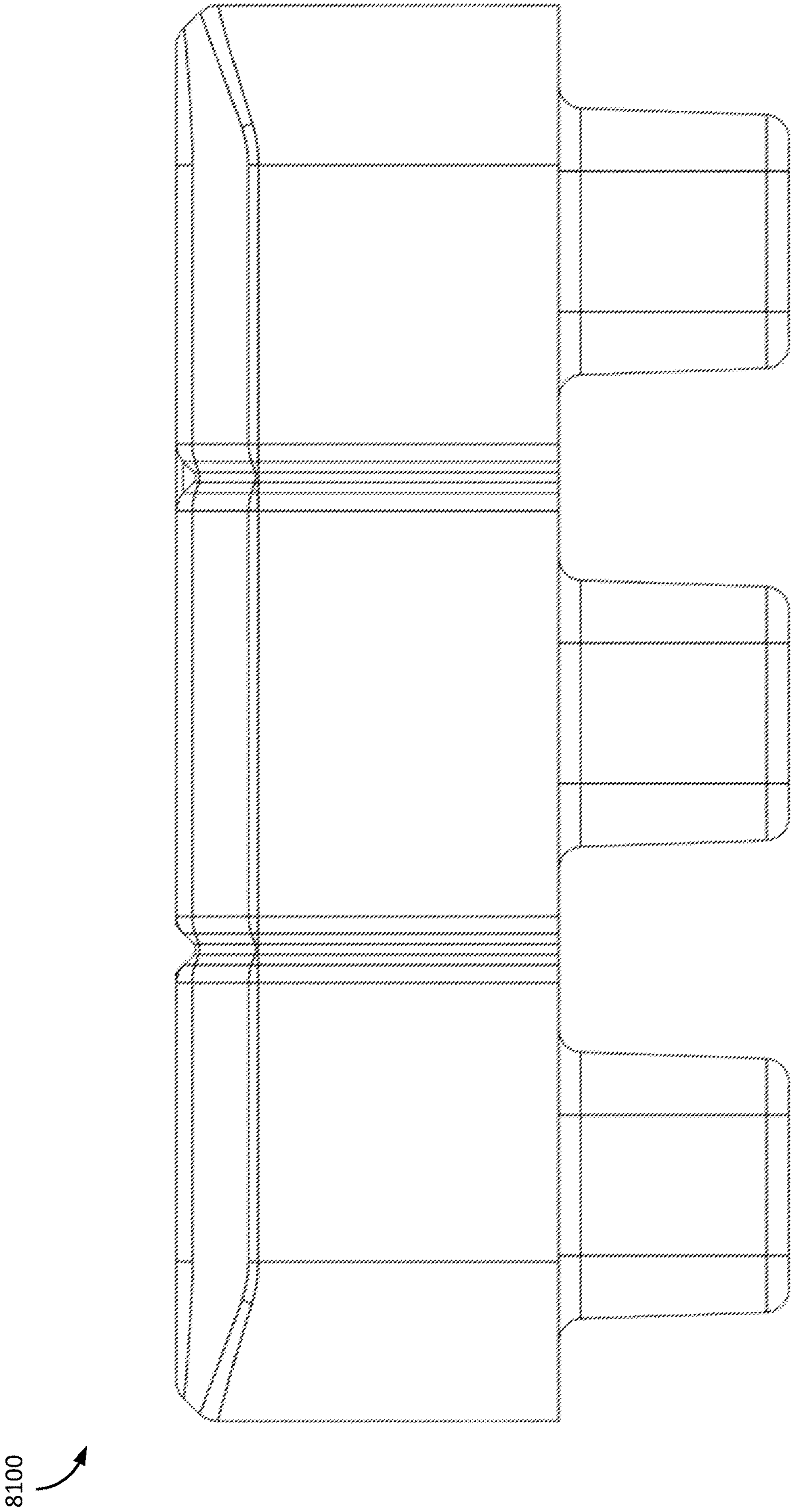
FIG. 82 illustrates a first side view of the third insert block in FIG. 81, according to various aspects of the present disclosure.
Figure 83:
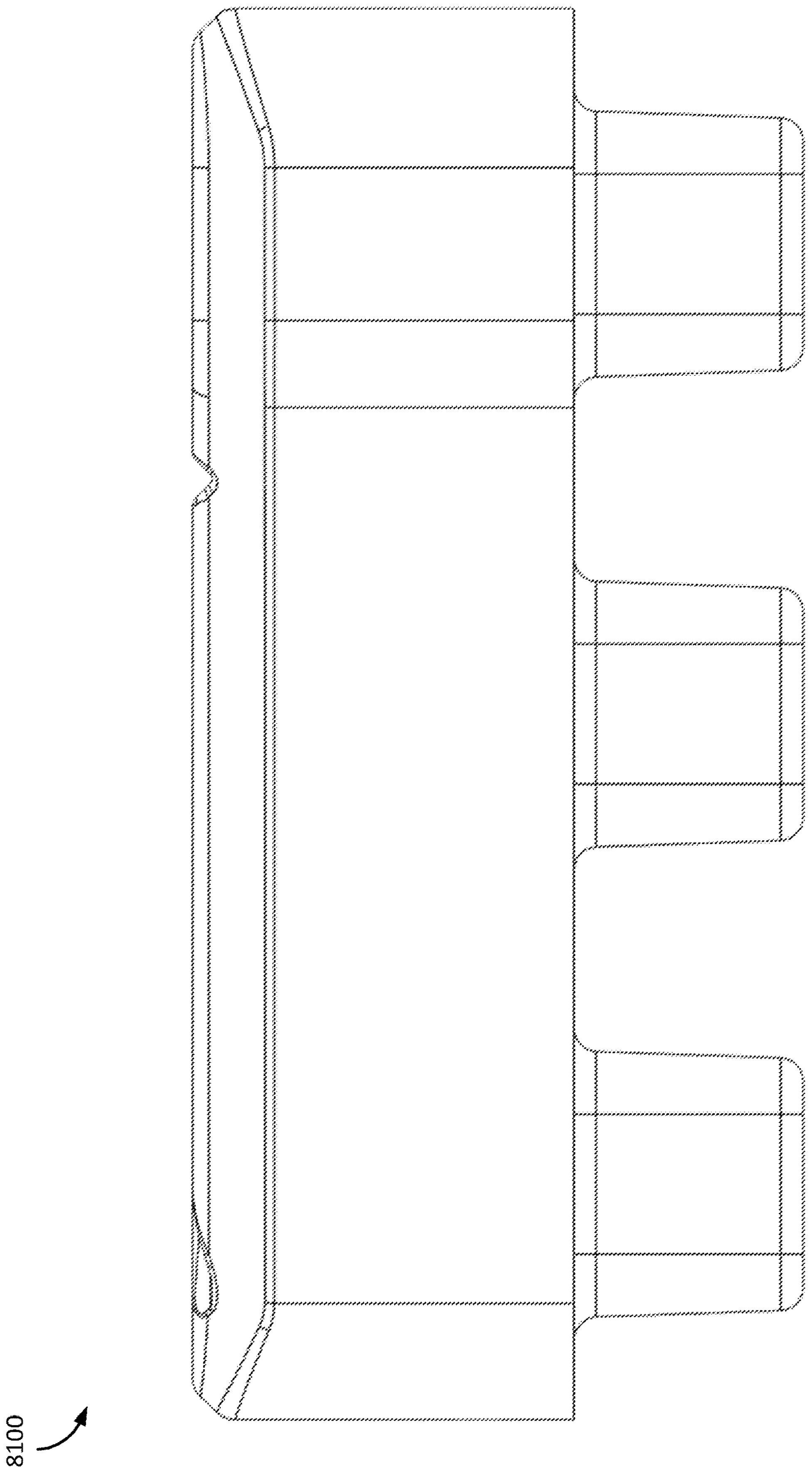
FIG. 83 illustrates a second side view of the third insert block in FIG. 81, according to various aspects of the present disclosure.
Figure 84:
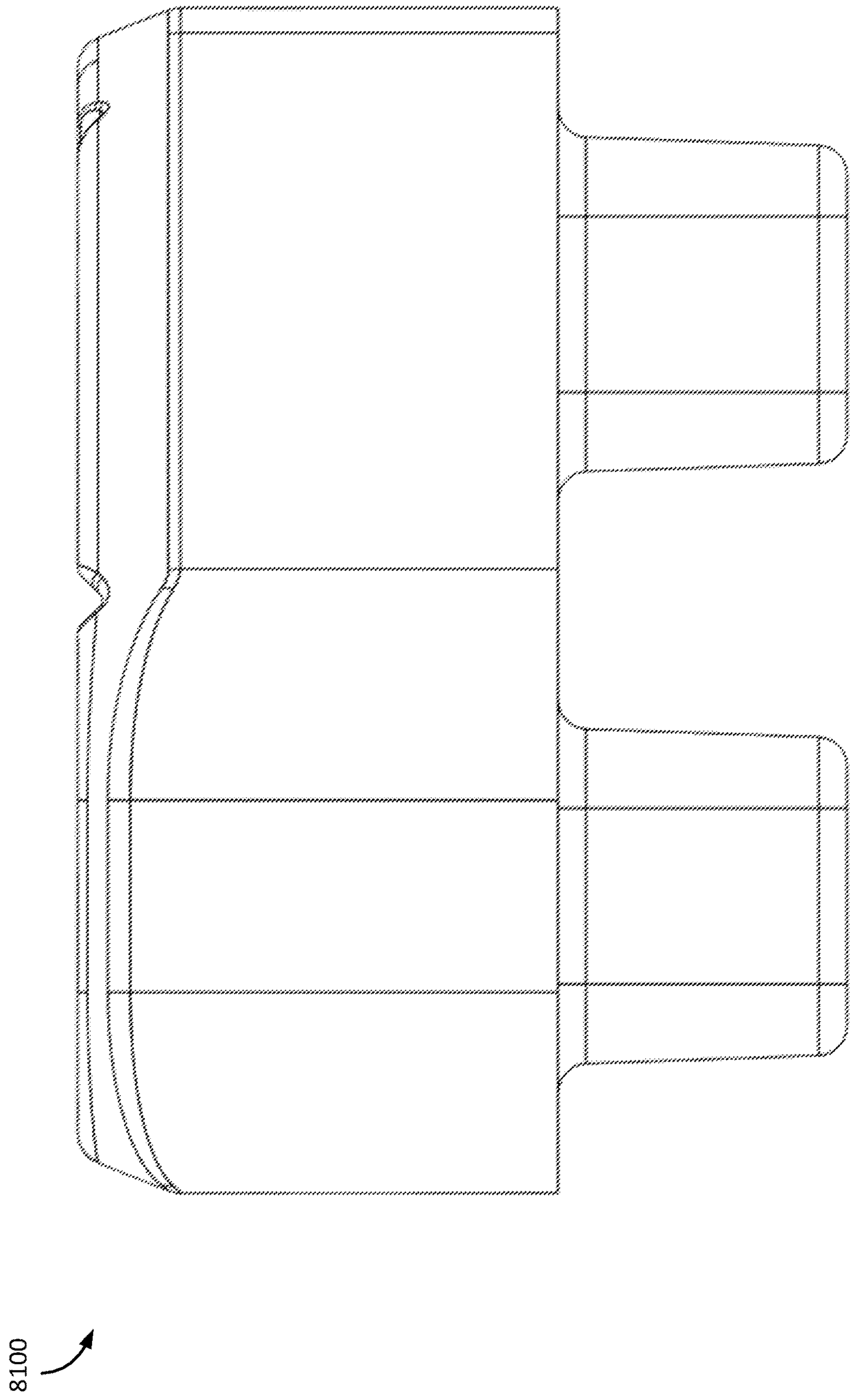
FIG. 84 illustrates a third side view of the third insert block in FIG. 81, according to various aspects of the present disclosure.
Figure 85:
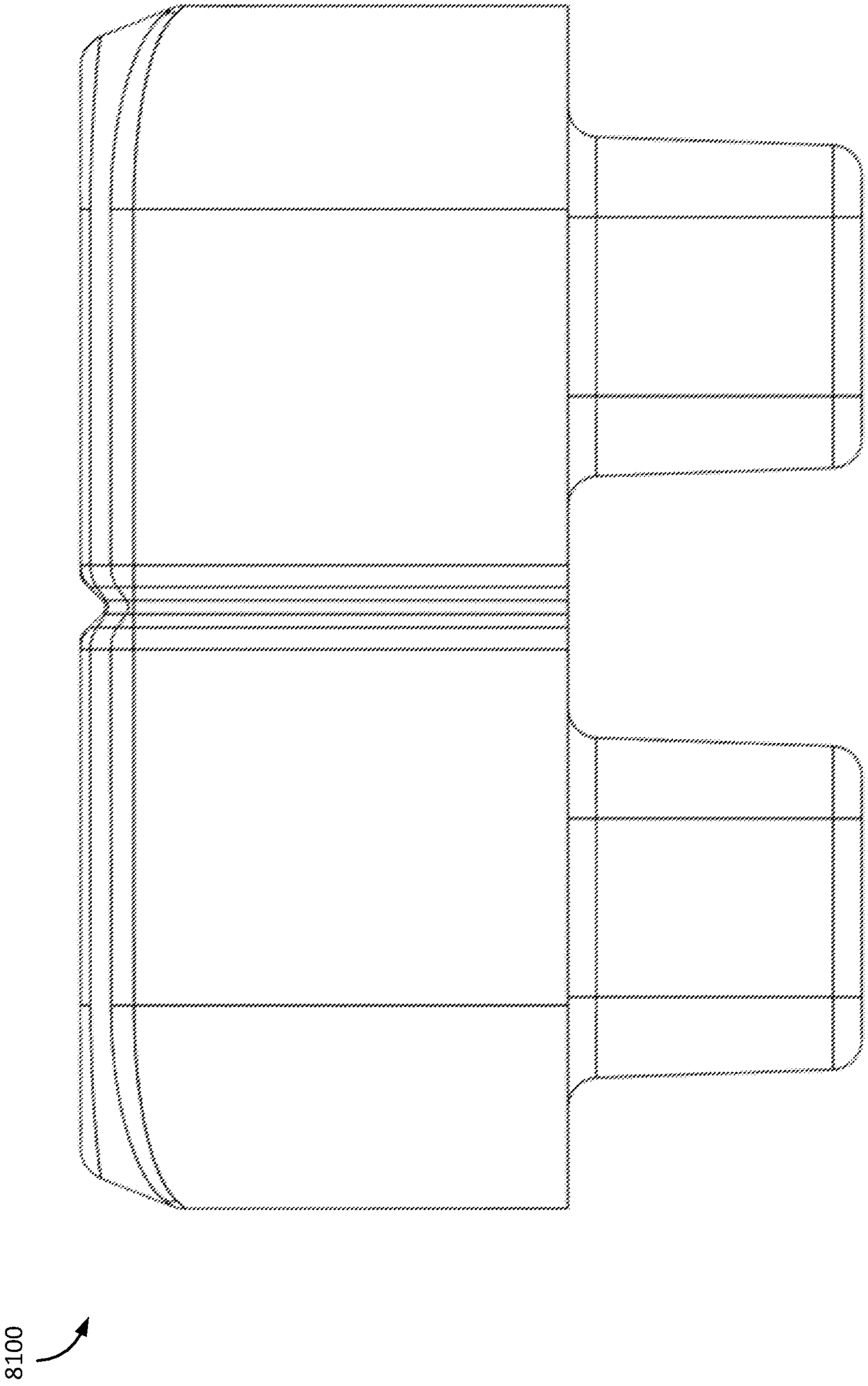
FIG. 85 illustrates a fourth side view of the third insert block in FIG. 81, according to various aspects of the present disclosure.
Figure 86:
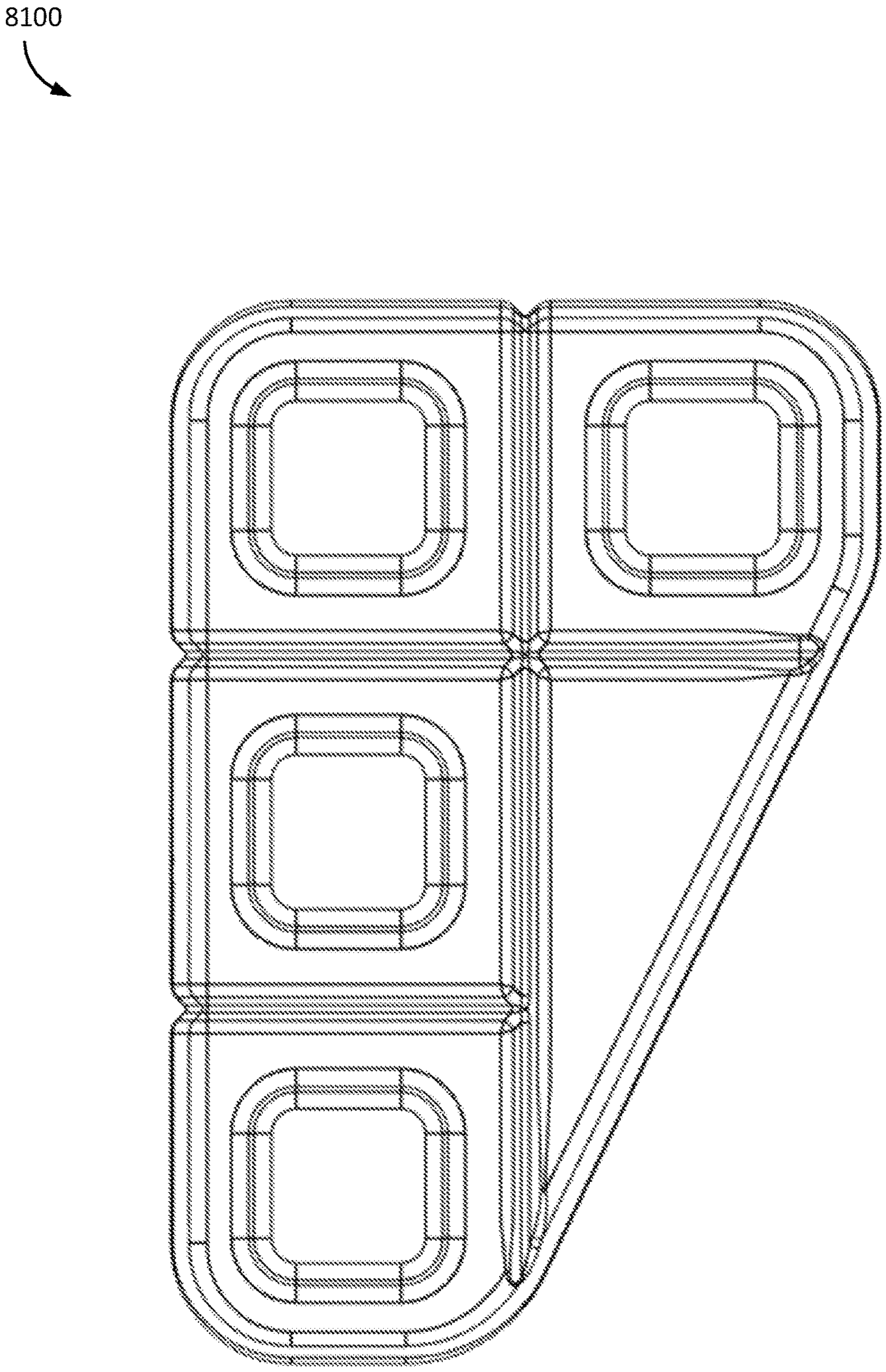
FIG. 86 illustrates a top view of the third insert block in FIG. 81, according to various aspects of the present disclosure.
Figure 87:
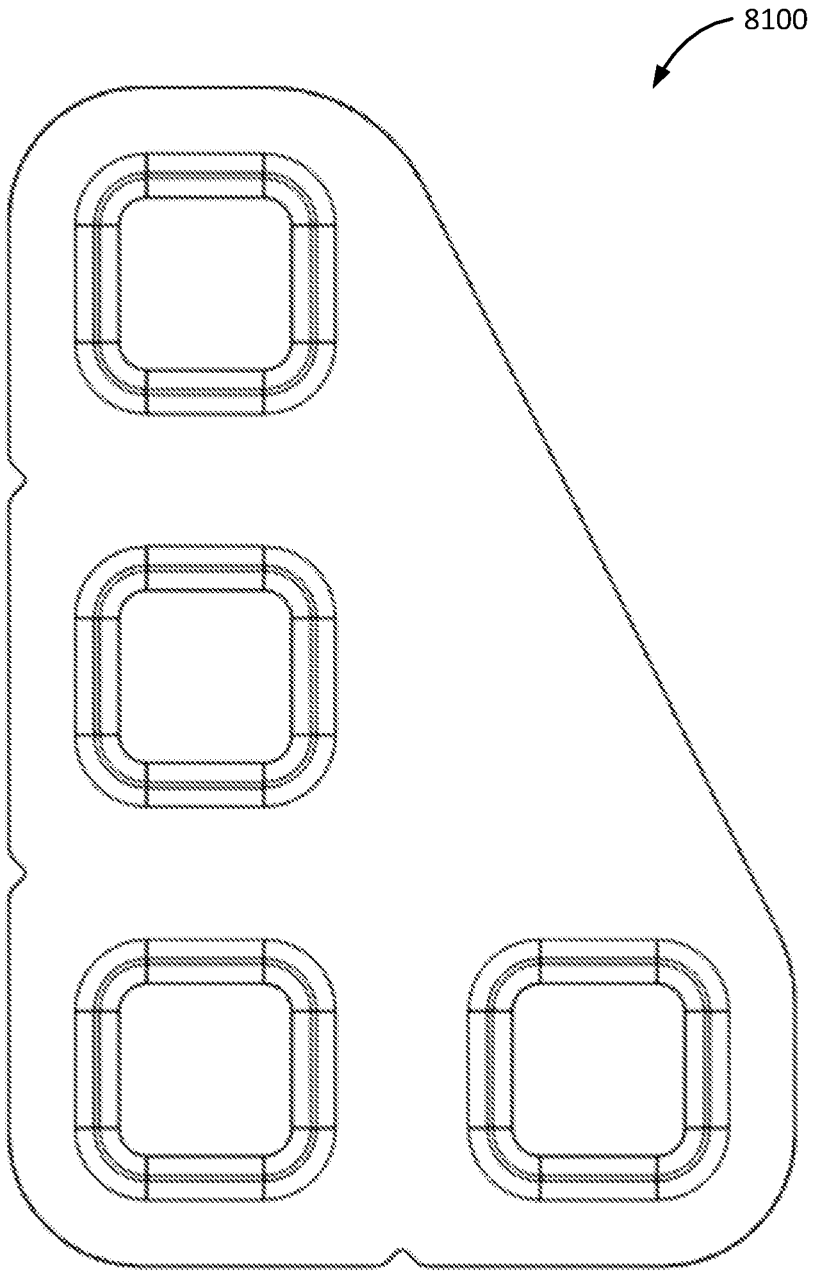
FIG. 87 illustrates a bottom view of the third insert block in FIG. 81, according to various aspects of the present disclosure.
Figure 88:
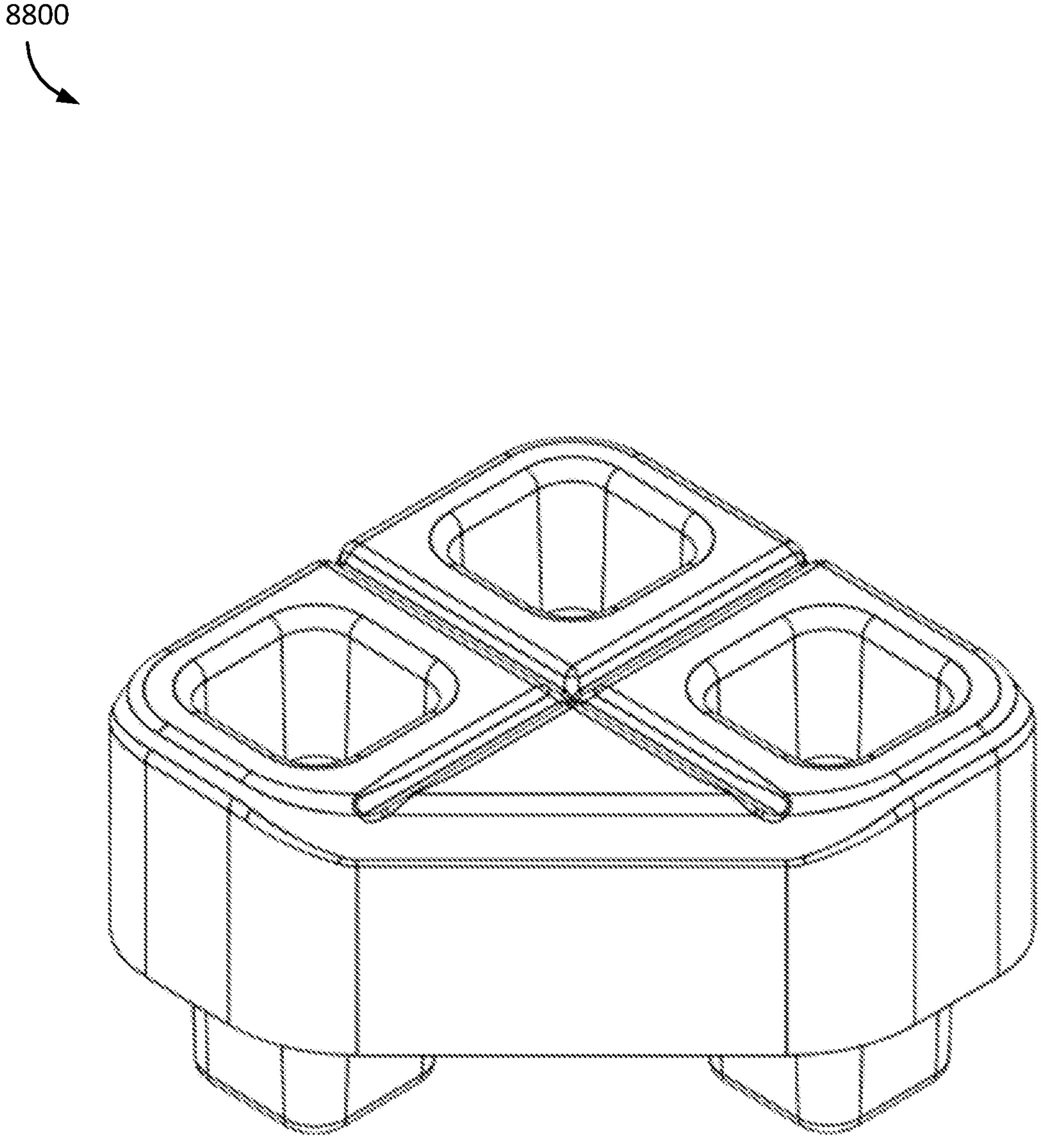
FIG. 88 illustrates a perspective top view of a fourth insert block, according to various aspects of the present disclosure.
Figure 89:
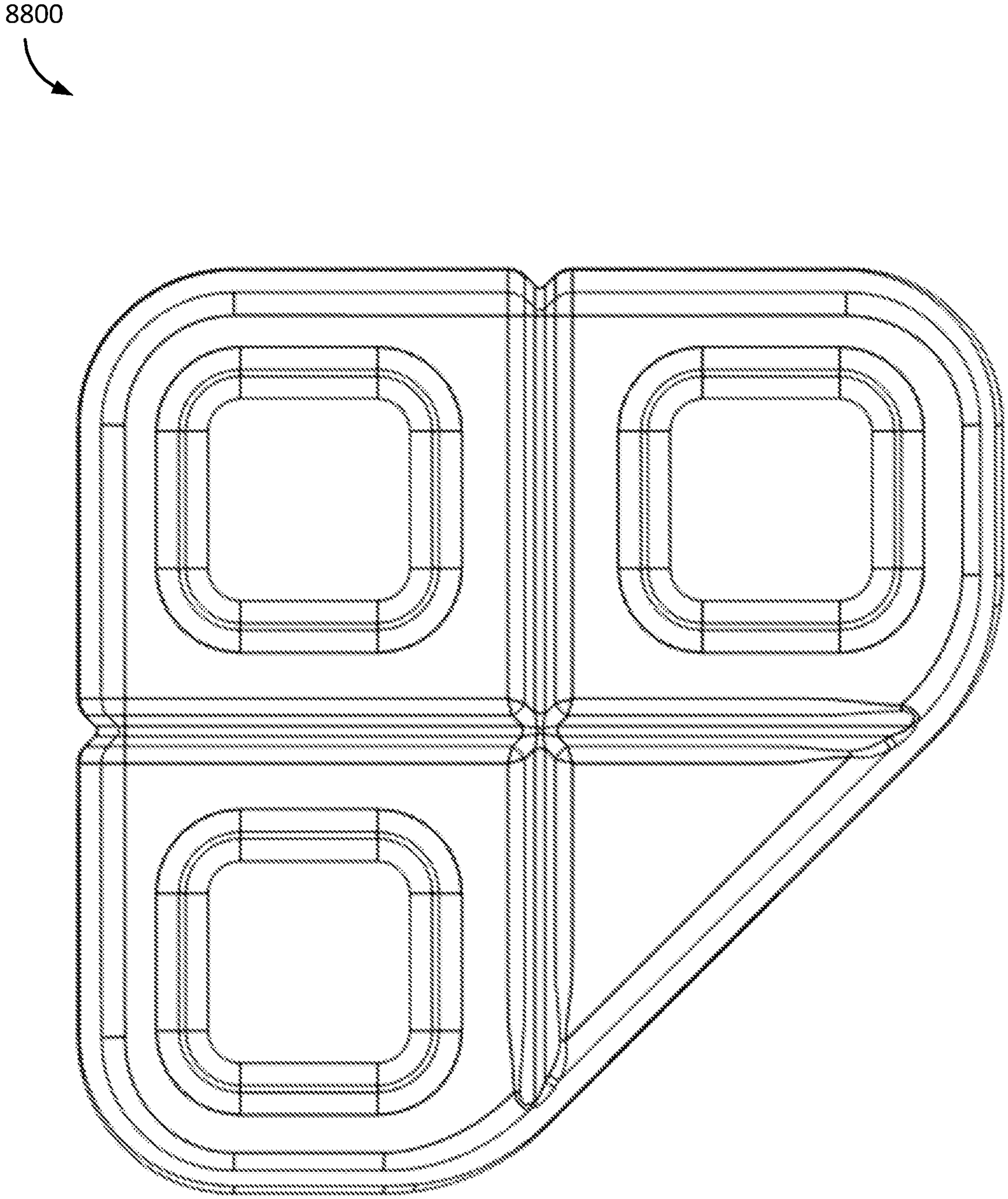
FIG. 89 illustrates a top view of the fourth insert block in FIG. 88, according to various aspects of the present disclosure.
Figure 90:
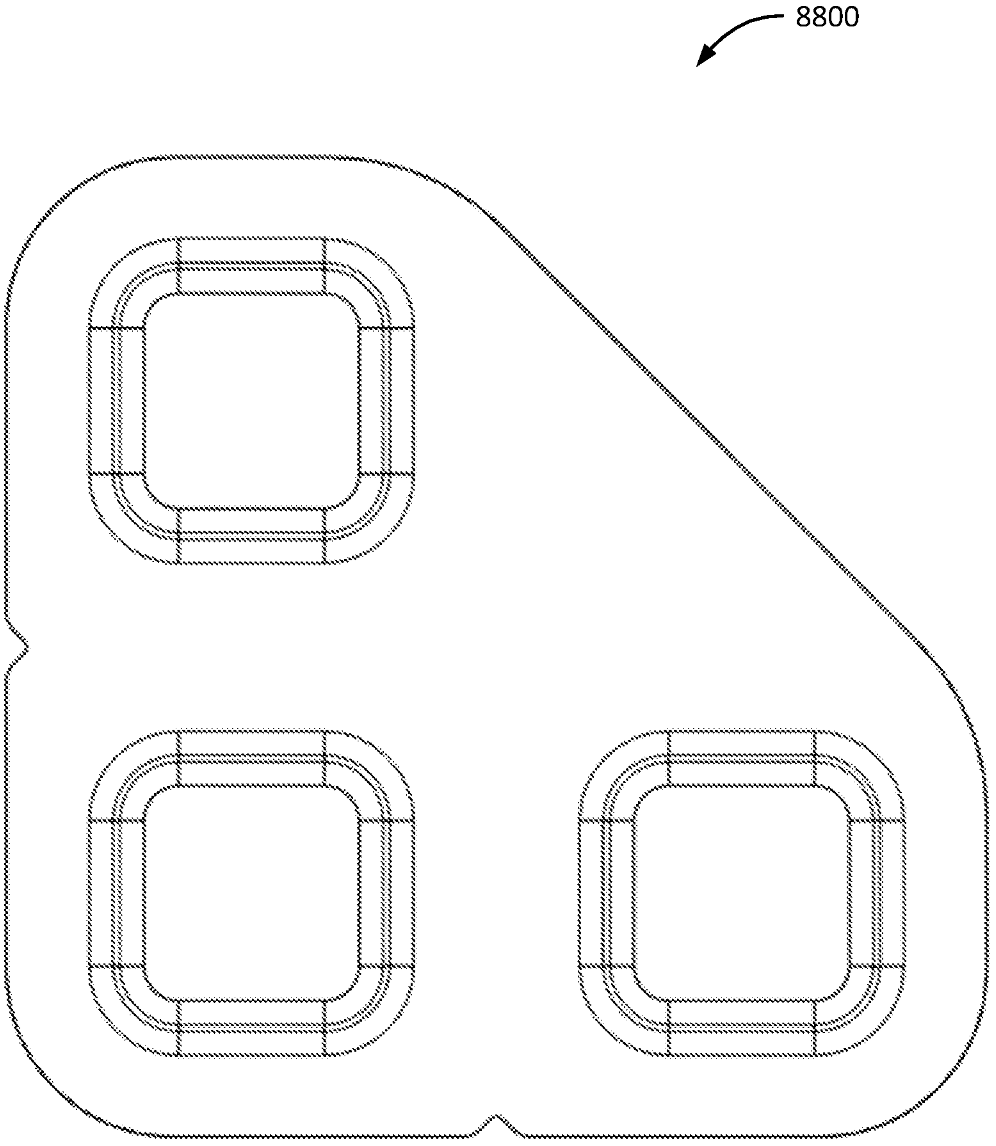
FIG. 90 illustrates a bottom view of the fourth insert block in FIG. 88, according to various aspects of the present disclosure.
Figure 91:
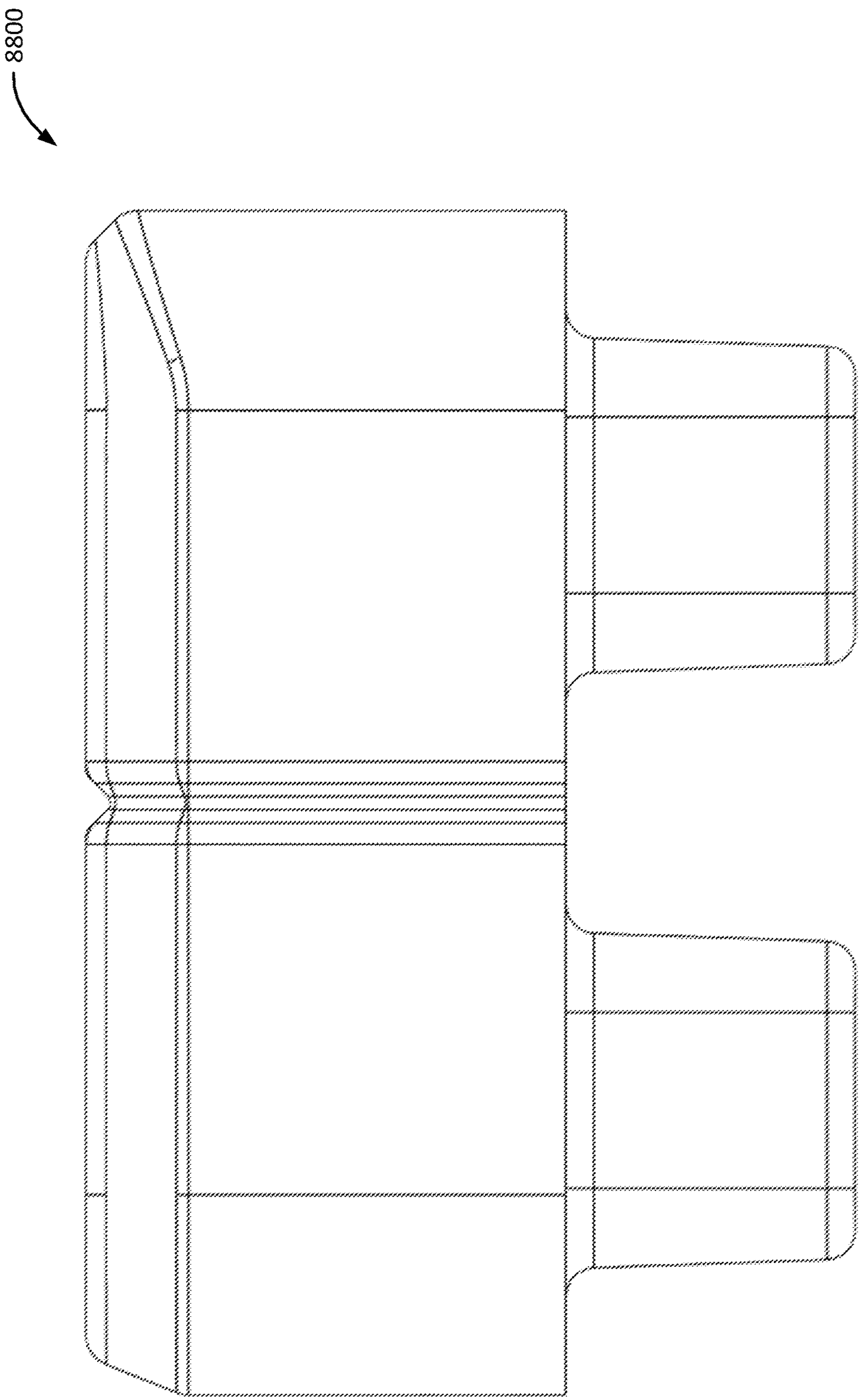
FIG. 91 illustrates a first side view of the fourth insert block in FIG. 88, according to various aspects of the present disclosure.
Figure 92:
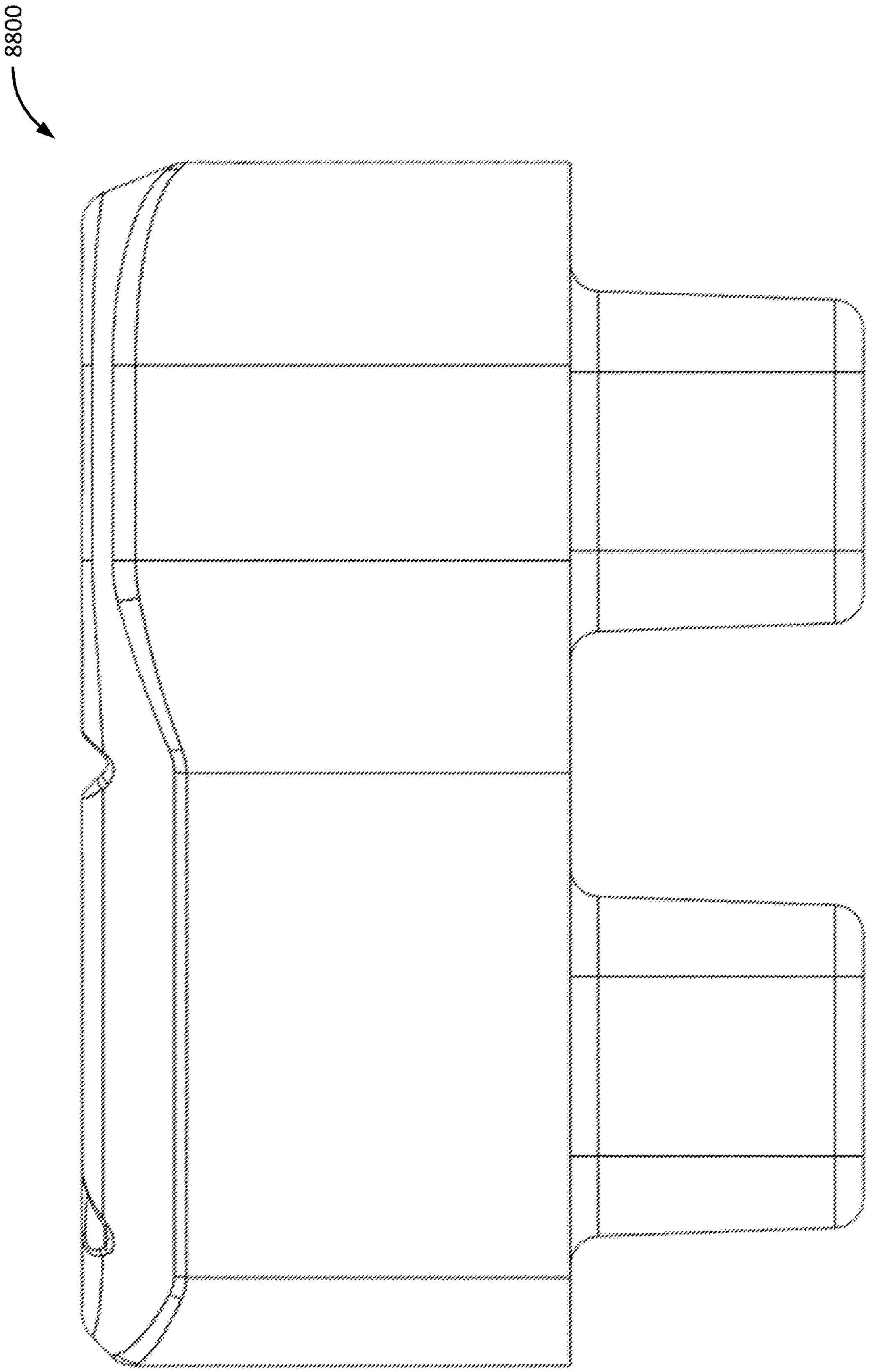
FIG. 92 illustrates a second side view of the fourth insert block in FIG. 88, according to various aspects of the present disclosure.
Figure 93:
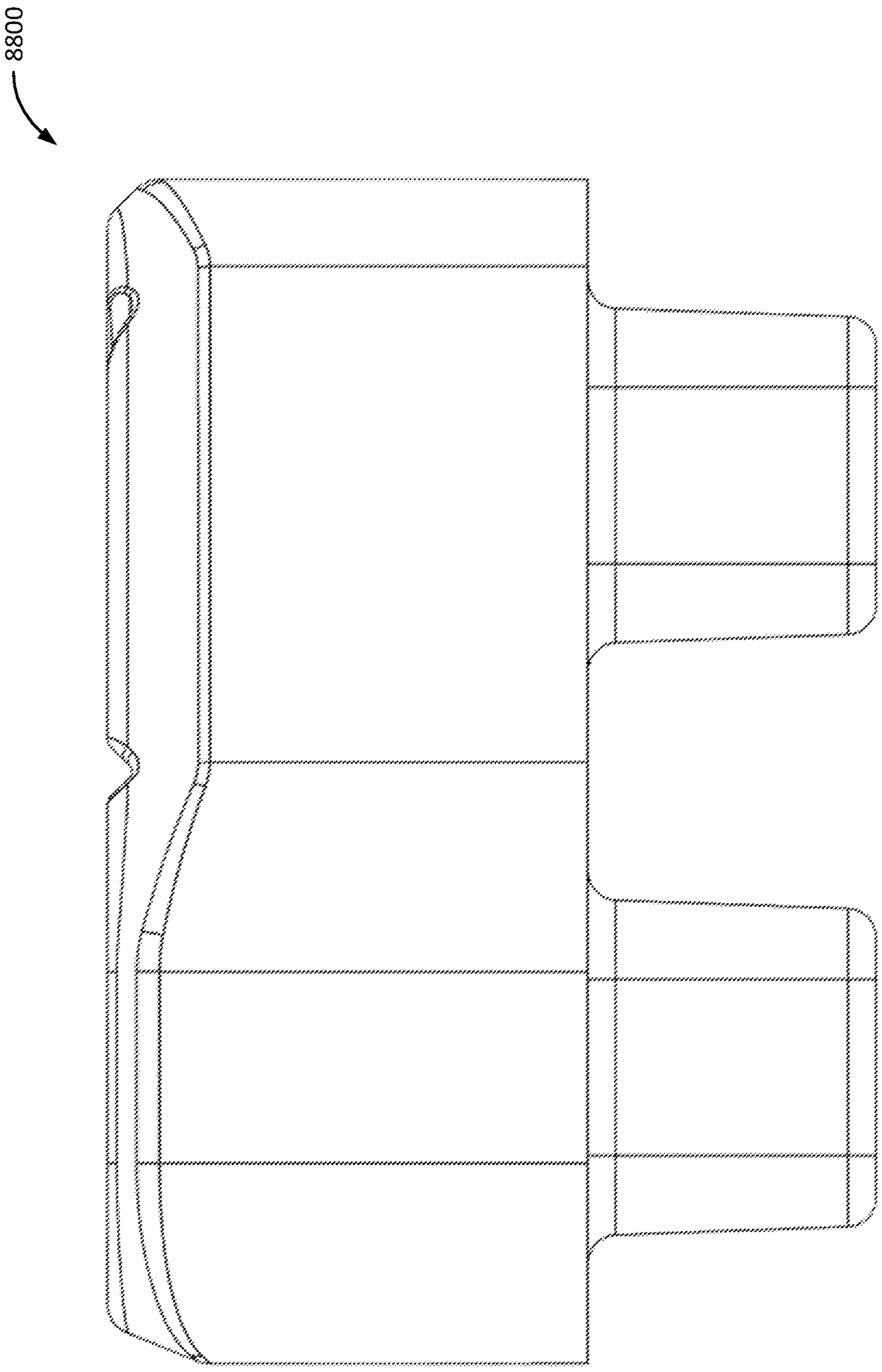
FIG. 93 illustrates a third side view of the fourth insert block in FIG. 88, according to various aspects of the present disclosure.
Figure 94:
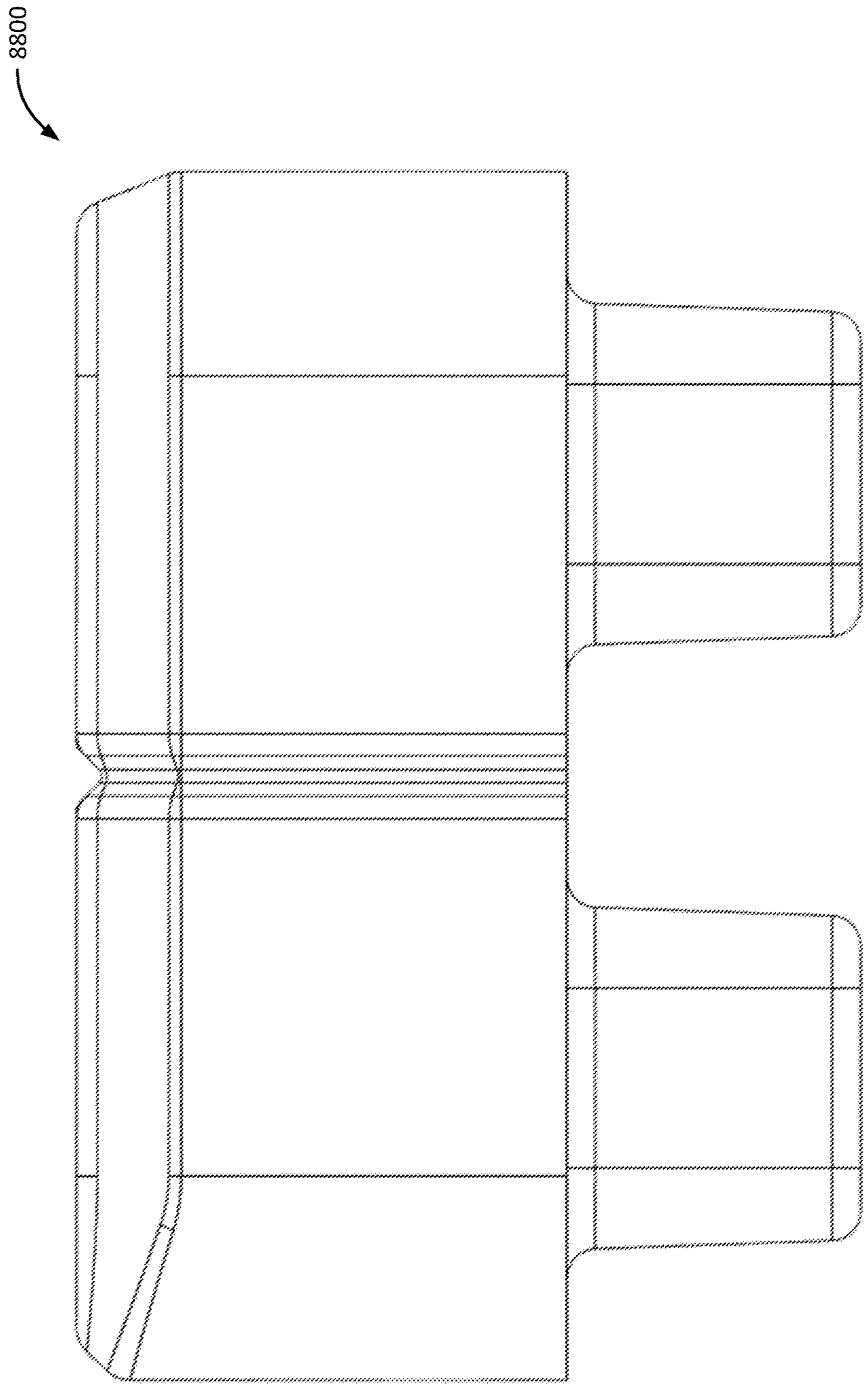
FIG. 94 illustrates a fourth side view of the fourth insert block in FIG. 88, according to various aspects of the present disclosure.
Figure 95:
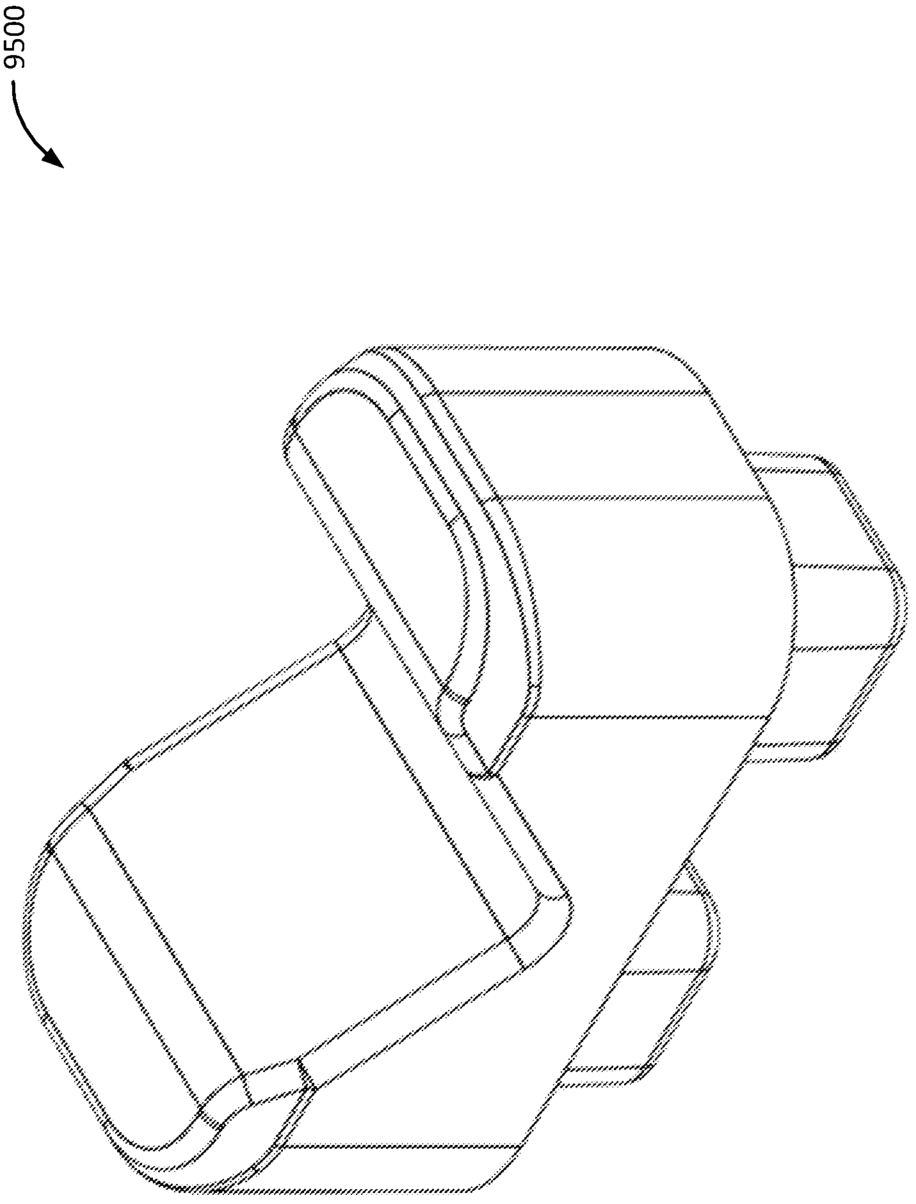
FIG. 95 illustrates a perspective top view of a fifth insert block, according to various aspects of the present disclosure.
Figure 96:
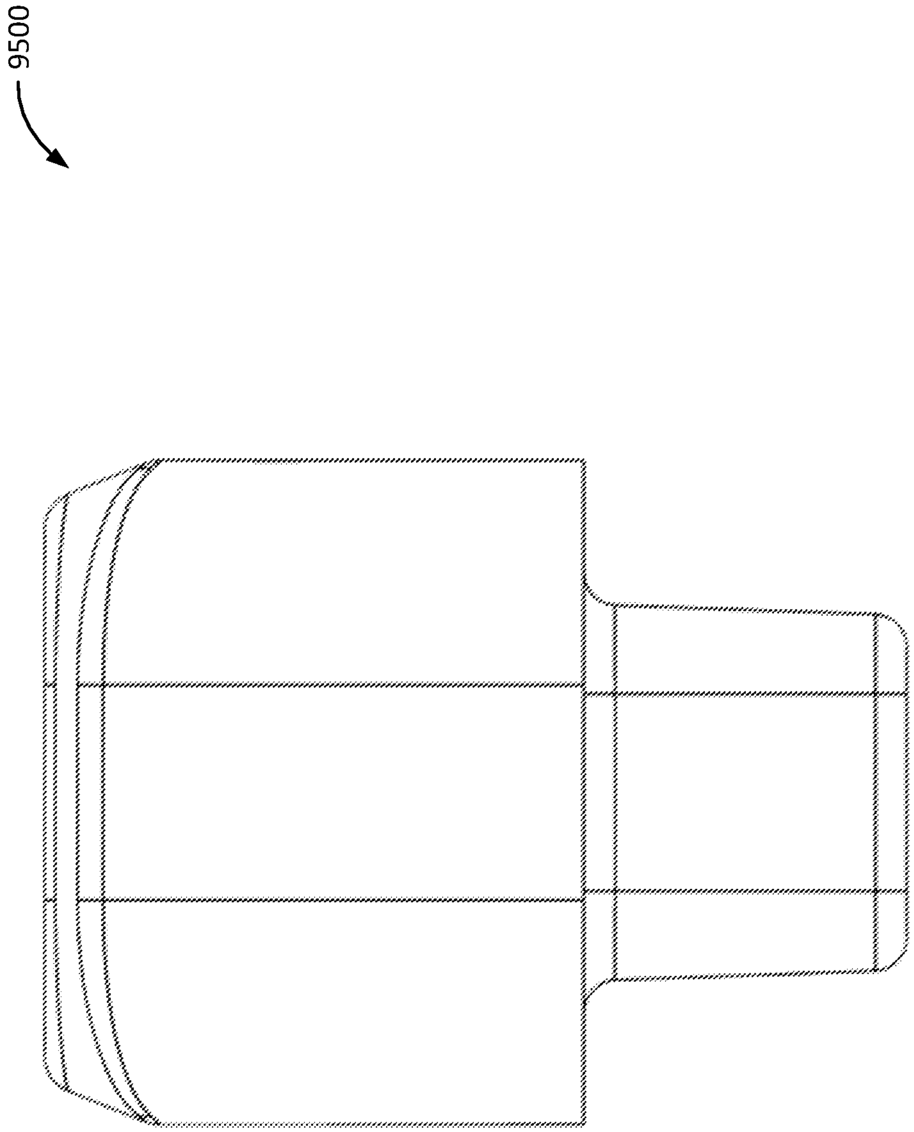
FIG. 96 illustrates a first side view of the fifth insert block in FIG. 95, according to various aspects of the present disclosure.
Figure 97:
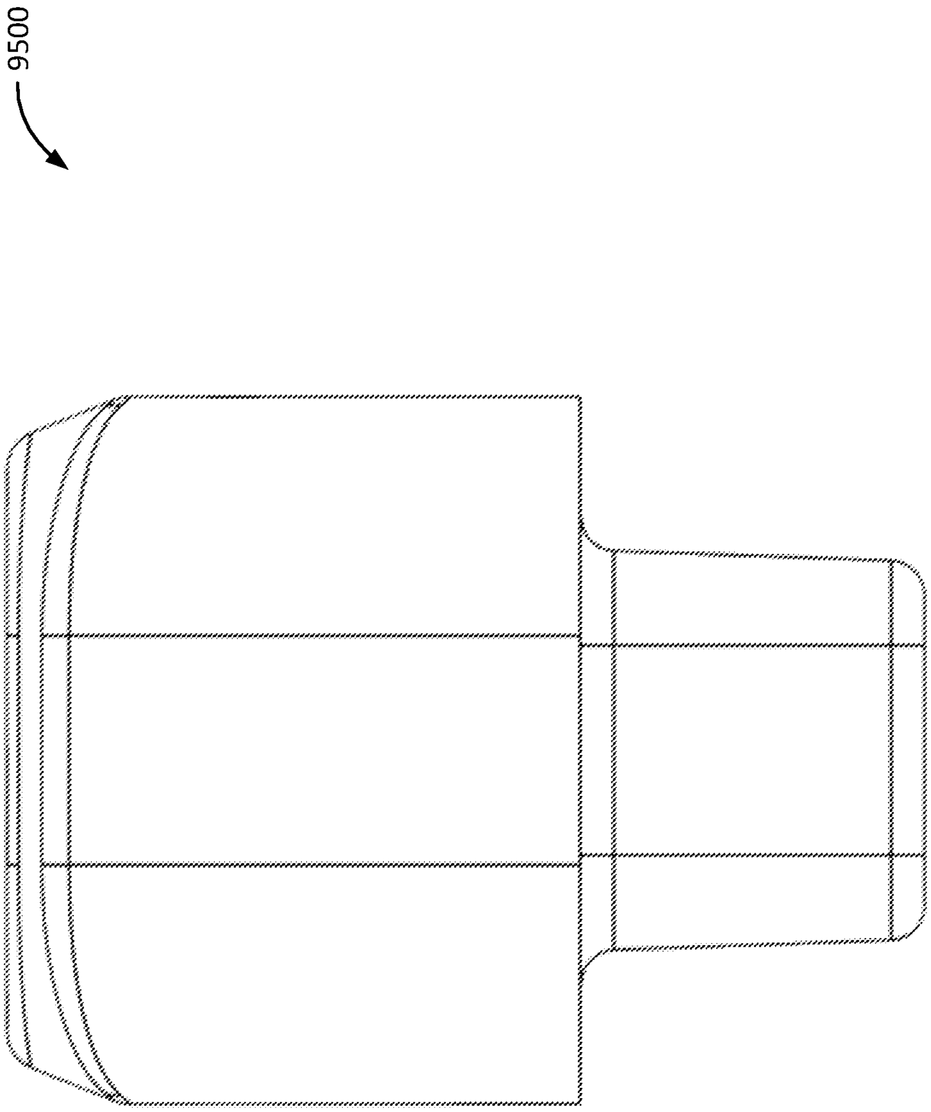
FIG. 97 illustrates a second side view of the fifth insert block in FIG. 95, according to various aspects of the present disclosure.
Figure 98:
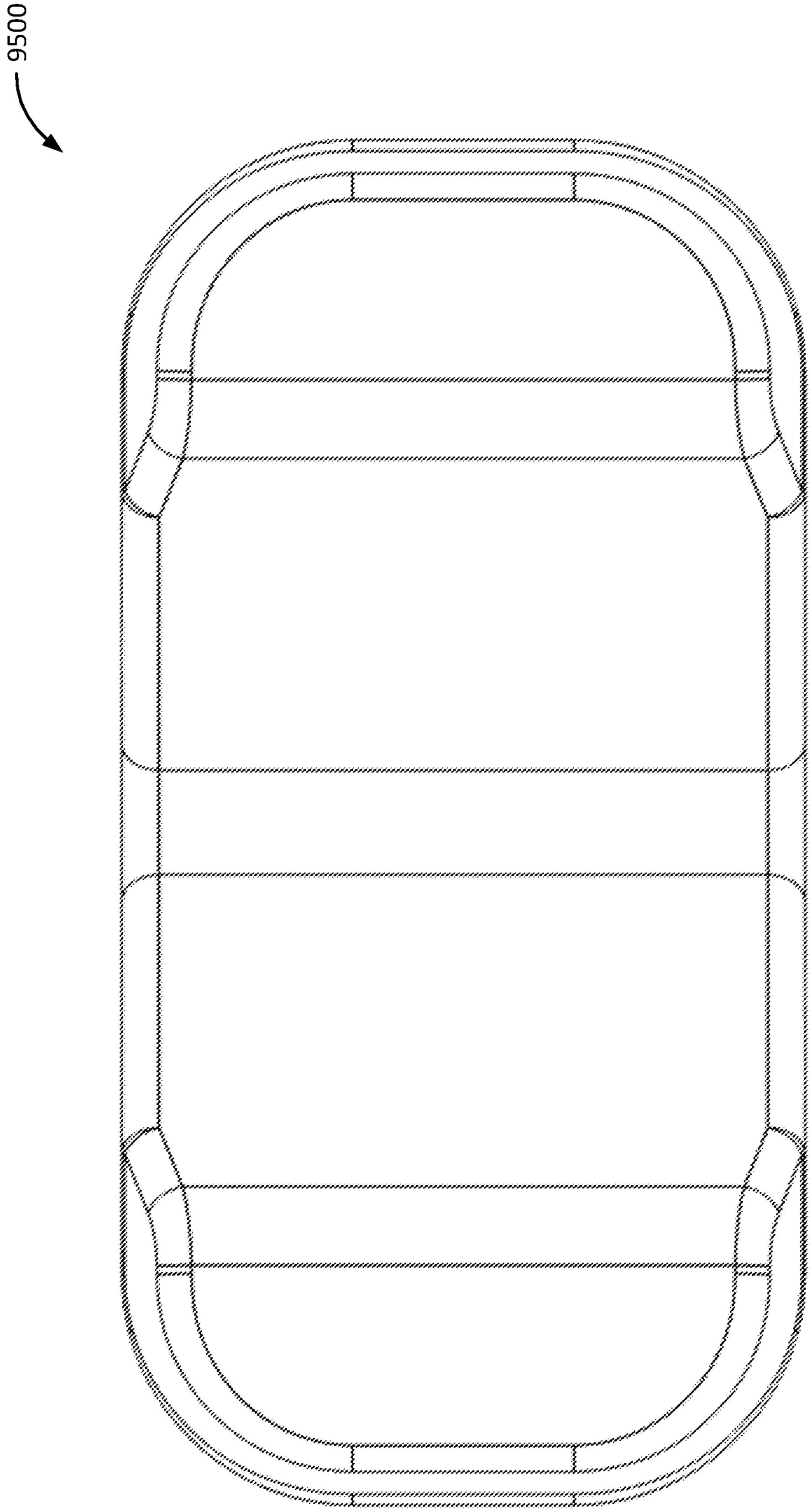
FIG. 98 illustrates a top view of the fifth insert block in FIG. 95, according to various aspects of the present disclosure.
Figure 99:
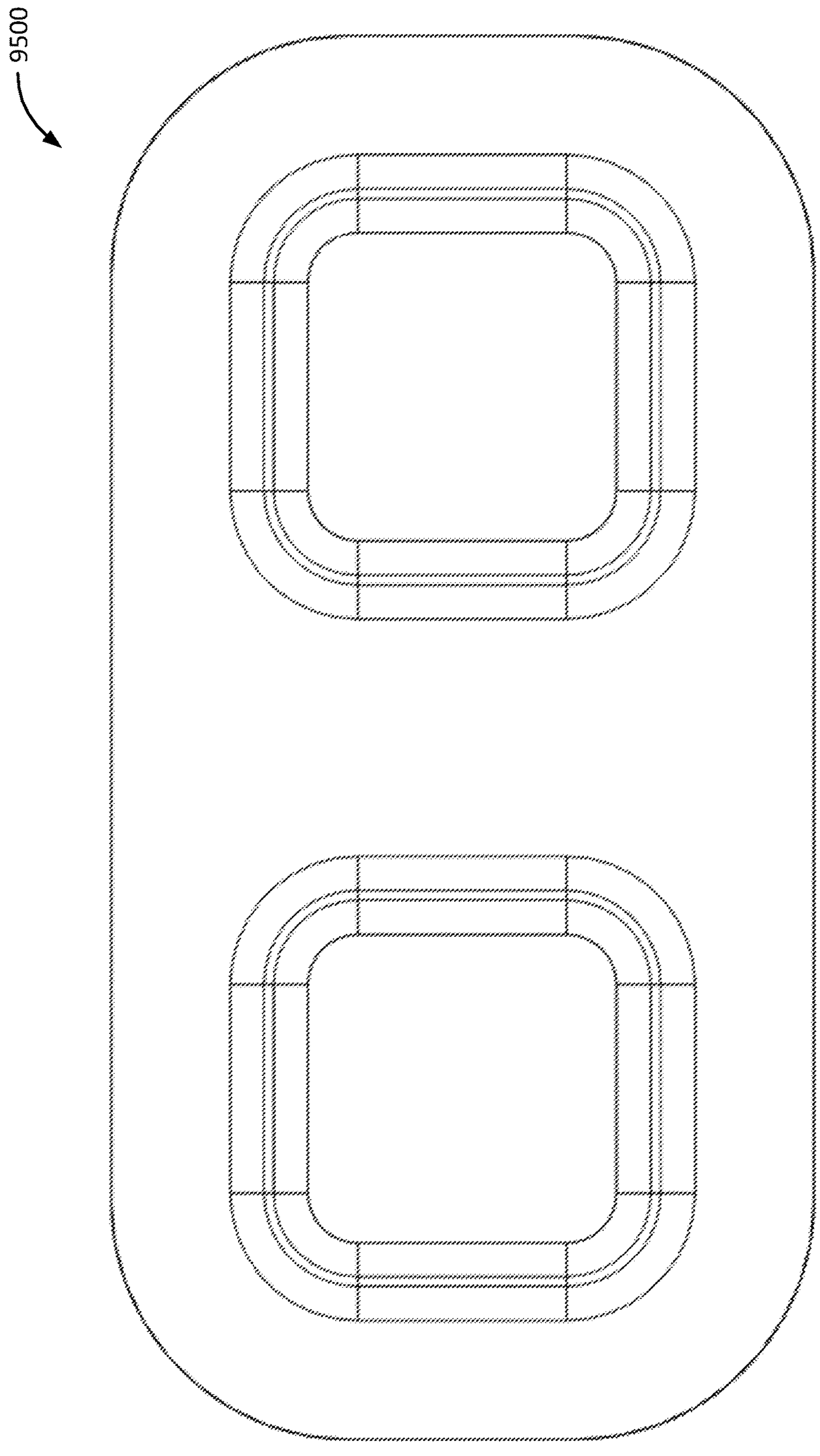
FIG. 99 illustrates a bottom view of the fifth insert block in FIG. 95, according to various aspects of the present disclosure.
Figure 100:
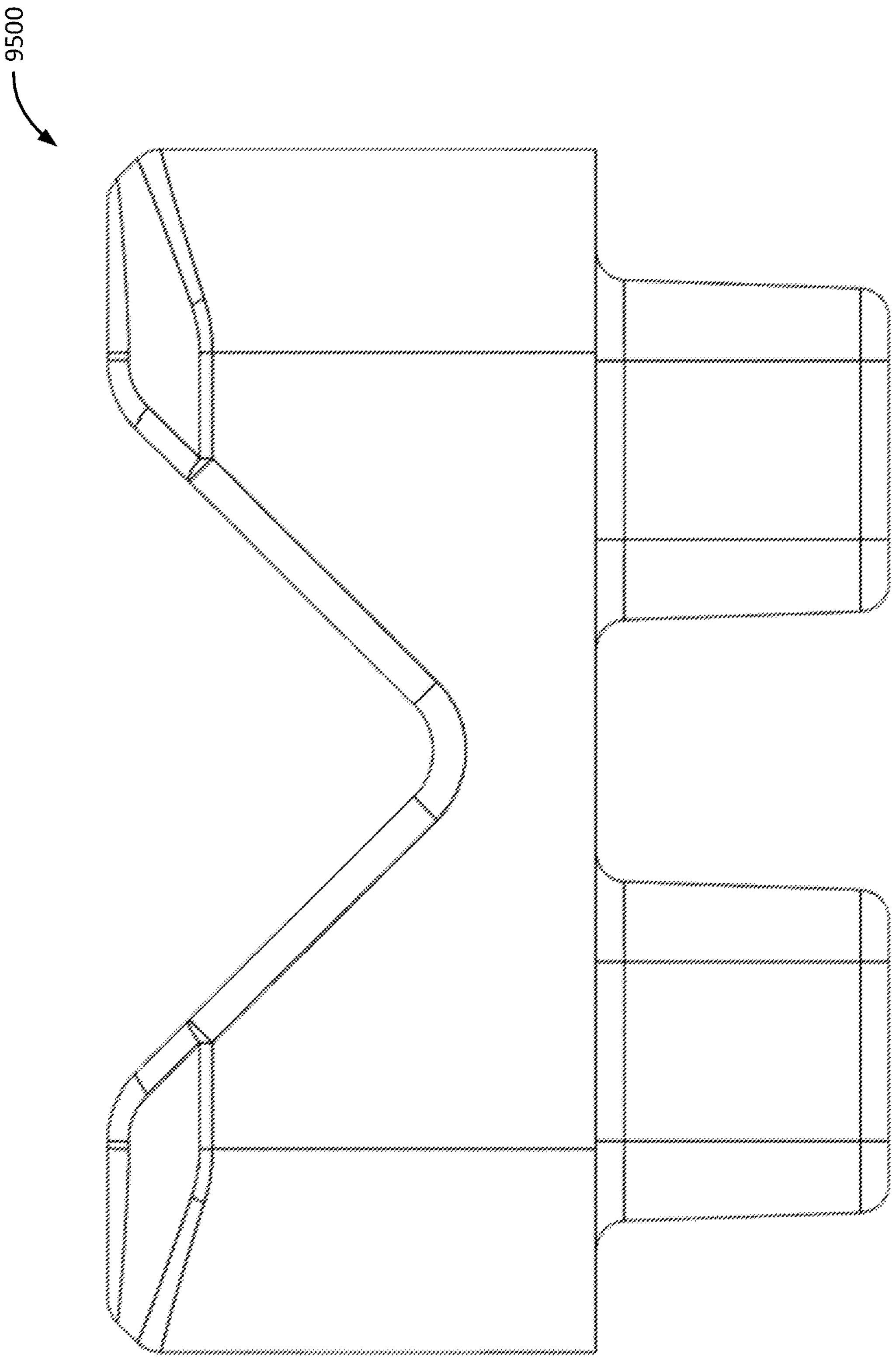
FIG. 100 illustrates a third side view of the fifth insert block in FIG. 95, according to various aspects of the present disclosure.
Figure 101:
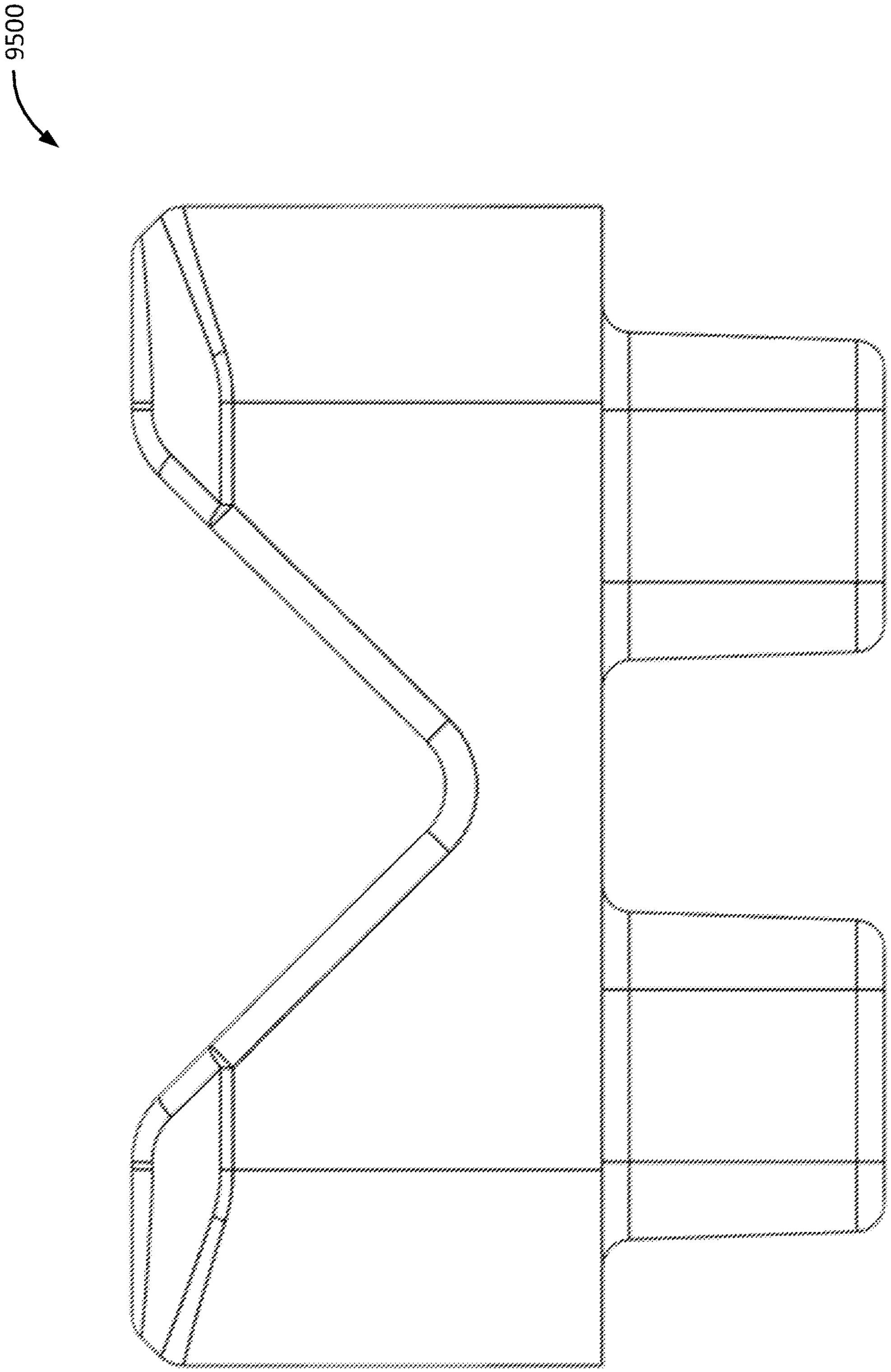
FIG. 101 illustrates a fourth side view of the fifth insert block in FIG. 95, according to various aspects of the present disclosure.
Figure 102:
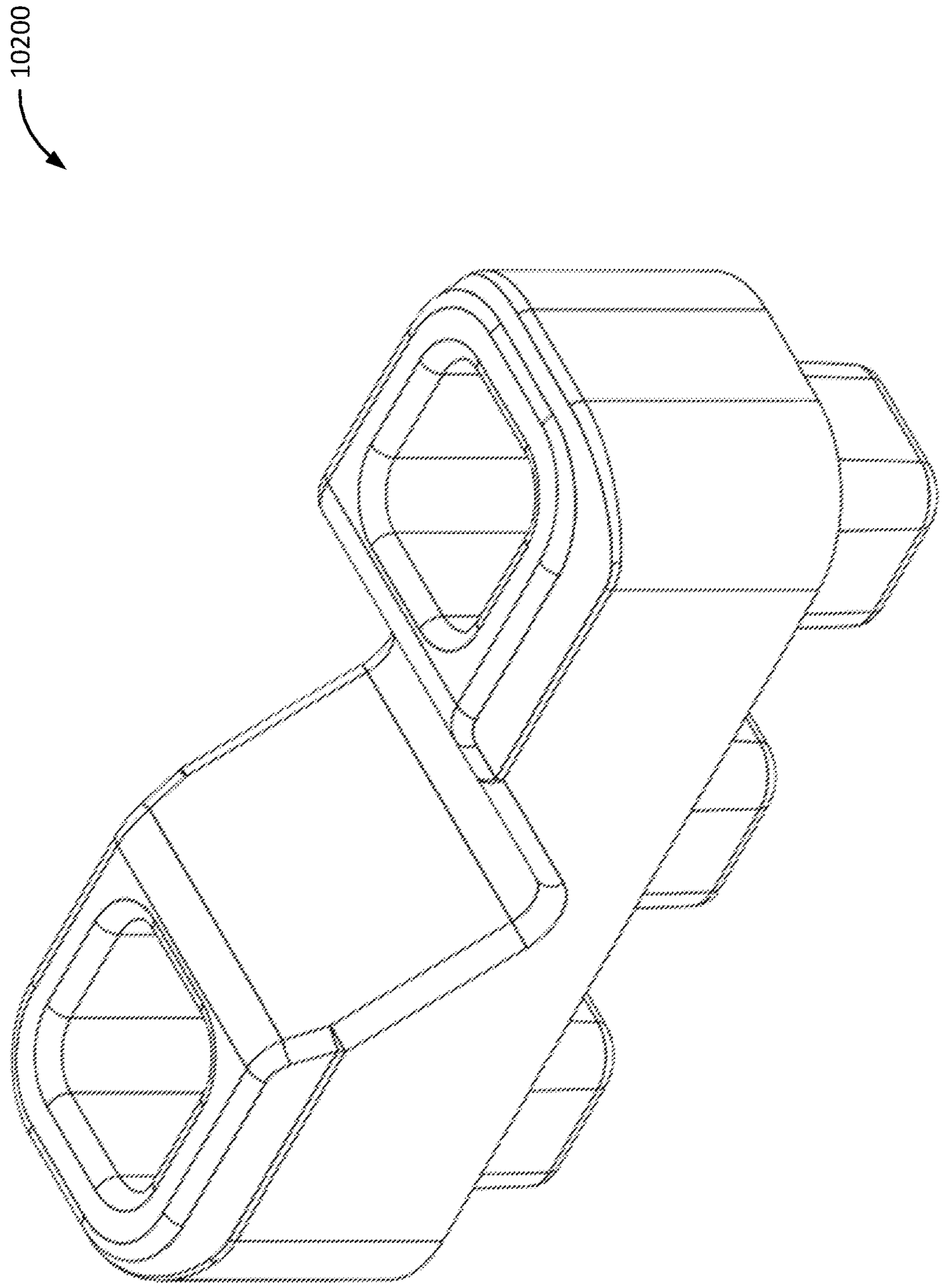
FIG. 102 illustrates a perspective top view of a sixth insert block, according to various aspects of the present disclosure.
Figure 103:
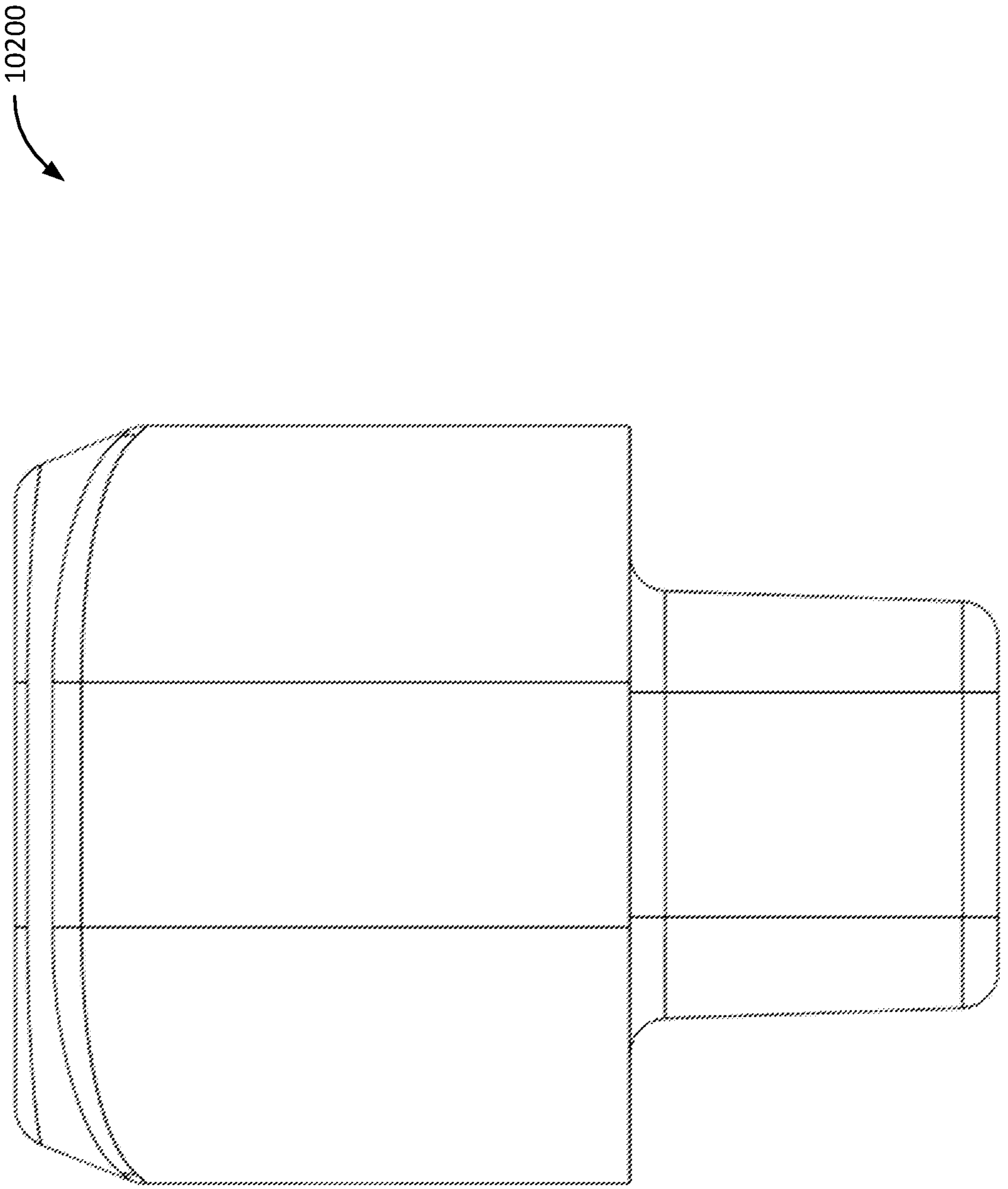
FIG. 103 illustrates a first side view of the sixth insert block in FIG. 102, according to various aspects of the present disclosure.
Figure 104:
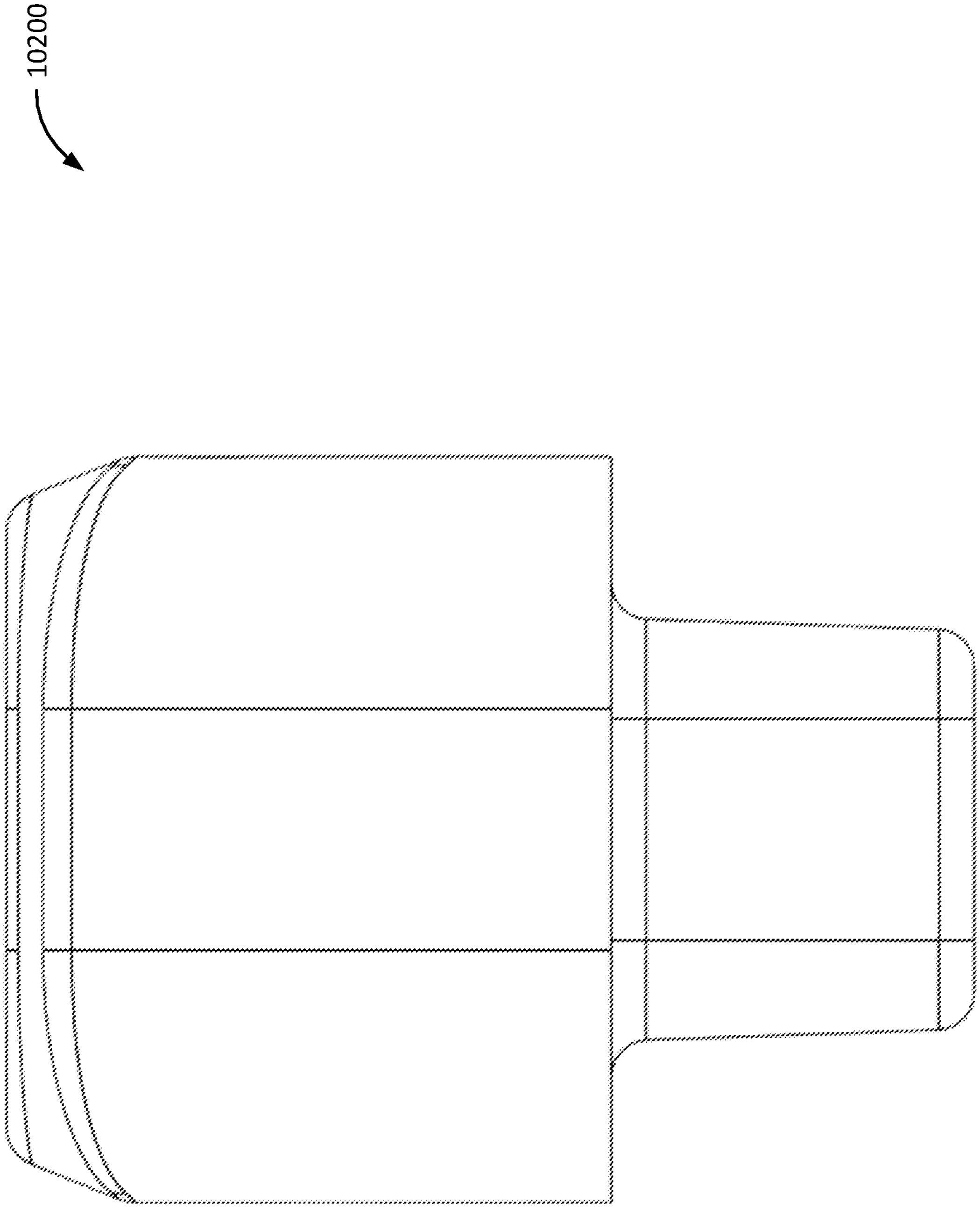
FIG. 104 illustrates a second side view of the sixth insert block in FIG. 102, according to various aspects of the present disclosure.
Figure 105:
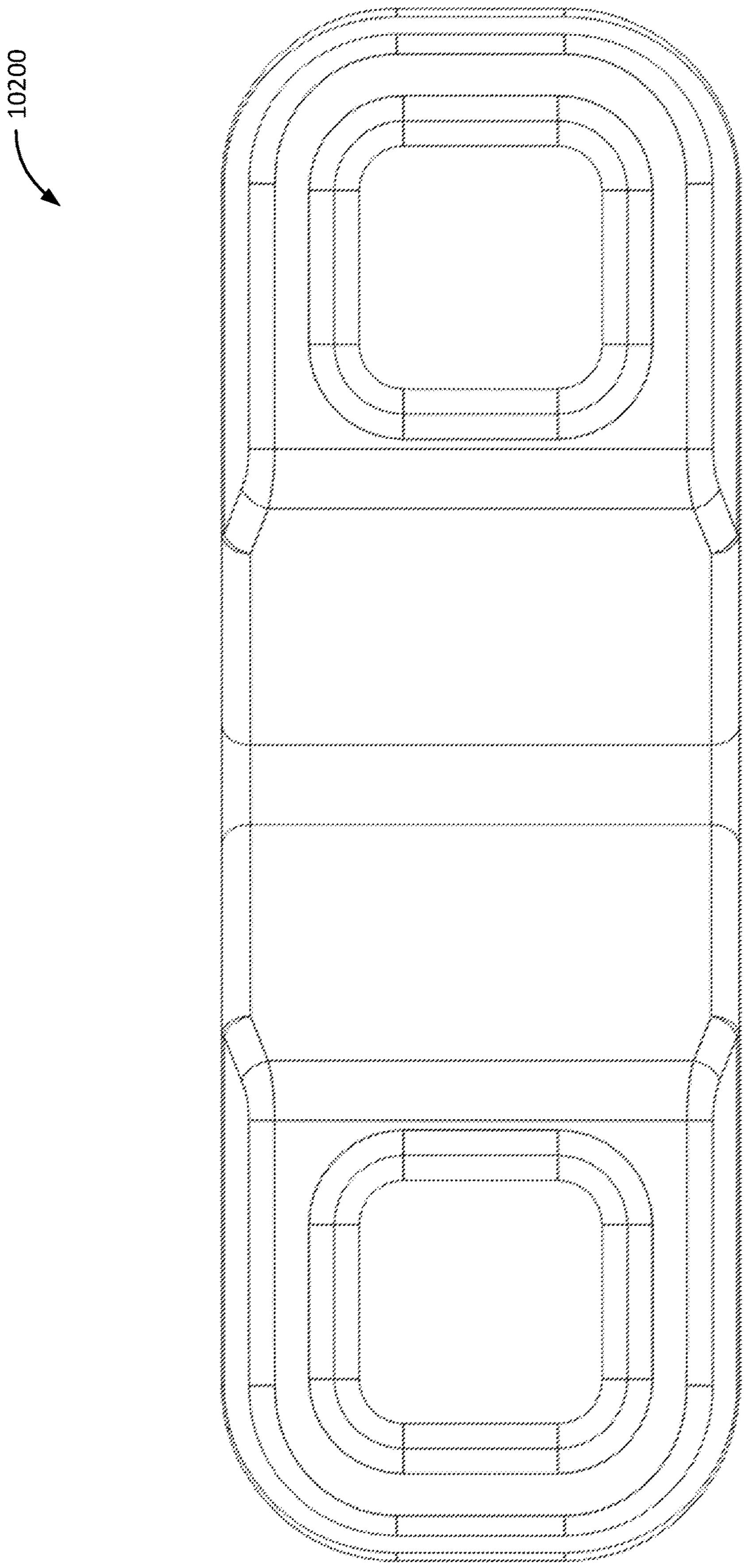
FIG. 105 illustrates a top view of the sixth insert block in FIG. 102, according to various aspects of the present disclosure.
Figure 106:
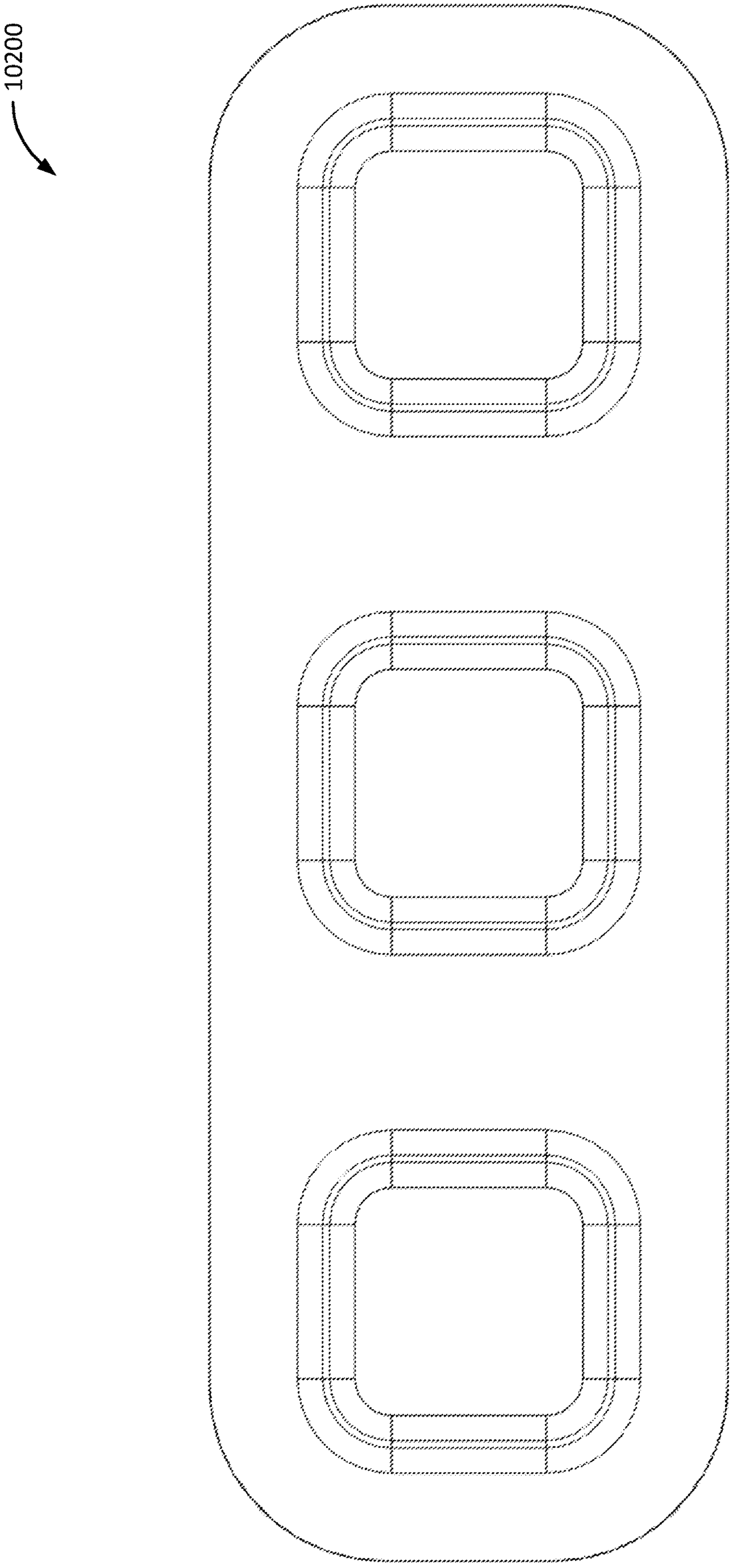
FIG. 106 illustrates a bottom view of the sixth insert block in FIG. 102, according to various aspects of the present disclosure.
Figure 107:
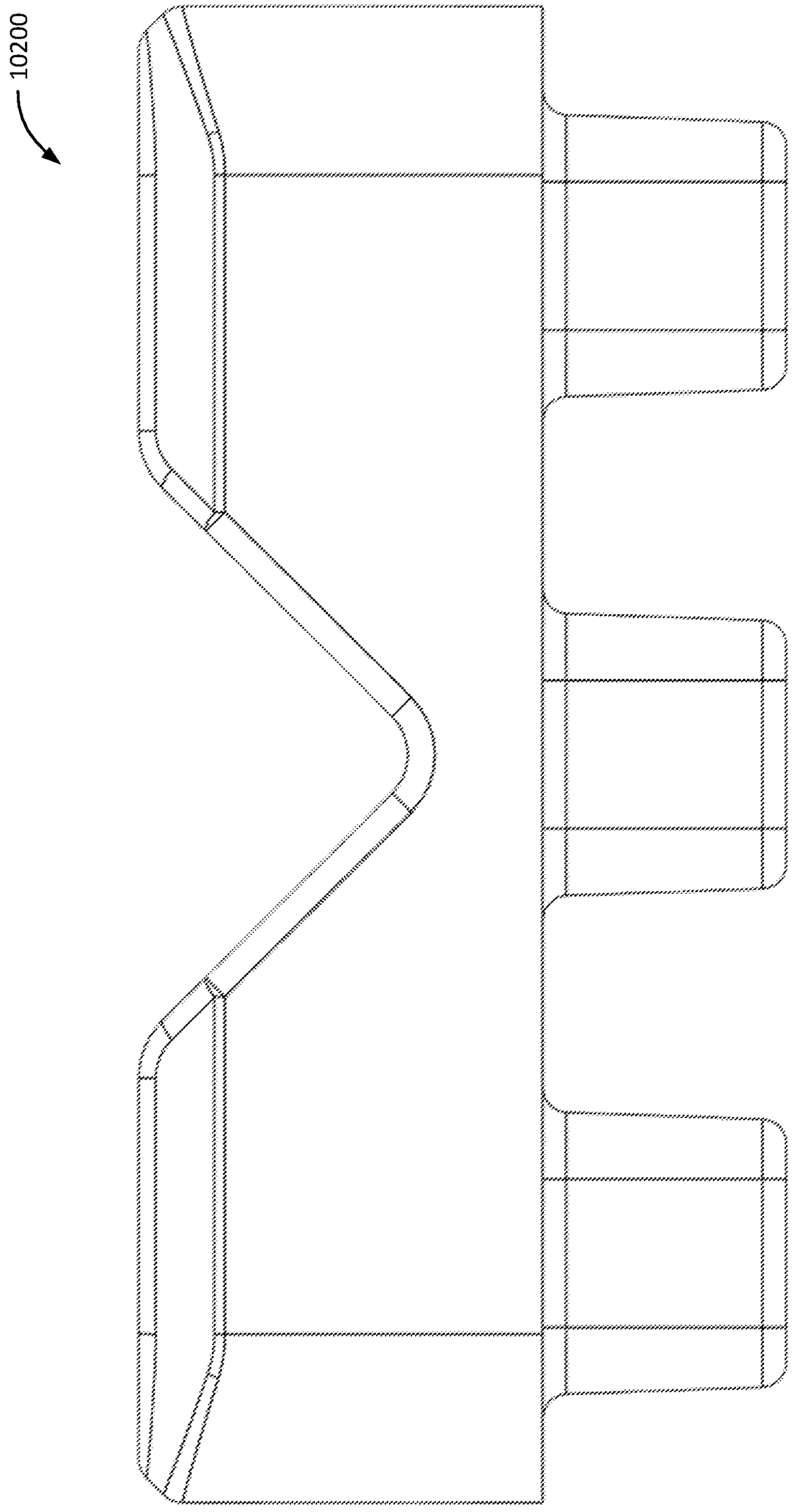
FIG. 107 illustrates a third side view of the sixth insert block in FIG. 102, according to various aspects of the present disclosure.
Figure 108:
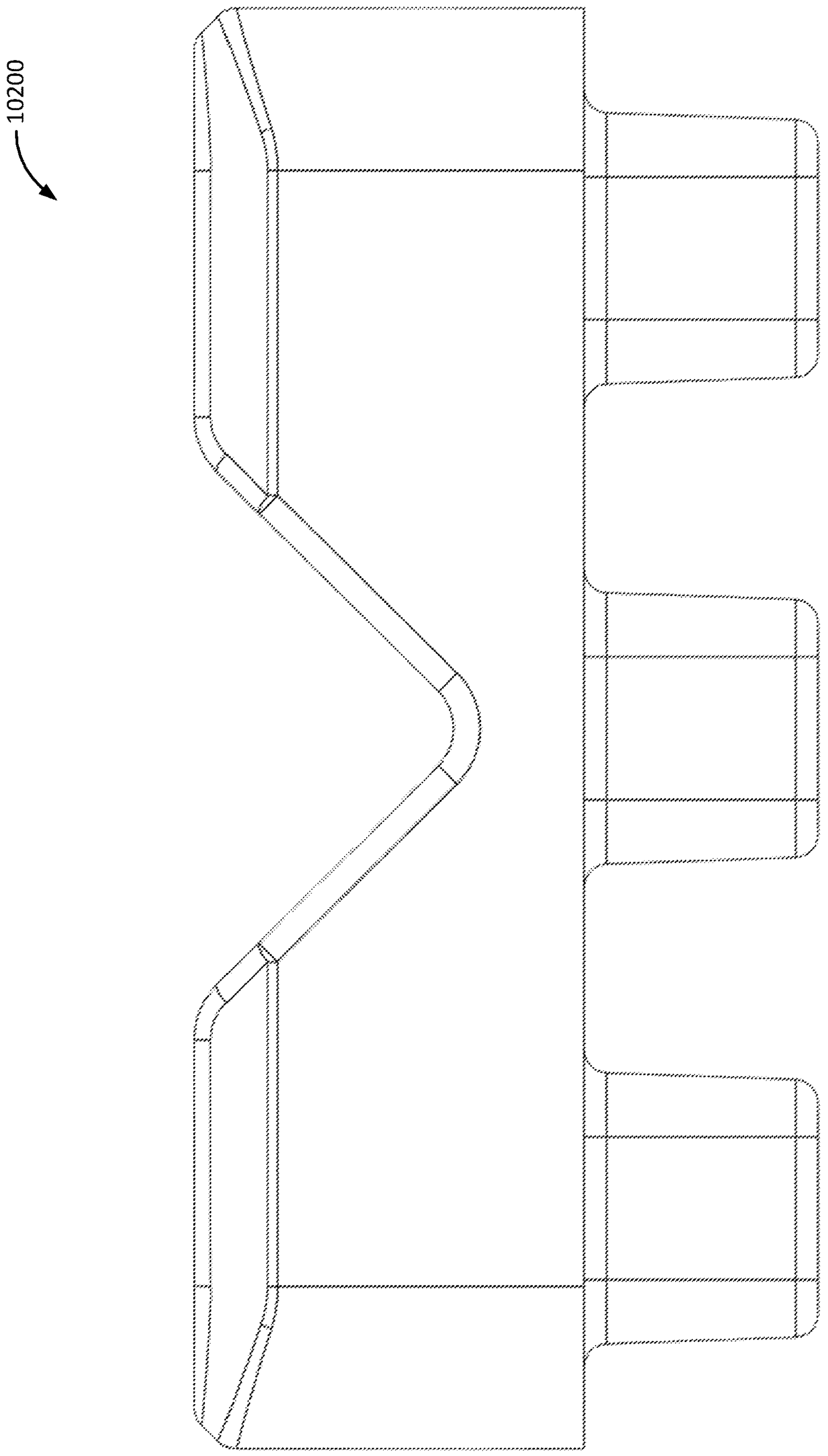
FIG. 108 illustrates a fourth side view of the sixth insert block in FIG. 102, according to various aspects of the present disclosure.
Figure 109:
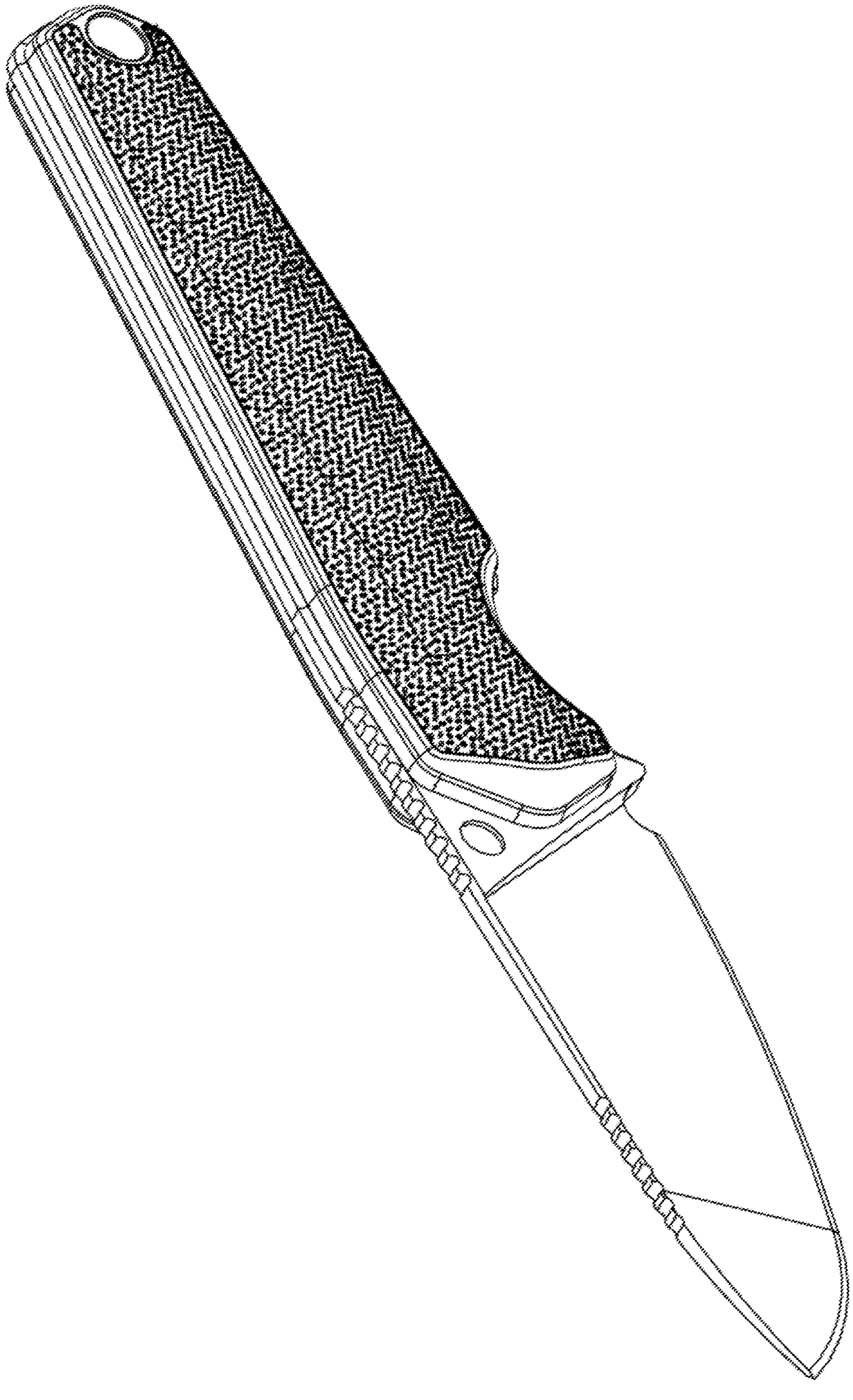
FIG. 109 illustrates a front, left, top perspective view of a fixed knife with a handle and a texture on the handle.
Figure 110:
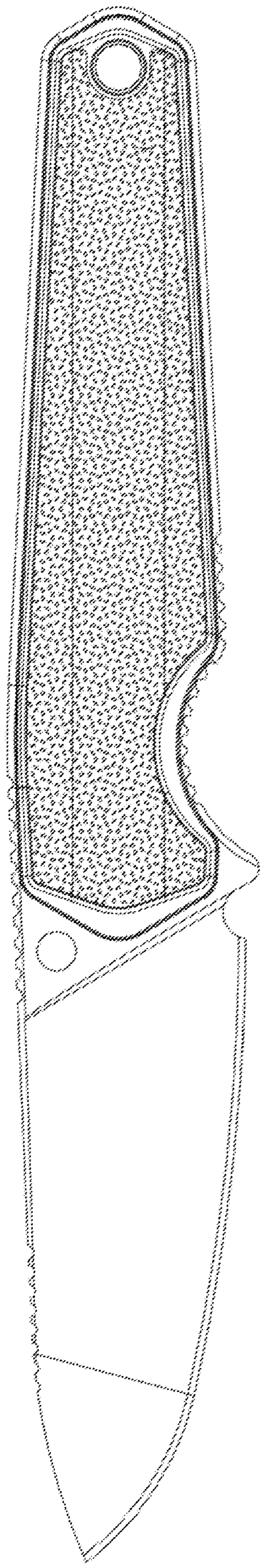
FIG. 110 illustrates a left elevation view of the fixed knife with a handle and a texture on the handle of FIG. 109.
Figure 111:
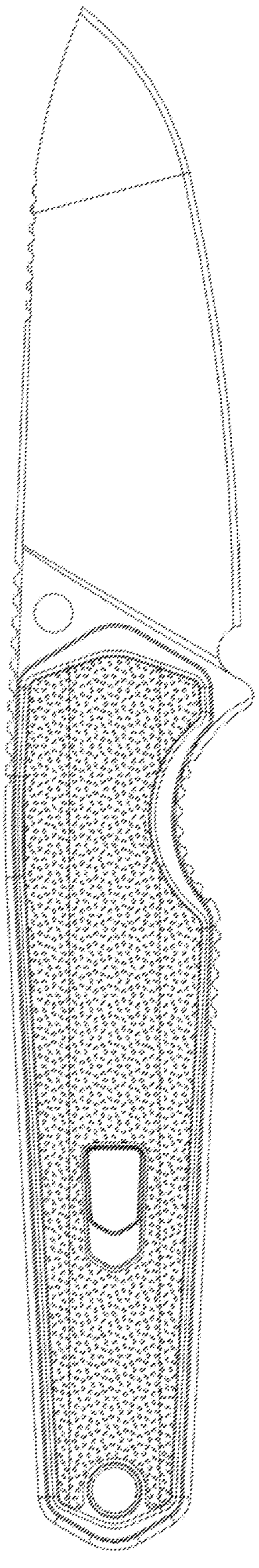
FIG. 111 illustrates a right elevation view of the fixed knife with a handle and a texture on the handle of FIG. 109.
Figure 112:
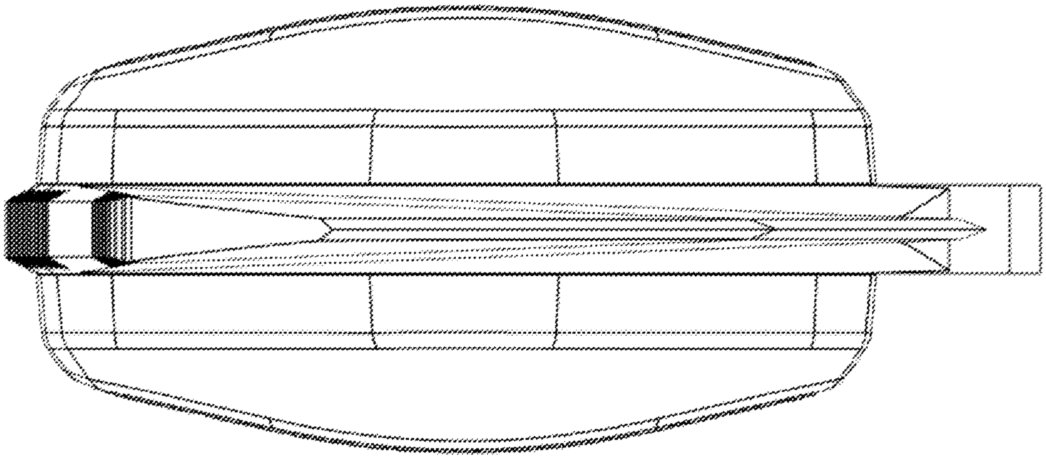
FIG. 112 illustrates a front elevation view of the fixed knife with a handle and a texture on the handle of FIG. 109.
Figure 113:
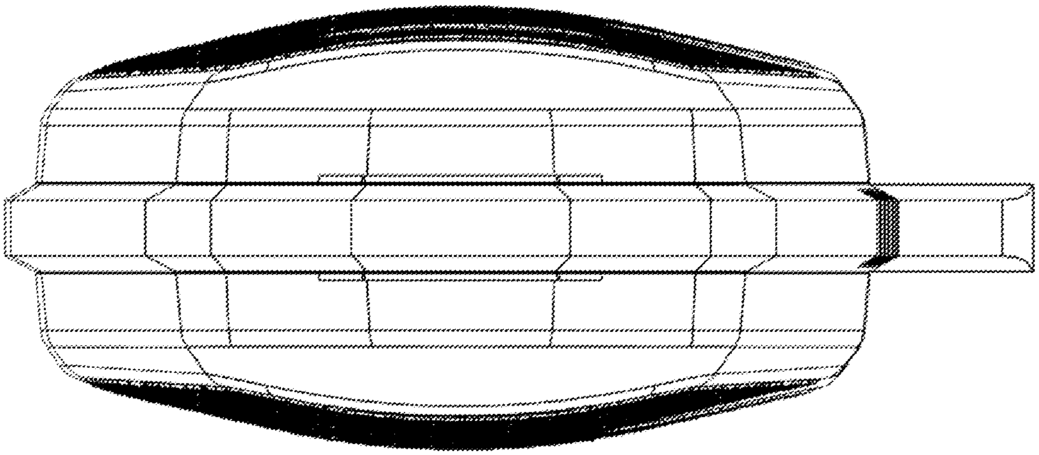
FIG. 113 illustrates a rear elevation view of the fixed knife with a handle and a texture on the handle of FIG. 109.
Figure 114:
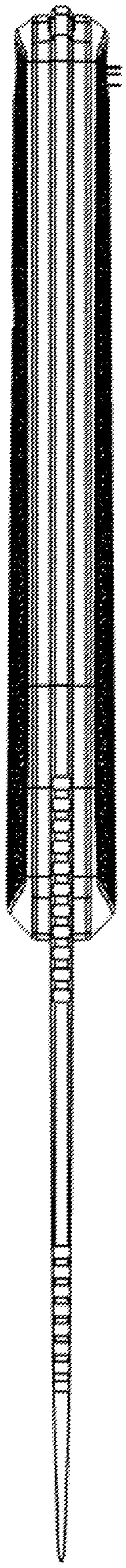
FIG. 114 illustrates a top view of the fixed knife with a handle and a texture on the handle of FIG. 109.
Figure 115:
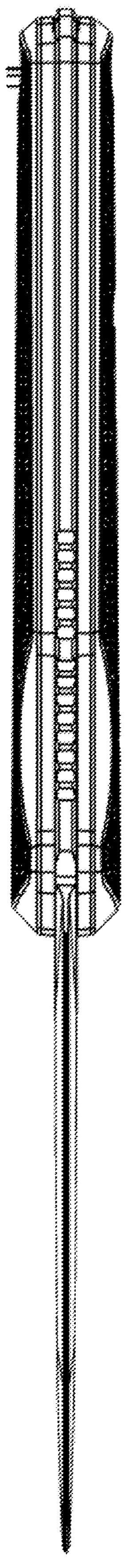
FIG. 115 illustrates a bottom view of the fixed knife with a handle and a texture on the handle of FIG. 109.
Figure 116:
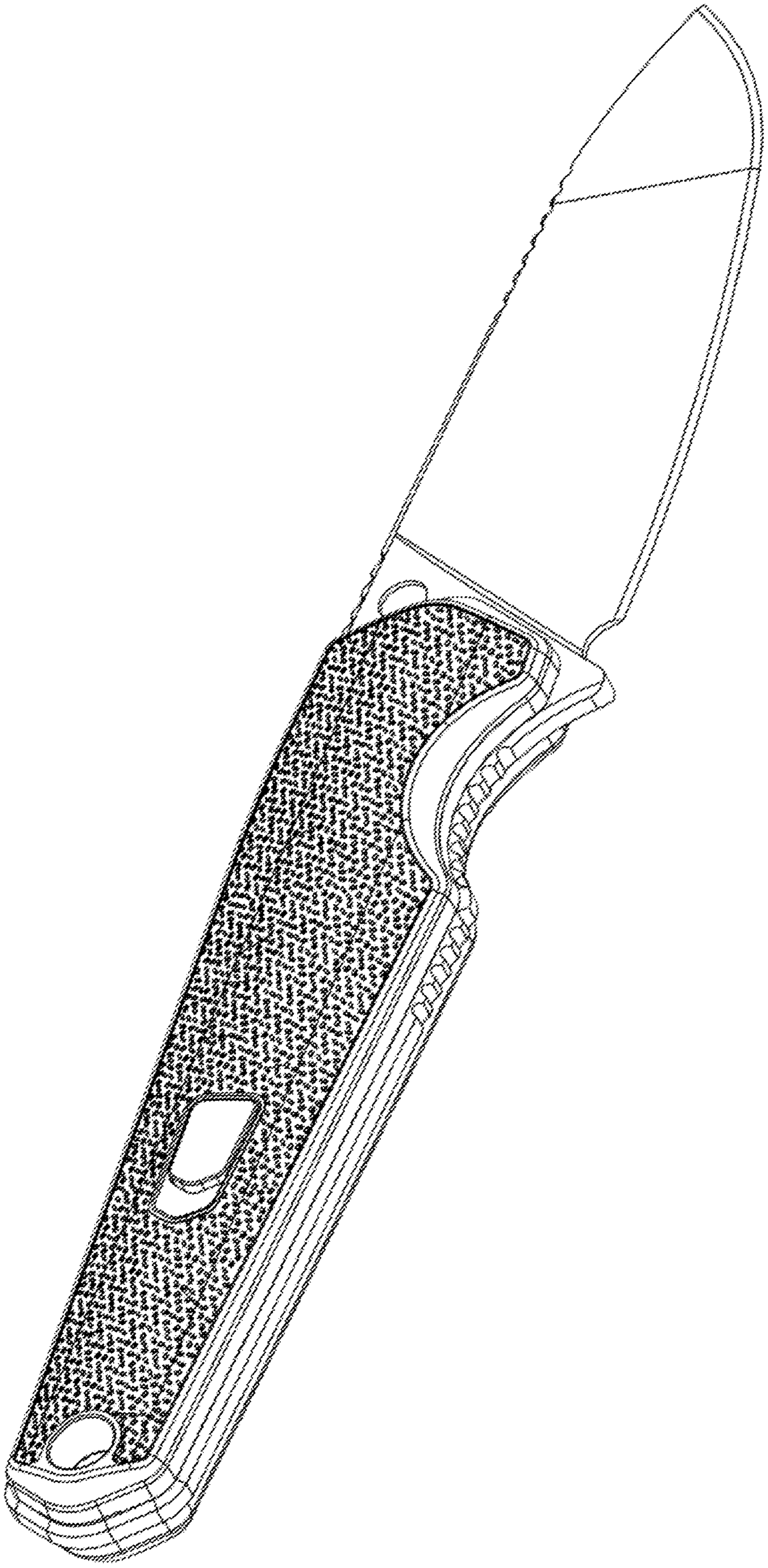
FIG. 116 illustrates a back, right, bottom perspective view of the fixed knife with a handle and a texture on the handle of FIG. 109.

FIG. 18 shows a detailed bottom view of the serrations of the fixed blade knife of FIG. 10, according to various aspects of the present disclosure.

In some embodiments, the blade may be composed of steel (e.g., S35VN), tool steel (e.g., D2), stainless steel, or any other applicable material. In some cases, the blade may have a length of approximately 3 or 3.5 inches, although other blade lengths are contemplated in different embodiments. The blade may comprise a black titanium nitride, stonewashed, or another applicable finish. The blade may comprise one of a drop-point, Tanto, or another applicable blade style.

Although this disclosure has generally referred to fixed blade knives, in some embodiments, the serrated knife blade can be part of a folding knife incorporating a frame lock, liner lock, or handle lock design.

FIGS. 19-66 illustrate embodiments of mounting blocks 1900, 2600, 3800, 4900 that include storage volumes therein as well as a storage lids. As seen, various sizes and proportions of storage-style mounting blocks 1900, 2600, 3800, 4900 can be implemented, with only five being shown here. The mounting blocks 1900, 2600, 3800, 4900 can include studs extending from a bottom of a body of each mounting block and a lid with a rectangular depression shaped to accept the studs of a mounting block that can be arranged atop another mounting block—in this way allowing secured stacking of mounting blocks.

The lids can include arrays of dot matrices where each of multiple groups of dot matrices can be used to write letters or numbers to help with identification of the storage-type mounting blocks and/or their contents. The dots of the dot matrices can be indented into a top surface of the lids.

FIGS. 74-94 illustrate mounting blocks with an angled side that may be implemented to more appropriately fit and secure certain objects, such as the curved side of a musical instrument or camera lens or the angled front end of a buttstock. As seen, angles of 30°, 45°, and 60° can be used, though other angles are also possible, though angles between 30° and 60° will likely provide the most adaptable and widely applicable mounting blocks. Each mounting block can include a plurality of studs, each extending from a bottom of a body of the mounting block, and each stud arranged below an indentation. The indentations can be sized and shaped to accept another stud thereby enabling secured stacking of mounting blocks. The mounting blocks with an angled side can be used in combination with others of the mounting blocks herein disclosed to provide more customized fitments for various objects to be stored in a case.

FIGS. 67-73 show another mounting block with two longer angled sides. More specifically, this mounting block can include two studs underneath a body, with the body comprising two short straight edges and two long angled edges, the angled edges being at 45° angles to the short straight edges and the straight edges being at 90° angles to each other. Each stud can be arranged below a body of the mounting block and an indentation can be arranged in the body above each of the studs, sized and shaped to accept another stud thereby enabling secured stacking of mounting blocks. The mounting blocks with two angled sides can be used in combination with others of the mounting blocks herein disclosed to provide more customized fitments for various objects to be stored in a case.

FIGS. 95-101 illustrate a mounting block with a V-shaped recess. Specifically, a 2×1 mounting block is shown, but other form factors could also be implemented. The V-shaped recess may be configured to accept portions of objects that may not rest at the same level as other objects in the case, for instance, the barrel of a rifle. These slightly raised portions of objects may fit into and be supported by the sides of the V-shaped recess. The mounting blocks with a V-shaped recess can be used in combination with others of the mounting blocks herein disclosed to provide more customized fitments for various objects to be stored in a case.

FIG. 102-108 illustrate another mounting block with a V-shaped recess and indentations in the body above two of three studs. Specifically, a 3×1 mounting block is shown with a V-shaped recess arranged between two indentations. The V-shaped recess is arranged above a middle of three studs, and the two indentations are each arranged in the body above two outer studs allowing stacking of mounting blocks atop the V-shaped recess. The mounting blocks with a V-shaped recess can be used in combination with others of the mounting blocks herein disclosed to provide more customized fitments for various objects to be stored in a case.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A knife, comprising:

a blade having a cutting edge and a tang, wherein the cutting edge comprises a serrated portion having a plurality of serrations, the plurality of serrations positioned between a proximal end of the blade and a distal tip of the blade;

wherein the serrated portion further comprises a plurality of recessed portions, wherein the recessed portions are angled and flat, and wherein each of the plurality of serrations is positioned adjacent at least one recessed portion; and wherein each recessed portion includes a top edge, a bottom edge, and at least one tapered portion, wherein one or more of the at least one tapered portion of each recessed portion is positioned adjacent at least one of the plurality of serrations.

2. The knife of claim 1, wherein the cutting edge further comprises a straight edge portion positioned between the serrated portion and the distal tip of the blade.

3. The knife of claim 1, wherein one or more of the plurality of serrations comprise a beveled surface.

4. The knife of claim 1, wherein one or more of the plurality of recessed portions comprises a trapezoidal shape.

5. The knife of claim 1, wherein each of the plurality of recessed portions comprises one of a trapezoidal shape, a rectilinear shape, or a concave shape.

6. The knife of claim 1, wherein the blade comprises a first face and a second face, the second face opposing the first face, and wherein each of the plurality of recessed portions is formed on one of the first face or the second face.

7. The knife of claim 6, wherein:

the plurality of recessed portions comprise a first recessed portion formed on the first face, a second recessed portion formed on the second face, and a third recessed portion formed on the first face, wherein the second recessed portion is positioned between the first and the third recessed portion.

8. A method of manufacturing a knife, the method comprising:

forming a blade having a cutting edge and a tang; and forming a serrated portion on the cutting edge, wherein the serrated portion comprises a plurality of recessed portions and a plurality of serrations, the plurality of serrations positioned between a proximal end of the blade and a distal tip of the blade, and wherein each of the plurality of serrations is positioned adjacent at least one recessed portion, and wherein each recessed portion includes a top edge, a bottom edge, and at least one tapered portion, wherein the recessed portions are angled and flat, and wherein one or more of the at least one tapered portion of each recessed portion is positioned adjacent at least one of the plurality of serrations.

9. The method of claim 8, further comprising:

forming a straight edge portion on the cutting edge, wherein the straight edge portion is positioned between the serrated portion and the distal tip of the blade.

10. The method of claim 8, wherein one or more of the plurality of serrations comprise a beveled surface.

11. The method of claim 8, wherein one or more of the plurality of recessed portions comprises a trapezoidal shape.

12. The method of claim 8, wherein each of the plurality of recessed portions comprises one of a trapezoidal shape, a rectilinear shape, or a concave shape.

13. The method of claim 8, wherein the blade comprises a first face and a second face, the second face opposing the first face, and wherein each of the plurality of recessed portions is formed on one of the first face or the second face.

14. The method of claim 13, wherein:

the plurality of recessed portions comprise a first recessed portion formed on the first face, a second recessed portion formed on the second face, and a third recessed portion formed on the first face, wherein the second recessed portion is positioned between the first and the third recessed portion.

15. A knife comprising:

a blade comprising a proximal end and a distal tip along with a cutting edge and a tang, wherein the cutting edge comprises:

a plurality of double-ground serrations with beveled surfaces on first and second faces of the blade, the plurality of double-ground serrations positioned between the proximal end of the blade and the distal tip of the blade, wherein the beveled surfaces on the first face of the blade have a greater surface area than the beveled surfaces on the second face of the blade; and a recessed portion defining a space between every two of the plurality of double-ground serrations.

16. The knife of claim 15, wherein the plurality of double-ground serrations are blunt-nosed.

* * * * *